(12) United States Patent
Gao et al.

(10) Patent No.: US 11,983,960 B2
(45) Date of Patent: *May 14, 2024

(54) DEVICE OCCUPATION METHOD AND ELECTRONIC DEVICE

(71) Applicant: Huawei Technologies Co., Ltd., Shenzhen (CN)

(72) Inventors: Guowen Gao, Shanghai (CN); Hao Liu, Shanghai (CN); Guoqi Li, Shenzhen (CN); Wei Wang, Dublin (IE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/191,578

(22) Filed: Mar. 28, 2023

(65) Prior Publication Data

US 2023/0237842 A1 Jul. 27, 2023

Related U.S. Application Data

(63) Continuation of application No. 17/438,715, filed as application No. PCT/CN2020/139727 on Dec. 26, 2020, now Pat. No. 11,637,922.

(30) Foreign Application Priority Data

Dec. 31, 2019 (CN) .......................... 201911425298.X

(51) Int. Cl.
G06V 40/16 (2022.01)
G06F 3/16 (2006.01)
H04M 1/72484 (2021.01)

(52) U.S. Cl.
CPC ............ *G06V 40/172* (2022.01); *G06F 3/162* (2013.01); *H04M 1/72484* (2021.01)

(58) Field of Classification Search
CPC ...... H04M 1/72484; G06F 3/162; G06F 9/54; G06V 40/172

(Continued)

(56) References Cited

U.S. PATENT DOCUMENTS 10,356,093 B2   7/2019  Yamamoto
2010/0190527 A1  7/2010  Kim (Continued)

FOREIGN PATENT DOCUMENTS

CN    2829221 Y    10/2006
CN  201725284 U    1/2011

(Continued)

OTHER PUBLICATIONS

Ugreen, "Bluetooth Receiver Pairing Unsuccessful FAQs and Solutions," May 21, 2019, with an English Translation Version, 11 pages.

(Continued)

*Primary Examiner* — Stephen S Hong
*Assistant Examiner* — Broderick C Anderson
(74) *Attorney, Agent, or Firm* — Conley Rose, P.C.

(57) ABSTRACT

A device occupation method includes a first device that obtains information related to the first device or information related to a second device, where the second device occupies a first to-be-occupied device, and the first device prepares to occupy the first to-be-occupied device, and occupying, by the first device, the first to-be-occupied device when the information matches.

20 Claims, 27 Drawing Sheets

(58) Field of Classification Search
USPC .......................................................... 715/717
See application file for complete search history.

(56) References Cited

U.S. PATENT DOCUMENTS

| | | | |
|---|---|---|---|
| 2010/0282839 | A1 | 11/2010 | Zura et al. |
| 2013/0157631 | A1* | 6/2013 | Wang ................ G06F 3/04842 |
| | | | 455/414.1 |
| 2015/0350766 | A1* | 12/2015 | Schobel ............ H04L 65/1069 |
| | | | 381/77 |
| 2015/0373769 | A1 | 12/2015 | Wang et al. |
| 2017/0156106 | A1 | 6/2017 | Chen et al. |
| 2018/0199214 | A1 | 7/2018 | Shen et al. |
| 2019/0289069 | A1 | 9/2019 | Zapata et al. |
| 2019/0361740 | A1 | 11/2019 | Zhao et al. |
| 2019/0362738 | A1 | 11/2019 | Mei |
| 2021/0136839 | A1 | 5/2021 | Wang |

FOREIGN PATENT DOCUMENTS

| | | |
|---|---|---|
| CN | 105338183 A | 2/2016 |
| CN | 105515831 A | 4/2016 |
| CN | 105578286 A | 5/2016 |
| CN | 105609108 A | 5/2016 |
| CN | 105681974 A | 6/2016 |
| CN | 106332132 A | 1/2017 |
| CN | 106341702 A | 1/2017 |
| CN | 106535158 A | 3/2017 |
| CN | 107770761 A | 3/2018 |
| CN | 108268233 A | 7/2018 |
| CN | 108513716 A | 9/2018 |
| CN | 108605073 A | 9/2018 |
| CN | 108650668 A | 10/2018 |
| CN | 109067748 A | 12/2018 |
| CN | 109890021 A | 6/2019 |
| CN | 110012172 A | 7/2019 |
| CN | 110177074 A | 8/2019 |
| CN | 110191442 A | 8/2019 |
| CN | 110266810 A | 9/2019 |
| CN | 110519855 A | 11/2019 |
| CN | 110611905 A | 12/2019 |
| CN | 108476537 B | 2/2021 |
| EP | 3135024 B1 | 3/2018 |
| EP | 3934292 A1 | 1/2022 |
| WO | 2016115984 A1 | 7/2016 |
| WO | 2019090726 A1 | 5/2019 |

OTHER PUBLICATIONS

Shi Henghui, "Wearable Device based on Bluetooth in Android," Oct. 2015, with an English Abstract, 74 pages.

* cited by examiner

400

401 — A first device obtains information related to a second device, where the second device currently occupies a first to-be-occupied device

402 — The first device determines, based on the information related to the second device, whether the second device is a trusted device

403 — When the second device is a trusted device, the first device occupies the first to-be-occupied device

404 — When the first device determines, based on the information related to the second device, that the second device is not a trusted device, the first device gives up occupying the first to-be-occupied device

405 — When the second device is a trusted device, and a priority of a first service is lower than a priority of a second service, the first device gives up occupying the first to-be-occupied device

FIG. 4

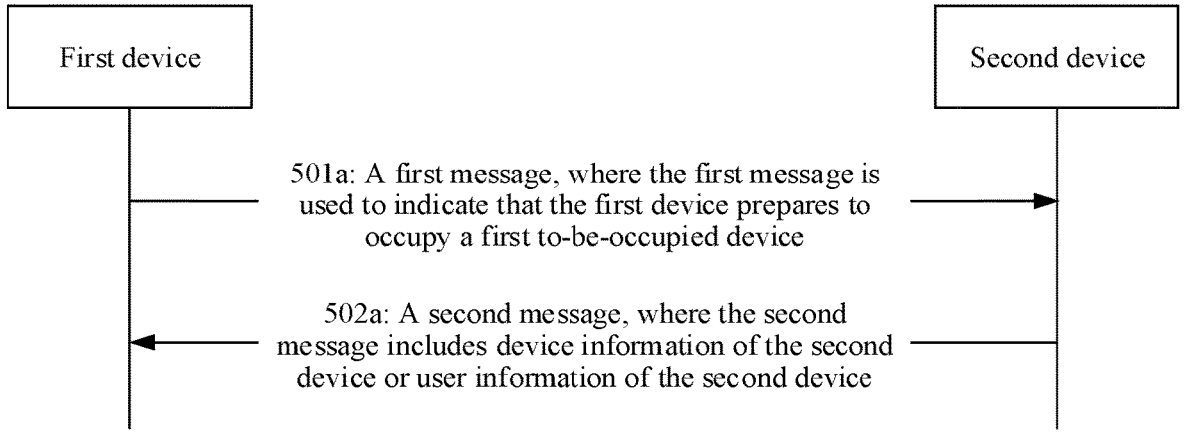
(a)
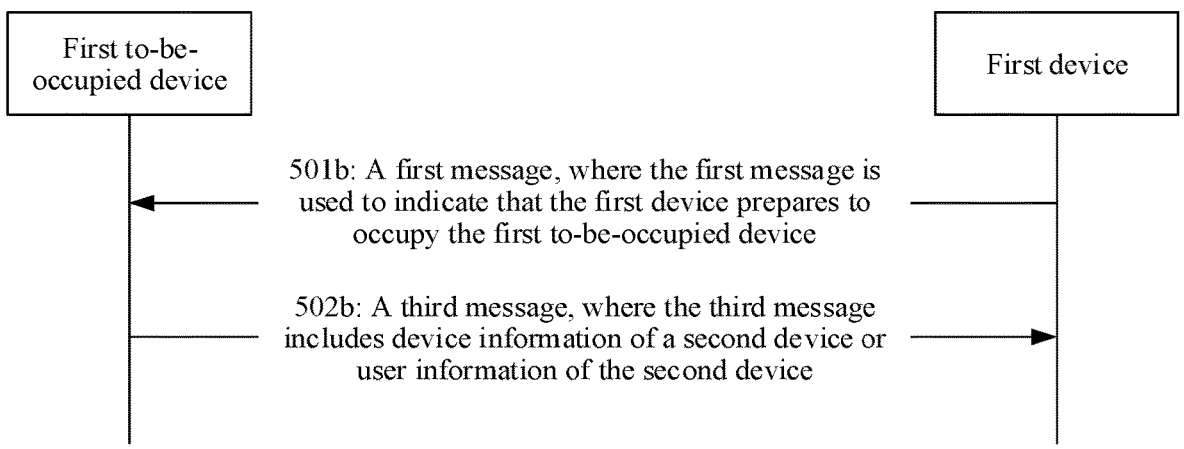
(b)
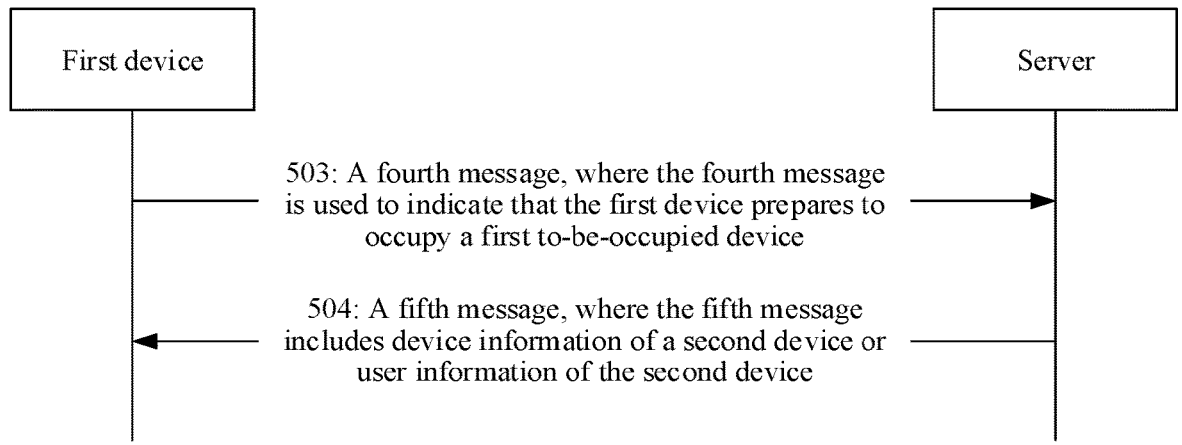
(c)
FIG. 5

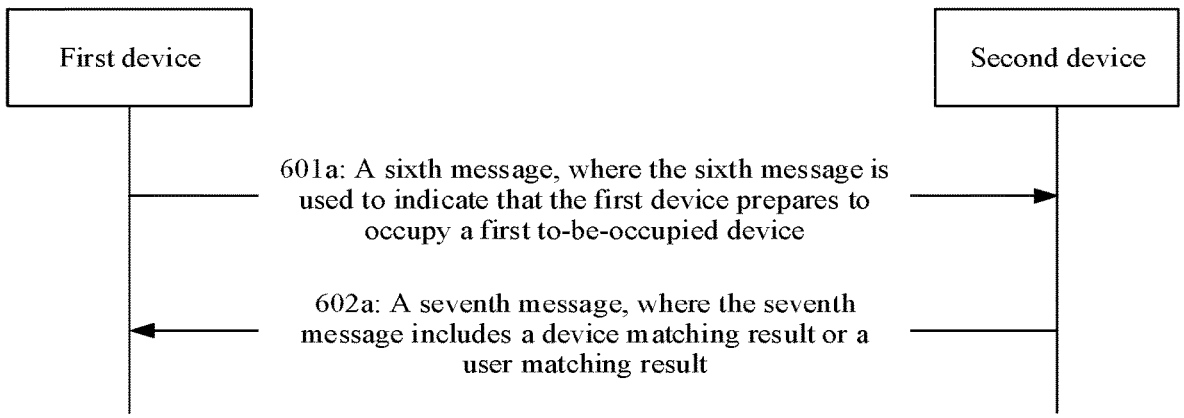
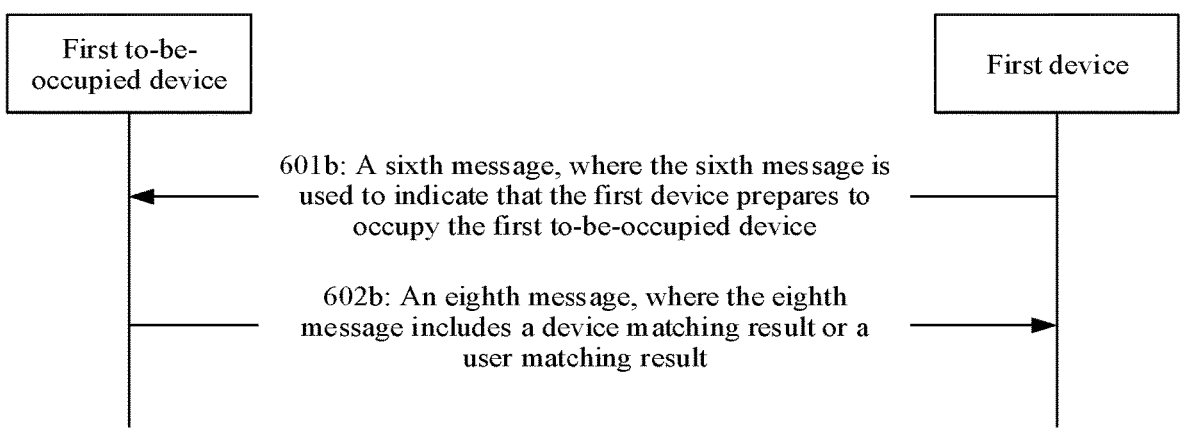
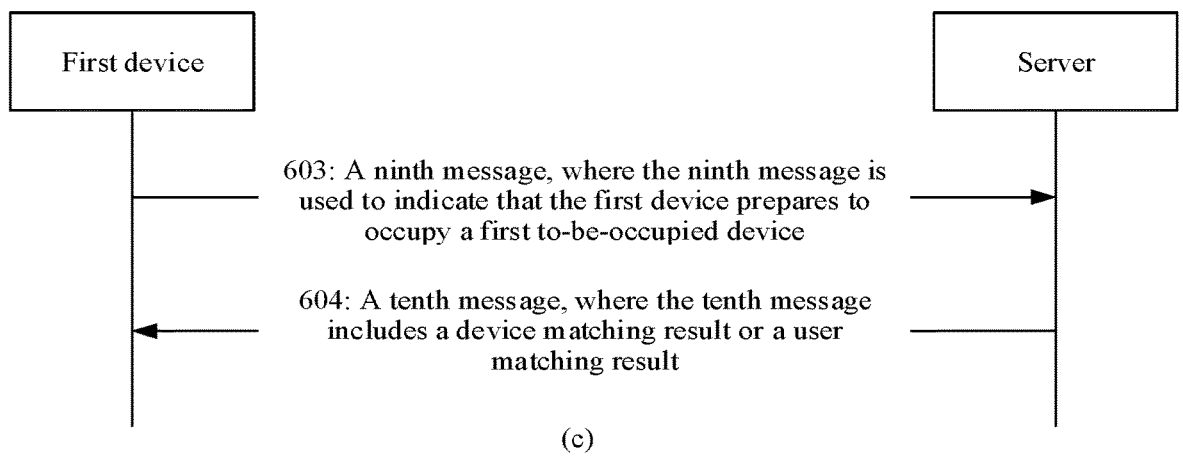
FIG. 6

2100

| A first device determines that a first to-be-occupied device is currently occupied by a second device, and the first device prepares to occupy the first to-be-occupied device | — 2101 |

| The first device sends a target message to obtain information related to the second device | — 2102 |

| When the first device fails to obtain the information related to the second device, the first device displays third prompt information, where the third prompt information is used to indicate that the second device is not a trusted device | — 2103 |

```
┌─────────────────────────────────────────────────────────┐
│  A first to-be-occupied device obtains information      │
│  related to a first device and a second device, where   │─ 2301
│  the first to-be-occupied device is currently occupied  │
│  by the second device, and the first device prepares    │
│  to occupy the first to-be-occupied device              │
└─────────────────────────────────────────────────────────┘
```

When the first to-be-occupied device determines, based on the information related to the first device and the second device, that the second device matches the first device, the first to-be-occupied device changes from an occupation state of being occupied by the second device to an occupation state of being occupied by the first device — 2302

When the second device fails to match the first device, or when the first to-be-occupied device fails to obtain the information related to the first device and the second device, the first to-be-occupied device continues to be occupied by the second device — 2303

When the second device matches the first device, and a priority of a first service is lower than a priority of a second service, the first to-be-occupied device continues to be occupied by the second device, where the first service is a service that is of the first device and that prepares to occupy the first to-be-occupied device, and the second service is a service that is of the second device and that currently occupies the first to-be-occupied device — 2304

A first device obtains information related to a first to-be-occupied device, where the first to-be-occupied device is currently occupied by a second device — 2201

The first device determines, based on the information related to the first to-be-occupied device, whether to occupy the first to-be-occupied device — 2202

DEVICE OCCUPATION METHOD AND ELECTRONIC DEVICE

CROSS-REFERENCE TO RELATED APPLICATIONS

This is a continuation of U.S. patent application Ser. No. 17/438,715 filed on Sep. 13, 2021, which is a National Stage of International Patent Application No. PCT/CN2020/139727 filed on Dec. 26, 2020, which claims priority to Chinese Patent Application No. 201911425298.X filed on Dec. 31, 2019. All of the aforementioned patent applications are hereby incorporated by reference in their entireties.

TECHNICAL FIELD

This application relates to the field of electronic devices, and more specifically, to a device occupation method and an electronic device.

BACKGROUND

An electronic device may exchange data with another electronic device over a wireless communications protocol. For example, by using a Bluetooth technology, a mobile phone may be connected to a Bluetooth headset, and send audio data being played by the mobile phone to the Bluetooth headset, so that the Bluetooth headset can play the audio data being played by the mobile phone.

When an electronic device 1 is successfully connected to an electronic device 2 over a wireless communications protocol, there may be an electronic device 3 that is to be connected to the electronic device 2 over the wireless communications protocol. The electronic device 2 probably cannot be connected to the electronic device 1 and the electronic device 3 at the same time. It is assumed that a connection between the electronic device 1 and the electronic device 2 is a wireless connection 1, and a connection between the electronic device 3 and the electronic device 2 is a wireless connection 2. If the electronic device 1 and the electronic device 3 are allowed to randomly occupy the electronic device 2, frequent switching between the wireless connection 1 and the wireless connection 2 occurs, which is unfavorable to user experience. If the electronic device 3 is prohibited from connecting to the electronic device 2 when the electronic device 1 is connected to the electronic device 2, flexible switching in a special scenario cannot be implemented, which is also unfavorable to user experience.

It is assumed that the electronic device 2 may be connected to both the electronic device 1 and the electronic device 3 over the wireless communications protocol. When the electronic device 1 is successfully connected to the electronic device 2 over the wireless communications protocol, the electronic device 2 can play audio 1 sent by the electronic device 1. When the electronic device 3 is successfully connected to the electronic device 2 over the wireless communications protocol, the electronic device 2 can play audio 2 sent by the electronic device 3. However, the electronic device 2 usually cannot play the audio 1 and the audio 2 at the same time. If the electronic device 2 randomly plays the audio 1 and the audio 2, or the electronic device 2 plays the audio 1 and the audio 2 in a data receiving sequence, a problem that a play effect does not meet a user expectation is likely to occur.

SUMMARY

This application provides a device occupation method and an electronic device, so that a process in which an electronic device occupies another device can better meet an expectation of a user.

According to a first aspect, a device occupation method is provided, including: A first device obtains information related to a first to-be-occupied device, where the first to-be-occupied device is currently occupied by a second device, user information of the first to-be-occupied device includes at least one of the following: first user information collected by the first to-be-occupied device, second user information obtained by the second device, a first user matching result between the first user information and user information of the first device, and a second user matching result between the second user information and the user information of the first device, the first user information indicates a user who currently uses the first to-be-occupied device, and the second user information indicates the user who currently uses the first to-be-occupied device; and the first device determines, based on the information related to the first to-be-occupied device, whether to occupy the first to-be-occupied device.

In this embodiment of this application, if the user matching result is obtained, it may be determined whether the user using the first to-be-occupied device and a user using the first device are a same user. In this way, a result that the first device occupies the first to-be-occupied device can reduce leakage of user privacy, and can better meet an expectation of the user.

With reference to the first aspect, that the first device determines, based on at least the information related to the first to-be-occupied device, whether to occupy the first to-be-occupied device includes: the first device occupies the first to-be-occupied device when a first condition is met; where the first condition includes at least one of the following: the first user information successfully matches the user information of the first device; and the second user information successfully matches the user information of the first device.

With reference to the first aspect, in some implementations of the first aspect, before the first device obtains the information related to the first to-be-occupied device, the method further includes: The first device broadcasts a first message, where the first message is used to indicate that the first device prepares to occupy the first to-be-occupied device. That a first device obtains information related to a first to-be-occupied device includes: The first device receives a second message that is sent by the second device in response to the first message, where the second message includes the first user information and/or the second user information.

With reference to the first aspect, in some implementations of the first aspect, before the first device obtains the information related to the first to-be-occupied device, the method further includes: The first device broadcasts a first message, where the first message is used to indicate that the first device prepares to occupy the first to-be-occupied device. That a first device obtains information related to a first to-be-occupied device includes: The first device receives a third message that is sent by the first to-be-occupied device in response to the first message, where the third message includes the first user information and/or the second user information.

With reference to the first aspect, in some implementations of the first aspect, before the first device obtains the information related to the first to-be-occupied device, the method further includes: The first device sends a fourth message to a server, where the fourth message is used to indicate that the first device prepares to occupy the first to-be-occupied device. That a first device obtains information related to a first to-be-occupied device includes: The first device receives a fifth message that is sent by the server in response to the fourth message, where the fifth message includes the first user information and/or the second user information.

With reference to the first aspect, in some implementations of the first aspect, before the first device obtains the information related to the first to-be-occupied device, the method further includes: The first device broadcasts a sixth message, where the sixth message includes the user information of the first device, and the sixth message is used to indicate that the first device prepares to occupy the first to-be-occupied device. That a first device obtains information related to a first to-be-occupied device includes: The first device receives a seventh message that is sent by the second device in response to the sixth message, where the seventh message includes the second user matching result.

With reference to the first aspect, in some implementations of the first aspect, before the first device obtains the information related to the first to-be-occupied device, the method further includes: The first device broadcasts a sixth message, where the sixth message includes the user information of the first device, and the sixth message is used to indicate that the first device prepares to occupy the first to-be-occupied device. That a first device obtains information related to a first to-be-occupied device includes: The first device receives an eighth message that is sent by the first to-be-occupied device in response to the sixth message, where the eighth message includes the first user matching result.

With reference to the first aspect, in some implementations of the first aspect, before the first device obtains the information related to the first to-be-occupied device, the method further includes: The first device sends a ninth message to a server, where the ninth message includes the user information of the first device, and the ninth message is used to indicate that the first device prepares to occupy the first to-be-occupied device. That a first device obtains information related to a first to-be-occupied device includes: The first device receives a tenth message that is sent by the server in response to the ninth message, where the tenth message includes the first user matching result and/or the second user matching result.

With reference to the first aspect, in some implementations of the first aspect, a first service of the first device prepares to occupy the first to-be-occupied device. Before the first device determines, based on the information related to the first to-be-occupied device, whether to occupy the first to-be-occupied device, the method further includes: The first device obtains a priority of a second service, where the second service is a service that is of the second device and that currently occupies the first to-be-occupied device. The determining, based on the information related to the first to-be-occupied device, whether to occupy the first to-be-occupied device includes: determining, based on the information related to the first to-be-occupied device, a priority of the first service, and the priority of the second service, whether to occupy the first to-be-occupied device.

With reference to the first aspect, in some implementations of the first aspect, the priority of the first service is determined based on at least one of an importance index of the first service, an applicability index of the first device, and a user preference index of the first service.

With reference to the first aspect, in some implementations of the first aspect, services in descending order of priorities are as follows: a call service, a video call service, an audio playing service, a video playing service, a recording service, and a photographing service.

With reference to the first aspect, in some implementations of the first aspect, the determining, based on the information related to the first to-be-occupied device, a priority of the first service, and the priority of the second service, whether to occupy the first to-be-occupied device includes: The first device occupies the first to-be-occupied device when a second condition is met, where the second condition includes any one of the following: the priority of the first service is higher than the priority of the second service; or the priority of the first service is lower than the priority of the second service, and the first device detects a second operation, where the first operation is used to indicate the first device to preempt the first to-be-occupied device.

With reference to the first aspect, in some implementations of the first aspect, when the first device determines to occupy the first to-be-occupied device, the method further includes: The first device displays first prompt information, where the first prompt information indicates that the first to-be-occupied device is occupied by the first device.

With reference to the first aspect, in some implementations of the first aspect, that the first device determines, based on the information related to the first to-be-occupied device, whether to occupy the first to-be-occupied device includes: The first device displays first prompt information based on the information related to the first to-be-occupied device, where the first prompt information indicates a relationship between the user currently using the first to-be-occupied device and the user currently using the first device, and the first prompt information provides an option for the user currently using the first device to choose whether to occupy the first to-be-occupied device; and in response to receiving a first operation performed, based on the first prompt information, by the user currently using the first device, the first device determines whether to occupy the first to-be-occupied device.

With reference to the first aspect, in some implementations of the first aspect, the first operation is an operation performed on the first device, the second device, or the first to-be-occupied device by the user currently using the first device.

With reference to the first aspect, in some implementations of the first aspect, the user information includes at least one of the following: auricle information, brainwave information, face information, voiceprint information, and electronic account information.

With reference to the first aspect, in some implementations of the first aspect, the first to-be-occupied device is any one of the following: a headset, a sound box, and a camera; or the first to-be-occupied device is a device including any one of the following elements: a headset, a sound box, and a camera.

With reference to the first aspect, in some implementations of the first aspect, the determining whether to occupy the first to-be-occupied device includes: The first device determines whether to occupy a media channel of the first to-be-occupied device.

According to a second aspect, a device occupation method is provided, including: A first device determines that a first to-be-occupied device is currently occupied by a second device, and the first device prepares to occupy the first to-be-occupied device; the first device sends a message to obtain information related to the first to-be-occupied device, where the information related to the first to-be-occupied device includes at least one of the following: first user information collected by the first to-be-occupied device, second user information obtained by the second device, a first user matching result between the first user information and user information of the first device, and a second user matching result between the second user information and the user information of the first device; and when the first device fails to obtain the information related to the first to-be-occupied device, the first device displays third prompt information, where the third prompt information is used to indicate that the first device cannot identify a user using the first to-be-occupied device.

With reference to the second aspect, in some implementations of the second aspect, the method further includes: When the first device fails to obtain the information related to the first to-be-occupied device, the first device gives up occupying the first to-be-occupied device.

With reference to the second aspect, in some implementations of the second aspect, the method further includes: After displaying the third prompt information, the first device occupies the first to-be-occupied device based on a detected second operation, where the second operation is used to indicate the first device to occupy the first to-be-occupied device.

According to a third aspect, a device occupation method is provided, including: A first device obtains information related to a second device, where the second device currently occupies a first to-be-occupied device, and the information related to the second device includes any one of the following: device information of the second device, a device matching result between device information of the first device and the device information of the second device, user information of the second device, and a user matching result between user information of the first device and the user information of the second device; the first device determines, based on the information related to the second device, whether the second device is a trusted device; and the first device occupies the first to-be-occupied device when the second device is the trusted device.

The first device may be, for example, a mobile phone, a tablet computer, a smartwatch, a video player, a desktop computer, or a television.

The first to-be-occupied device may be, for example, a headset, a sound box, or a camera.

The second device may be, for example, a mobile phone, a tablet computer, a smartwatch, a video player, a desktop computer, or a television.

The user information of the second device may be information about a user using the second device, or information about a user using the first to-be-occupied device.

Optionally, when the first to-be-occupied device can establish a wireless connection to only one device, an idle state of the first to-be-occupied device may mean that the first to-be-occupied device has not established a wireless connection to any device. A non-idle state of the first to-be-occupied device may mean that the first to-be-occupied device has established a wireless connection to the target device.

Optionally, when the first to-be-occupied device may establish wireless connections to a plurality of devices, an idle state of the first to-be-occupied device may mean that no device uses the first to-be-occupied device. A non-idle state of the first to-be-occupied device may mean that the target device that establishes a wireless connection to the first to-be-occupied device is using the first to-be-occupied device.

That the first device occupies the first to-be-occupied device may mean that the first device establishes a wireless connection to the first to-be-occupied device, and the first device uses the first to-be-occupied device.

In this embodiment of this application, if the second device is a trusted device, it may be considered that a user using the first device trusts the user using the second device. For example, when the user information of the second device successfully matches the user information of the first device, it may be considered that the user using the first device and the user using the first device are a same user. Therefore, a result that the first device occupies the first to-be-occupied device may be understood as a selection authorized by the user in advance, and an expectation of the user can be met more easily.

With reference to the third aspect, in some implementations of the third aspect, when the information related to the second device includes the device information of the second device or the device matching result between the device information of the first device and the device information of the second device, that the second device is a trusted device meets at least a condition that the device information of the second device successfully matches the device information of the first device; and when the information related to the second device includes the user information of the second device or the user matching result between the user information of the first device and the user information of the second device, that the second device is a trusted device meets at least a condition that the user information of the second device successfully matches the user information of the first device.

With reference to the third aspect, in some implementations of the third aspect, before the first device obtains the information related to the second device, the method further includes: The first device broadcasts a first message, where the first message is used to indicate that the first device prepares to occupy the first to-be-occupied device. That a first device obtains information related to a second device includes: The first device receives a second message that is sent by the second device in response to the first message, where the second message includes the device information of the second device or the user information of the second device, and the second message indicates that the first to-be-occupied device is currently occupied by the second device.

In this embodiment of this application, the first device may negotiate with the second device, so that when the first device occupies the first to-be-occupied device, the second device can learn in time that the first to-be-occupied device is occupied by the first device. The second device may feed back an occupation status of the first to-be-occupied device to the user in a timely manner, which helps improve user experience.

With reference to the third aspect, in some implementations of the third aspect, before the first device obtains the information related to the second device, the method further includes: The first device broadcasts a first message, where the first message is used to indicate that the first device prepares to occupy the first to-be-occupied device. That a first device obtains information related to a second device includes: The first device receives a third message that is sent by the first to-be-occupied device in response to the first message, where the third message includes the device information of the second device or the user information of the second device, and the third message indicates that the first to-be-occupied device is currently occupied by the second device.

In this embodiment of this application, when the target device occupies the first to-be-occupied device for the first time, the first to-be-occupied device may store user information of the target device. Therefore, the first to-be-occupied device may directly send the user information of the second device to the first device. This can reduce a quantity of signaling interaction times, help the first device quickly determine whether to occupy the first device, and further help improve user experience.

Optionally, the first message includes identification information of the first to-be-occupied device.

With reference to the third aspect, in some implementations of the third aspect, before the first device obtains the information related to the second device, the method further includes: The first device sends a fourth message to a server, where the fourth message is used to indicate that the first device prepares to occupy the first to-be-occupied device. That a first device obtains information related to a second device includes: The first device receives a fifth message that is sent by the server in response to the fourth message, where the fifth message includes the device information of the second device or the user information of the second device, and the fourth message indicates that the first to-be-occupied device is currently occupied by the second device.

The server may also be referred to as a cloud server. In other words, the first device may exchange data with the cloud server by using a wireless communication protocol.

Optionally, the fourth message includes identification information of the first to-be-occupied device.

In this embodiment of this application, to improve privacy of the user information, uploading the user information to the server with a relatively high security coefficient can reduce leakage of the user information.

With reference to the third aspect, in some implementations of the third aspect, before the first device obtains the information related to the second device, the method further includes: The first device broadcasts a sixth message, where the sixth message includes the device information of the first device or the user information of the first device, and the sixth message is used to indicate that the first device prepares to occupy the first to-be-occupied device. That a first device obtains information related to a second device includes: The first device receives a seventh message that is sent by the second device in response to the sixth message, where when the sixth message includes the device information of the first device, the seventh message includes the device matching result; or when the sixth message includes the user information of the first device, the seventh message includes the user matching result.

In this embodiment of this application, a data amount of the matching result is relatively small. In addition, the first device may negotiate with the second device, so that when the first device occupies the first to-be-occupied device, the second device may determine a reason why the first device can automatically occupy the first to-be-occupied device. Further, the user is prompted with the reason why the first device can automatically occupy the first to-be-occupied device, which helps improve user experience.

With reference to the third aspect, in some implementations of the third aspect, before the first device obtains the information related to the second device, the method further includes: The first device broadcasts a sixth message, where the sixth message includes the device information of the first device or the user information of the first device, and the sixth message is used to indicate that the first device prepares to occupy the first to-be-occupied device. That a first device obtains information related to a second device includes: The first device receives an eighth message that is sent by the first to-be-occupied device in response to the sixth message, where when the sixth message includes the device information of the first device, the eighth message includes the device matching result; or when the sixth message includes the user information of the first device, the eighth message includes the user matching result.

In this embodiment of this application, a data amount of the matching result is relatively small. When the target device occupies the first to-be-occupied device for the first time, the first to-be-occupied device may store user information of the target device. Therefore, the first to-be-occupied device may perform grouping based on user information, to distinguish devices whose user information does not match. The first to-be-occupied device may quickly determine whether the user information of the first device matches the user information of the second device. This helps the first device quickly determine whether to occupy the first device, and further helps improve user experience.

Optionally, the sixth message includes identification information of the first to-be-occupied device.

With reference to the third aspect, in some implementations of the third aspect, before the first device obtains the information related to the second device, the method further includes: The first device sends a ninth message to a server, where the ninth message includes the device information of the first device or the user information of the first device, and the ninth message is used to indicate that the first device prepares to occupy the first to-be-occupied device. That a first device obtains information related to a second device includes: The first device receives a tenth message that is sent by the server in response to the ninth message, where when the ninth message includes the device information of the first device, the tenth message includes the device matching result; or when the ninth message includes the user information of the first device, the tenth message includes the user matching result.

Optionally, the ninth message includes identification information of the first to-be-occupied device.

In this embodiment of this application, a data amount of the matching result is relatively small. A case such as a device type mismatch may exist between the second device and the first device. The server has stronger computing and storage capabilities, and may have a stronger capability of identifying user information. Therefore, directly receiving the matching result from the server can increase a possibility that the first device successfully obtains the matching result.

With reference to the third aspect, in some implementations of the third aspect, that the first device occupies the first to-be-occupied device when the second device is the trusted device includes: The first device occupies the first to-be-occupied device when the second device is the trusted device and a priority of a first service is higher than a priority of a second service, where a service that occupies the first to-be-occupied device changes from the second service to the first service, the first service is a service of the first device, and the second service is a service of the second device.

The first service may be, for example, a call service, a video call service, an audio playing service, a video playing service, a recording service, or a photographing service.

The second service may be, for example, a call service, a video call service, an audio playing service, a video playing service, a recording service, or a photographing service.

In this embodiment of this application, if the user using the first device and the user using the second device are a same user, and a service of the first device is more important or more suitable, the first device may occupy the first to-be-occupied device. Therefore, in addition to reducing a risk of privacy leakage and reducing operations related to switching an occupation status, the method in this embodiment can enable switching of the occupation status to better meet a scenario requirement, thereby improving user experience.

With reference to the third aspect, in some implementations of the third aspect, the priority of the first service is determined based on at least one of an importance index of the first service, an applicability index of the first device, and a user preference index of the first service.

In this embodiment of this application, different indication types are classified based on a specific scenario, and different services are scored, so that a priority of a service can be quickly and appropriately determined, and scenario applicability of the occupation status switching method provided in this application can be better reflected.

With reference to the third aspect, in some implementations of the third aspect, services in descending order of priorities are as follows: a call service, a video call service, an audio playing service, a video playing service, a recording service, and a photographing service.

With reference to the third aspect, in some implementations of the third aspect, that the first device occupies the first to-be-occupied device when the second device is the trusted device includes: The first device occupies the first to-be-occupied device based on a detected second operation when the second device is the trusted device and the priority of the first service is lower than the priority of the second service, where a service that occupies the first to-be-occupied device changes from the second service to the first service, the first service is a service of the first device, and the second service is a service of the second device.

Based on a specific scenario, that the priority of the first service is lower than the priority of the second service may include that the priority of the second service is equal to the priority of the first service.

That the priority of the first service is lower than the priority of the second service may include that the first device does not obtain a priority comparison result. The priority comparison result is a result of comparison between the priority of the second service and the priority of the first service.

In this embodiment of this application, if the first device does not meet a condition for automatically occupying the first to-be-occupied device, the first device may occupy the first to-be-occupied device based on an operation of the user. When the condition of automatic occupation is not met, the first device responds to an operation and occupies the first to-be-occupied device, so that flexibility of switching the occupation status of the first to-be-occupied device can be improved.

With reference to the third aspect, in some implementations of the third aspect, the method further includes: The first device displays first prompt information, where the first prompt information indicates that the first to-be-occupied device is occupied by the first device.

In this embodiment of this application, the first device may remind the user that the occupation status of the first to-be-occupied device is switched. Therefore, misoperations performed by the user on the first to-be-occupied device can be reduced, so that the user can clearly learn of the occupation status of the first to-be-occupied device.

With reference to the third aspect, in some implementations of the third aspect, that the first device occupies the first to-be-occupied device includes: The first device occupies the first to-be-occupied device based on a detected first operation.

In this embodiment of this application, an occasion for switching the occupation status of the first to-be-occupied device may be determined by the first operation. Therefore, flexibility of switching the occupation status can be improved.

With reference to the third aspect, in some implementations of the third aspect, the first operation is an operation performed by the user on the first device, the second device, or the first to-be-occupied device.

In this embodiment of this application, the first operation may be operations performed on a plurality of devices. Therefore, the user may perform the first operation on the plurality of devices, which is highly flexible and easier to adapt to a specific use scenario.

With reference to the third aspect, in some implementations of the third aspect, the user information of the second device includes at least one of the following: user information collected by the second device, and user information collected by the first to-be-occupied device in a process in which the second device occupies the first to-be-occupied device.

With reference to the third aspect, in some implementations of the third aspect, the user information of the second device includes at least one of the following: auricle information, brainwave information, face information, voiceprint information, and electronic account information.

With reference to the third aspect, in some implementations of the third aspect, the first to-be-occupied device is any one of the following: a headset, a sound box, and a camera.

With reference to the third aspect, in some implementations of the third aspect, that the first device occupies the first to-be-occupied device includes: The first device occupies a media channel of the first to-be-occupied device.

In this embodiment of this application, one or more types may be used to determine whether the user information of the second device matches the user information of the first device. In one aspect, there are various types of user information and a plurality of applicable scenarios. In another aspect, performing matching on a plurality of types of user information can improve accuracy of a matching process.

According to a fourth aspect, a device occupation method is provided, including: A first device determines that a first to-be-occupied device is currently occupied by a second device, and the first device prepares to occupy the first to-be-occupied device; the first device sends a target message to obtain information related to the second device, where the information related to the second device includes any one of the following: device information of the second device, a device matching result between device information of the first device and the device information of the second device, user information of the second device, and a user matching result between user information of the first device and the user information of the second device; and when the first device fails to obtain the information related to the second device, or when the first device determines, based on the information related to the second device, that the second device is not a trusted device, the first device displays third prompt information, where the third prompt information is used to indicate that the second device is not the trusted device.

In this embodiment of this application, the first device may remind the user that a reason why the first device cannot automatically occupy the first to-be-occupied device is that the user information of the second device fails to match the user information of the first device. In this way, the user can adapt, based on the third prompt information, to a plurality of scenarios in which the first device automatically occupies the first to-be-occupied device and a plurality of scenarios in which the first device cannot automatically occupy the first to-be-occupied device.

That the user information of the second device fails to match the user information of the first device may mean that a user indicated by the user information of the second device is different from a user indicated by the user information of the first device, or the first device fails to obtain the user matching information, or the first device cannot identify the user information of the second device.

With reference to the fourth aspect, in some implementations of the fourth aspect, the method further includes: The first device gives up occupying the first to-be-occupied device.

In this embodiment of this application, if the user information of the second device fails to match the user information of the first device, it may be considered that a user who uses the second device and a user who uses the first device are different users. Therefore, the first device gives up occupying the first to-be-occupied device, which helps reduce a risk of leaking user privacy.

With reference to the fourth aspect, in some implementations of the fourth aspect, the method further includes: The first device occupies the first to-be-occupied device based on a detected second operation.

In this embodiment of this application, if the first device does not meet a condition for automatically occupying the first to-be-occupied device, the first device may occupy the first to-be-occupied device based on an operation of the user. When the condition of automatic occupation is not met, the first device responds to an operation and occupies the first to-be-occupied device, so that flexibility of switching the occupation status of the first to-be-occupied device can be improved.

According to a fifth aspect, a device occupation method is provided, including: A second device obtains user matching information for a first device and the second device, where the user matching information is used for matching between user information of the first device and user information of the second device; the first device prepares to occupy a first to-be-occupied device, where an occupation status of the first to-be-occupied device is currently a non-idle state of being occupied by the second device; and when the user matching information indicates that the user information of the second device matches the user information of the first device, the second device gives up occupying the first to-be-occupied device, where the changed occupation status is a non-idle state of being occupied by the first device.

With reference to the fifth aspect, in some implementations of the fifth aspect, the user matching information includes the user information of the first device, and that the second device obtains the user matching information includes: The second device receives an eleventh message sent by the first device or a server, where the eleventh message includes the user information of the first device and identification information of the first to-be-occupied device.

With reference to the fifth aspect, in some implementations of the fifth aspect, the user matching information includes the user information of the first device, and that the second device obtains the user matching information includes: The second device receives a twelfth message sent by the first to-be-occupied device, where the twelfth message includes the user information of the first device.

With reference to the fifth aspect, in some implementations of the fifth aspect, the user matching information includes a matching result between the user information of the second device and the user information of the first device. Before the second device obtains the user matching information, the method further includes: The second device sends a thirteenth message to the first device, where the thirteenth message includes the user information of the second device. That the second device obtains the user matching information includes: The second device receives a fourteenth message sent by the first device, where the fourteenth message includes the matching result.

With reference to the fifth aspect, in some implementations of the fifth aspect, that the second device obtains the user matching information includes: The second device receives a fifteenth message sent by the first to-be-occupied device, where the fifteenth message includes the matching result.

With reference to the fifth aspect, in some implementations of the fifth aspect, the user matching information includes a matching result between the user information of the second device and the user information of the first device. Before the second device obtains the user matching information, the method further includes: The second device sends a sixteenth message to a server, where the sixteenth message includes the user information of the second device. That the second device obtains the user matching information includes: The second device receives a seventeenth message sent by the server, where the seventeenth message includes the matching result.

With reference to the fifth aspect, in some implementations of the fifth aspect, that when the user matching information indicates that the user information of the second device matches the user information of the first device, the second device gives up occupying the first to-be-occupied device includes: When the user matching information indicates that the user information of the second device matches the user information of the first device, and a priority of a first service is higher than a priority of a second service, the second device gives up occupying the first to-be-occupied device, where the first service is a service of the first device, the second service is a service of the second device, and both the first service and the second service are used to occupy the first to-be-occupied device.

With reference to the fifth aspect, in some implementations of the fifth aspect, the priority of the first service is determined based on at least one of an importance index of the first service, an applicability index of the first device, and a user preference index of the first service.

With reference to the fifth aspect, in some implementations of the fifth aspect, that when the user matching information indicates that the user information of the second device matches the user information of the first device, the second device gives up occupying the first to-be-occupied device includes: When the user matching information indicates that the user information of the second device matches the user information of the first device, and a priority of a first service is lower than a priority of a second service, the second device gives up occupying the first to-be-occupied device based on a second operation, where the first service is a service of the first device, the second service is a service of the second device, and both the first service and the second service are used to occupy the first to-be-occupied device.

With reference to the fifth aspect, in some implementations of the fifth aspect, the method further includes: The second device displays second prompt information, where the second prompt information indicates that the first to-be-occupied device is occupied by the first device.

With reference to the fifth aspect, in some implementations of the fifth aspect, that the second device gives up occupying the first to-be-occupied device includes: The second device gives up occupying the first to-be-occupied device based on a first operation.

With reference to the fifth aspect, in some implementations of the fifth aspect, the first operation is an operation performed by a user on the first device, the second device, or the first to-be-occupied device.

With reference to the fifth aspect, in some implementations of the fifth aspect, the user information includes at least one of the following: auricle information, brainwave information, face information, voiceprint information, and electronic account information.

According to a sixth aspect, a device occupation method is provided, including: A second device obtains user matching information for a first device and the second device, where the user matching information is used for matching between user information of the first device and user information of the second device, the first device prepares to occupy a first to-be-occupied device, and an occupation status of the first to-be-occupied device is currently a non-idle state of being occupied by the second device; and when the user matching information indicates that the user information of the second device fails to match the user information of the first device, the second device displays fourth prompt information, where the fourth prompt information is used to indicate that the user information of the second device fails to match the user information of the first device.

With reference to the sixth aspect, in some implementations of the sixth aspect, the method further includes: The second device continues to occupy the first to-be-occupied device.

With reference to the sixth aspect, in some implementations of the sixth aspect, the method further includes: The second device gives up occupying the first to-be-occupied device based on a second operation, where the changed occupation status is a non-idle state of being occupied by the first device.

According to a seventh aspect, a device occupation method is provided, including: A first to-be-occupied device obtains user matching information for a first device and a second device, where the user matching information is used for matching between user information of the first device and user information of the second device, an occupation status of the first to-be-occupied device is currently a non-idle state of being occupied by the second device, and the first device prepares to occupy the first to-be-occupied device; and when the user matching information indicates that the user information of the second device matches the user information of the first device, the first to-be-occupied device changes the occupation status, where the changed occupation status is a non-idle state of being occupied by the first device.

With reference to the seventh aspect, in some implementations of the seventh aspect, the user matching information includes the user information of the first device and the user information of the second device. That a first to-be-occupied device obtains user matching information for a first device and a second device includes: The first to-be-occupied device receives the user information of the first device that is sent by the first device; and the first to-be-occupied device receives the user information of the second device that is sent by the second device.

With reference to the seventh aspect, in some implementations of the seventh aspect, the user matching information includes the user information of the first device and the user information of the second device. That a first to-be-occupied device obtains user matching information for a first device and a second device includes: The first to-be-occupied device receives the user information of the first device and the user information of the second device that are sent by a server.

With reference to the seventh aspect, in some implementations of the seventh aspect, the user matching information includes a matching result between the user information of the first device and the user information of the second device. That a first to-be-occupied device obtains user matching information for a first device and a second device includes: The first to-be-occupied device receives the matching result sent by the first device, the second device, or a server.

With reference to the seventh aspect, in some implementations of the seventh aspect, that when the user matching information indicates that the user information of the second device matches the user information of the first device, the first to-be-occupied device changes the occupation status of the first to-be-occupied device includes: When the user matching information indicates that the user information of the second device matches the user information of the first device, and a priority of a first service is higher than a priority of a second service, the first to-be-occupied device changes the occupation status of the first to-be-occupied device, where the first service is a service of the first device, the second service is a service of the second device, and both the first service and the second service are used to occupy the first to-be-occupied device.

With reference to the seventh aspect, in some implementations of the seventh aspect, the priority of the first service is determined based on at least one of an importance index of the first service, an applicability index of the first device, and a user preference index of the first service.

With reference to the seventh aspect, in some implementations of the seventh aspect, that when the user matching information indicates that the user information of the second device matches the user information of the first device, the first to-be-occupied device changes the occupation status of the first to-be-occupied device includes: When the user matching information indicates that the user information of the second device matches the user information of the first device, and a priority of a first service is lower than a priority of a second service, the first to-be-occupied device changes the occupation status of the first to-be-occupied device based on a second operation, where the first service is a service of the first device, the second service is a service of the second device, and both the first service and the second service are used to occupy the first to-be-occupied device.

With reference to the seventh aspect, in some implementations of the seventh aspect, that the first to-be-occupied device changes the occupation status of the first to-be-occupied device includes: The first to-be-occupied device changes the occupation status of the first to-be-occupied device based on a first operation.

With reference to the seventh aspect, in some implementations of the seventh aspect, the first operation is an operation performed by a user on the first device, the second device, or the first to-be-occupied device.

With reference to the seventh aspect, in some implementations of the seventh aspect, the user information includes at least one of the following: auricle information, brainwave information, face information, voiceprint information, and electronic account information.

According to an eighth aspect, a device occupation method is provided, including: A first to-be-occupied device obtains user matching information for a first device and a second device, where the user matching information is used for matching between user information of the first device and user information of the second device, an occupation status of the first to-be-occupied device is currently a non-idle state of being occupied by the second device, and the first device prepares to occupy the first to-be-occupied device; and when the user matching information indicates that the user information of the second device fails to match the user information of the first device, the first to-be-occupied device gives up changing the occupation status of the first to-be-occupied device.

According to a ninth aspect, a device occupation method is provided, including: A first to-be-occupied device obtains user matching information for a first device and a second device, where the user matching information is used for matching between user information of the first device and user information of the second device, the second device currently occupies the first to-be-occupied device, and the first device prepares to occupy the first to-be-occupied device; and when the user matching information indicates that the user information of the second device fails to match the user information of the first device, the first to-be-occupied device changes the occupation status based on a second operation, where the changed occupation status is a non-idle state of being occupied by the first device.

According to a tenth aspect, an electronic device is provided, including: an obtaining module, configured to obtain information related to a second device, where the second device currently occupies a first to-be-occupied device, and the information related to the second device includes any one of the following: device information of the second device, a device matching result between device information of the first device and the device information of the second device, user information of the second device, and a user matching result between user information of the first device and the user information of the second device; and a processing module, configured to determine, based on the information related to the second device, whether the second device is a trusted device. The processing module is further configured to occupy the first to-be-occupied device when the second device is the trusted device.

With reference to the tenth aspect, in some implementations of the tenth aspect, when the information related to the second device includes the device information of the second device or the device matching result between the device information of the first device and the device information of the second device, that the second device is a trusted device meets at least a condition that the device information of the second device successfully matches the device information of the first device; and when the information related to the second device includes the user information of the second device or the user matching result between the user information of the first device and the user information of the second device, that the second device is a trusted device meets at least a condition that the user information of the second device successfully matches the user information of the first device.

With reference to the tenth aspect, in some implementations of the tenth aspect, the electronic device further includes: a sending module, configured to broadcast a first message before the obtaining module obtains the information related to the second device. The first message is used to indicate that the first device prepares to occupy the first to-be-occupied device. The obtaining module is specifically configured to receive a second message that is sent by the second device in response to the first message, where the second message includes the device information of the second device or the user information of the second device, and the second message indicates that the first to-be-occupied device is currently occupied by the second device.

With reference to the tenth aspect, in some implementations of the tenth aspect, the electronic device further includes: a sending module, configured to broadcast a first message before the obtaining module obtains the information related to the second device. The first message is used to indicate that the first device prepares to occupy the first to-be-occupied device. The obtaining module is specifically configured to receive a third message that is sent by the first to-be-occupied device in response to the first message, where the third message includes the device information of the second device or the user information of the second device, and the third message indicates that the first to-be-occupied device is currently occupied by the second device.

With reference to the tenth aspect, in some implementations of the tenth aspect, the electronic device further includes: a sending module, configured to send a fourth message to a server before the obtaining module obtains the information related to the second device. The fourth message is used to indicate that the first device prepares to occupy the first to-be-occupied device. The obtaining module is specifically configured to receive a fifth message that is sent by the server in response to the fourth message, where the fifth message includes the device information of the second device or the user information of the second device, and the fourth message indicates that the first to-be-occupied device is currently occupied by the second device.

With reference to the tenth aspect, in some implementations of the tenth aspect, the electronic device further includes: a sending module, configured to broadcast a sixth message before the obtaining module obtains the information related to the second device. The sixth message includes the device information of the first device or the user information of the first device, and the sixth message is used to indicate that the first device prepares to occupy the first to-be-occupied device. The obtaining module is specifically configured to receive a seventh message that is sent by the second device in response to the sixth message, where when the sixth message includes the device information of the first device, the seventh message includes the device matching result; or when the sixth message includes the user information of the first device, the seventh message includes the user matching result.

With reference to the tenth aspect, in some implementations of the tenth aspect, the electronic device further includes: a sending module, configured to broadcast a sixth message before the obtaining module obtains the information related to the second device. The sixth message includes the device information of the first device or the user information of the first device, and the sixth message is used to indicate that the first device prepares to occupy the first to-be-occupied device. The obtaining module is specifically configured to receive an eighth message that is sent by the first to-be-occupied device in response to the sixth message, where when the sixth message includes the device information of the first device, the eighth message includes the device matching result; or when the sixth message includes the user information of the first device, the eighth message includes the user matching result.

With reference to the tenth aspect, in some implementations of the tenth aspect, the electronic device further includes: a sending module, configured to send a ninth message to a server before the obtaining module obtains the information related to the second device. The ninth message includes the device information of the first device or the user information of the first device, and the ninth message is used to indicate that the first device prepares to occupy the first to-be-occupied device. The obtaining module is specifically configured to receive a tenth message that is sent by the server in response to the ninth message, where when the ninth message includes the device information of the first device, the tenth message includes the device matching result; or when the ninth message includes the user information of the first device, the tenth message includes the user matching result.

With reference to the tenth aspect, in some implementations of the tenth aspect, the processing module is specifically configured to occupy the first to-be-occupied device when the second device is the trusted device and a priority of a first service is higher than a priority of a second service, where a service that occupies the first to-be-occupied device changes from the second service to the first service. The first service is a service of the first device, and the second service is a service of the second device.

With reference to the tenth aspect, in some implementations of the tenth aspect, the priority of the first service is determined based on at least one of an importance index of the first service, an applicability index of the first device, and a user preference index of the first service.

With reference to the tenth aspect, in some implementations of the tenth aspect, services in descending order of priorities are as follows: a call service, a video call service, an audio playing service, a video playing service, a recording service, and a photographing service.

With reference to the tenth aspect, in some implementations of the tenth aspect, the processing module is specifically configured to occupy, by the first device, the first to-be-occupied device based on a detected second operation when the second device is the trusted device and a priority of a first service is lower than a priority of a second service, where a service that occupies the first to-be-occupied device changes from the second service to the first service. The first service is a service of the first device, and the second service is a service of the second device.

With reference to the tenth aspect, in some implementations of the tenth aspect, the processing module is further configured to display, by the first device, first prompt information, where the first prompt information indicates that the first to-be-occupied device is occupied by the first device.

With reference to the tenth aspect, in some implementations of the tenth aspect, the processing module is specifically configured to occupy, by the first device, the first to-be-occupied device based on a detected first operation.

With reference to the tenth aspect, in some implementations of the tenth aspect, the first operation is an operation performed by a user on the first device, the second device, or the first to-be-occupied device.

With reference to the tenth aspect, in some implementations of the tenth aspect, the user information of the second device includes at least one of the following: user information collected by the second device, and user information collected by the first to-be-occupied device in a process in which the second device occupies the first to-be-occupied device.

With reference to the tenth aspect, in some implementations of the tenth aspect, the user information of the second device includes at least one of the following: auricle information, brainwave information, face information, voiceprint information, and electronic account information.

With reference to the tenth aspect, in some implementations of the tenth aspect, the first to-be-occupied device is any one of the following: a headset, a sound box, and a camera.

With reference to the tenth aspect, in some implementations of the tenth aspect, the processing module is specifically configured to occupy a media channel of the first to-be-occupied device.

According to an eleventh aspect, an electronic device is provided, including: a processing module, configured to determine that a first to-be-occupied device is currently occupied by a second device, where the first device prepares to occupy the first to-be-occupied device; and a sending module, configured to send a target message to obtain information related to the second device, where the information related to the second device includes any one of the following: device information of the second device, a device matching result between device information of the first device and the device information of the second device, user information of the second device, and a user matching result between user information of the first device and the user information of the second device. The processing module is further configured to display third prompt information when the first device fails to obtain the information related to the second device, or when the first device determines, based on the information related to the second device, that the second device is not a trusted device. The third prompt information is used to indicate that the second device is not the trusted device.

With reference to the eleventh aspect, in some implementations of the eleventh aspect, the processing module is further configured to give up occupying the first to-be-occupied device.

With reference to the eleventh aspect, in some implementations of the eleventh aspect, the processing module is further configured to occupy the first to-be-occupied device based on a detected second operation.

According to a twelfth aspect, an electronic device is provided, including: an obtaining module, configured to obtain user matching information for a first device and the electronic device, where the user matching information is used for matching between user information of the first device and user information of the second device, the first device prepares to occupy a first to-be-occupied device, and an occupation status of the first to-be-occupied device is currently a non-idle state of being occupied by the second device; and a processing module, configured to give up occupying the first to-be-occupied device when the user matching information indicates that the user information of the electronic device matches the user information of the first device, where the changed occupation status is a non-idle state of being occupied by the first device.

With reference to the twelfth aspect, in some implementations of the twelfth aspect, the user matching information includes the user information of the first device. The obtaining module is specifically configured to receive the user information of the first device that is sent by the first device, the first to-be-occupied device, or a server.

With reference to the twelfth aspect, in some implementations of the twelfth aspect, the user matching information includes a matching result between the user information of the electronic device and the user information of the first device. The electronic device further includes a sending module, configured to send the user information of the electronic device to the first device before the obtaining module obtains the user matching information. The obtaining module is specifically configured to receive the matching result sent by the first device.

With reference to the twelfth aspect, in some implementations of the twelfth aspect, the obtaining module is specifically configured to receive the matching result sent by the first to-be-occupied device.

With reference to the twelfth aspect, in some implementations of the twelfth aspect, the user matching information includes a matching result between the user information of the electronic device and the user information of the first device. The electronic device further includes a sending module, configured to send the user information of the electronic device to the server before the obtaining module obtains the user matching information. The obtaining module is specifically configured to receive the matching result sent by the server.

With reference to the twelfth aspect, in some implementations of the twelfth aspect, the processing module is specifically configured to give up occupying the first to-be-occupied device when the user matching information indicates that the user information of the electronic device matches the user information of the first device and a priority of a first service is higher than a priority of a second service. The first service is a service of the first device, the second service is a service of the electronic device, and both the first service and the second service are used to occupy the first to-be-occupied device.

With reference to the twelfth aspect, in some implementations of the twelfth aspect, the priority of the first service is determined based on at least one of an importance index of the first service, an applicability index of the first device, and a user preference index of the first service.

With reference to the twelfth aspect, in some implementations of the twelfth aspect, the processing module is further configured to display second prompt information, where the second prompt information indicates that the first to-be-occupied device is occupied by the first device.

With reference to the twelfth aspect, in some implementations of the twelfth aspect, the processing module is specifically configured to give up occupying the first to-be-occupied device based on a first operation.

With reference to the twelfth aspect, in some implementations of the twelfth aspect, the first operation is an operation performed by a user on the first device, the second device, or the first to-be-occupied device.

With reference to the twelfth aspect, in some implementations of the twelfth aspect, the processing module is specifically configured to give up occupying the first to-be-occupied device based on a second operation when the user matching information indicates that the user information of the electronic device matches the user information of the first device and a priority of a first service is lower than a priority of a second service. The first service is a service of the first device, the second service is a service of the electronic device, and both the first service and the second service are used to occupy the first to-be-occupied device.

With reference to the twelfth aspect, in some implementations of the twelfth aspect, the user information includes at least one of the following: auricle information, brainwave information, face information, voiceprint information, and electronic account information.

According to a thirteenth aspect, an electronic device is provided, including: an obtaining module, configured to obtain user matching information for a first device and the electronic device, where the user matching information is used for matching between user information of the first device and user information of the second device, the first device prepares to occupy a first to-be-occupied device, and an occupation status of the first to-be-occupied device is currently a non-idle state of being occupied by the second device; and a processing module, configured to display fourth prompt information when the user matching information indicates that the user information of the electronic device fails to match the user information of the first device, where the fourth prompt information is used to indicate that the user information of the electronic device fails to match the user information of the first device.

With reference to the thirteenth aspect, in some implementations of the thirteenth aspect, the processing module is specifically configured to continue to occupy the first to-be-occupied device.

With reference to the thirteenth aspect, in some implementations of the thirteenth aspect, the processing module is specifically configured to give up occupying the first to-be-occupied device based on a second operation, where the changed occupation status is a non-idle state of being occupied by the first device.

According to a fourteenth aspect, an electronic device is provided, including: an obtaining module, configured to obtain user matching information for a first device and a second device, where the user matching information is used for matching between user information of the first device and user information of the second device, an occupation status of the first to-be-occupied device is currently a non-idle state of being occupied by the second device, and the first device prepares to occupy the first to-be-occupied device; and a processing module, configured to change the occupation status of the electronic device when the user matching information indicates that the user information of the second device matches the user information of the first device, where the changed occupation status is a non-idle state of being occupied by the first device.

With reference to the fourteenth aspect, in some implementations of the fourteenth aspect, the user matching information includes the user information of the first device and the user information of the second device, and the obtaining module is specifically configured to receive the user information of the first device that is sent by the first device, and receive the user information of the second device that is sent by the second device.

With reference to the fourteenth aspect, in some implementations of the fourteenth aspect, the user matching information includes the user information of the first device and the user information of the second device, and the obtaining module is specifically configured to receive the user information of the first device and the user information of the second device that are sent by a server.

With reference to the fourteenth aspect, in some implementations of the fourteenth aspect, the user matching information includes a matching result between the user information of the second device and the user information of the first device, and the obtaining module is specifically configured to receive the matching result sent by the first device, the second device, or the server.

With reference to the fourteenth aspect, in some implementations of the fourteenth aspect, the processing module is specifically configured to change the occupation status of the electronic device when the user matching information indicates that the user information of the second device matches the user information of the first device, and a priority of a first service is higher than a priority of a second service. The first service is a service of the first device, the second service is a service of the second device, and both the first service and the second service are used to occupy the electronic device.

With reference to the fourteenth aspect, in some implementations of the fourteenth aspect, the priority of the first service is determined based on at least one of an importance index of the first service, an applicability index of the first device, and a user preference index of the first service.

With reference to the fourteenth aspect, in some implementations of the fourteenth aspect, the processing module is specifically configured to change the occupation status of the electronic device based on a first operation.

With reference to the fourteenth aspect, in some implementations of the fourteenth aspect, the first operation is an operation performed by a user on the first device, the second device, or the electronic device.

With reference to the fourteenth aspect, in some implementations of the fourteenth aspect, the processing module is specifically configured to change the occupation status of the electronic device based on a second operation when the user matching information indicates that the user information of the second device matches the user information of the first device and a priority of the first service is lower than a priority of the second service. The first service is a service of the first device, the second service is a service of the second device, and both the first service and the second service are used to occupy the electronic device.

With reference to the fourteenth aspect, in some implementations of the fourteenth aspect, the user information includes at least one of the following: auricle information, brainwave information, face information, voiceprint information, and electronic account information.

According to a fifteenth aspect, an electronic device is provided, including: an obtaining module, configured to obtain user matching information for a first device and a second device, where the user matching information is used for matching between user information of the first device and user information of the second device, an occupation status of the first to-be-occupied device is currently a non-idle state of being occupied by the second device, and the first device prepares to occupy the first to-be-occupied device; and a processing module, configured to give up changing the occupation status of the electronic device when the user matching information indicates that the user information of the second device fails to match the user information of the first device.

According to a sixteenth aspect, an electronic device is provided, including: an obtaining module, configured to obtain user matching information for a first device and a second device, where the user matching information is used for matching between user information of the first device and user information of the second device, the second device currently occupies the first to-be-occupied device, and the first device prepares to occupy the first to-be-occupied device; and a processing module, configured to change an occupation status of the electronic device based on a second operation when the user matching information indicates that the user information of the second device fails to match the user information of the first device, where the changed occupation status is a non-idle state of being occupied by the first device.

According to a seventeenth aspect, an electronic device is provided, including a processor, a memory, and a transceiver. The memory is configured to store a computer program, and the processor is configured to execute the computer program stored in the memory. The transceiver is configured to obtain information related to a first to-be-occupied device, where the first to-be-occupied device is currently occupied by a second device, and user information of the first to-be-occupied device includes at least one of the following: first user information collected by the first to-be-occupied device, second user information obtained by the second device, a first user matching result between the first user information and user information of the first device, and a second user matching result between the second user information and the user information of the first device. The processor is configured to determine, based on the information related to the first to-be-occupied device, whether the first device occupies the first to-be-occupied device. The first user information indicates a user currently using the first to-be-occupied device, and the second user information indicates a user currently using the first to-be-occupied device.

With reference to the seventeenth aspect, in some implementations of the seventeenth aspect, the processor is specifically configured to occupy, by the first device, the first to-be-occupied device when a first condition is met. The first condition includes at least one of the following: The first user information successfully matches the user information of the first device; and the second user information successfully matches the user information of the first device.

With reference to the seventeenth aspect, in some implementations of the seventeenth aspect, the transceiver is further configured to broadcast a first message before the transceiver obtains the information related to the first to-be-occupied device, where the first message is used to indicate that the first device prepares to occupy the first to-be-occupied device. The transceiver is specifically configured to receive a second message that is sent by the second device in response to the first message, where the second message includes the first user information and/or the second user information.

With reference to the seventeenth aspect, in some implementations of the seventeenth aspect, the transceiver is further configured to broadcast a first message before the transceiver obtains the information related to the first to-be-occupied device, where the first message is used to indicate that the first device prepares to occupy the first to-be-occupied device. The transceiver is specifically configured to receive a third message that is sent by the first to-be-occupied device in response to the first message, where the third message includes the first user information and/or the second user information.

With reference to the seventeenth aspect, in some implementations of the seventeenth aspect, the transceiver is further configured to send a fourth message to a server before the transceiver obtains the information related to the first to-be-occupied device, where the fourth message is used to indicate that the first device prepares to occupy the first to-be-occupied device. The transceiver is specifically configured to receive a fifth message that is sent by the server in response to the fourth message, where the fifth message includes the first user information and/or the second user information.

With reference to the seventeenth aspect, in some implementations of the seventeenth aspect, the transceiver is further configured to broadcast a sixth message before the transceiver obtains the information related to the first to-be-occupied device, where the sixth message includes the user information of the first device, and the sixth message is used to indicate that the first device prepares to occupy the first to-be-occupied device. The transceiver is specifically configured to receive a seventh message that is sent by the second device in response to the sixth message, where the seventh message includes the second user matching result.

With reference to the seventeenth aspect, in some implementations of the seventeenth aspect, the transceiver is further configured to broadcast a sixth message before the transceiver obtains the information related to the first to-be-occupied device, where the sixth message includes the user information of the first device, and the sixth message is used to indicate that the first device prepares to occupy the first to-be-occupied device. The transceiver is specifically configured to receive an eighth message that is sent by the first to-be-occupied device in response to the sixth message, where the eighth message includes the first user matching result.

With reference to the seventeenth aspect, in some implementations of the seventeenth aspect, the transceiver is further configured to send a ninth message to a server before the transceiver obtains the information related to the first to-be-occupied device, where the ninth message includes the user information of the first device, and the ninth message is used to indicate that the first device prepares to occupy the first to-be-occupied device. The transceiver is specifically configured to receive a tenth message that is sent by the server in response to the ninth message, where the tenth message includes the first user matching result and/or the second user matching result.

With reference to the seventeenth aspect, in some implementations of the seventeenth aspect, a first service of the first device prepares to occupy the first to-be-occupied device. The transceiver is further configured to obtain a priority of a second service before the processor determines, based on the information related to the first to-be-occupied device, whether to occupy the first to-be-occupied device, where the second service is a service that is of the second device and that currently occupies the first to-be-occupied device. The processor is specifically configured to determine, based on the information related to the first to-be-occupied device, a priority of the first service, and the priority of the second service, whether to occupy the first to-be-occupied device.

With reference to the seventeenth aspect, in some implementations of the seventeenth aspect, the priority of the first service is determined based on at least one of an importance index of the first service, an applicability index of the first device, and a user preference index of the first service.

With reference to the seventeenth aspect, in some implementations of the seventeenth aspect, service priorities include at least one of the following: A priority of a call service is higher than a priority of an audio playing service; the priority of the call service is higher than a priority of a video call service; the priority of the call service is higher than the priority of the audio playing service; the priority of the call service is higher than a priority of a video playing service; the priority of the call service is higher than a priority of a recording service; the priority of the call service is higher than a priority of a photographing service; the priority of the video call service is higher than the priority of the audio playing service; the priority of the video call service is higher than the priority of the video playing service; the priority of the video call service is higher than the priority of the recording service; and the priority of the video call service is higher than the priority of the photographing service.

With reference to the seventeenth aspect, in some implementations of the seventeenth aspect, the processor is specifically configured to occupy, by the first device, the first to-be-occupied device when a second condition is met. The second condition includes any one of the following: The priority of the first service is higher than the priority of the second service; or the priority of the first service is lower than the priority of the second service, and the first device detects a second operation, where the first operation is used to indicate the first device to preempt the first to-be-occupied device.

With reference to the seventeenth aspect, in some implementations of the seventeenth aspect, the processor is further configured to display first prompt information when the first device determines to occupy the first to-be-occupied device, where the first prompt information indicates that the first to-be-occupied device is occupied by the first device.

With reference to the seventeenth aspect, in some implementations of the seventeenth aspect, the processor is specifically configured to display first prompt information based on the information related to the first to-be-occupied device, where the first prompt information indicates a relationship between a user currently using the first to-be-occupied device and a user currently using the first device, and the first prompt information provides an option for the user currently using the first device to choose whether to occupy the first to-be-occupied device. The processor is specifically configured to: in response to receiving a first operation performed, based on the first prompt information, by the user currently using the first device, determine whether to occupy the first to-be-occupied device.

With reference to the seventeenth aspect, in some implementations of the seventeenth aspect, the first operation is an operation performed by the user currently using the first device on the first device, the second device, or the first to-be-occupied device.

With reference to the seventeenth aspect, in some implementations of the seventeenth aspect, the user information includes at least one of the following: auricle information, brainwave information, face information, voiceprint information, and electronic account information.

With reference to the seventeenth aspect, in some implementations of the seventeenth aspect, the first to-be-occupied device is any one of the following: a headset, a sound box, and a camera; or the first to-be-occupied device is a device including any one of the following elements: a headset, a sound box, and a camera.

With reference to the seventeenth aspect, in some implementations of the seventeenth aspect, the processor is specifically configured to determine whether to occupy a media channel of the first to-be-occupied device.

According to an eighteenth aspect, an electronic device is provided, including a processor, a memory, and a transceiver. The memory is configured to store a computer program, and the processor is configured to execute the computer program stored in the memory. The processor is configured to determine that a first to-be-occupied device is currently occupied by a second device. The first device prepares to occupy the first to-be-occupied device. The transceiver is configured to send a message to obtain information related to the first to-be-occupied device. User information of the first to-be-occupied device includes at least one of the following: first user information collected by the first to-be-occupied device, second user information obtained by the second device, a first user matching result between the first user information and information related to the first device, and a second user matching result between the second user information and user information of the first device. The processor is further configured to display third prompt information when the transceiver fails to obtain the information related to the first to-be-occupied device, where the third prompt information is used to indicate that the first device cannot identify a user using the first to-be-occupied device.

With reference to the eighteenth aspect, in some implementations of the eighteenth aspect, the processor is further configured to give up occupying the first to-be-occupied device when the first device fails to obtain the information related to the first to-be-occupied device.

With reference to the eighteenth aspect, in some implementations of the eighteenth aspect, the processor is further configured to occupy the first to-be-occupied device based on a detected second operation after displaying the third prompt information, where the second operation is used to indicate the first device to occupy the first to-be-occupied device.

According to a nineteenth aspect, an electronic device is provided, including a processor, a memory, and a transceiver. The memory is configured to store a computer program, and the processor is configured to execute the computer program stored in the memory. The transceiver is configured to obtain information related to a second device, where the second device currently occupies a first to-be-occupied device, and the information related to the second device includes any one of the following: device information of the second device, a device matching result between device information of the first device and the device information of the second device, user information of the second device, and a user matching result between user information of the first device and the user information of the second device. The processor is configured to determine, based on the information related to the second device, whether the second device is a trusted device. The processor is configured to occupy the first to-be-occupied device when the second device is the trusted device.

With reference to the nineteenth aspect, in some implementations of the nineteenth aspect, when the information related to the second device includes the device information of the second device or the device matching result between the device information of the first device and the device information of the second device, that the second device is a trusted device meets at least a condition that the device information of the second device successfully matches the device information of the first device; and when the information related to the second device includes the user information of the second device or the user matching result between the user information of the first device and the user information of the second device, that the second device is a trusted device meets at least a condition that the user information of the second device successfully matches the user information of the first device.

With reference to the nineteenth aspect, in some implementations of the nineteenth aspect, the transceiver is further configured to broadcast a first message before the transceiver obtains the information related to the second device. The first message is used to indicate that the first device prepares to occupy the first to-be-occupied device. The transceiver is specifically configured to receive a second message that is sent by the second device in response to the first message, where the second message includes the device information of the second device or the user information of the second device, and the second message indicates that the first to-be-occupied device is currently occupied by the second device.

With reference to the nineteenth aspect, in some implementations of the nineteenth aspect, the transceiver is further configured to broadcast a first message before the transceiver obtains the information related to the second device. The first message is used to indicate that the first device prepares to occupy the first to-be-occupied device. The transceiver is specifically configured to receive a third message that is sent by the first to-be-occupied device in response to the first message, where the third message includes the device information of the second device or the user information of the second device, and the third message indicates that the first to-be-occupied device is currently occupied by the second device.

With reference to the nineteenth aspect, in some implementations of the nineteenth aspect, the transceiver is further configured to send a fourth message to a server before the transceiver obtains the information related to the second device. The fourth message is used to indicate that the first device prepares to occupy the first to-be-occupied device. The transceiver is specifically configured to receive a fifth message that is sent by the server in response to the fourth message, where the fifth message includes the device information of the second device or the user information of the second device, and the fourth message indicates that the first to-be-occupied device is currently occupied by the second device.

With reference to the nineteenth aspect, in some implementations of the nineteenth aspect, the transceiver is further configured to broadcast a sixth message before the transceiver obtains the information related to the second device. The sixth message includes the device information of the first device or the user information of the first device, and the sixth message is used to indicate that the first device prepares to occupy the first to-be-occupied device. The transceiver is specifically configured to receive a seventh message that is sent by the second device in response to the sixth message, where when the sixth message includes the device information of the first device, the seventh message includes the device matching result; or when the sixth message includes the user information of the first device, the seventh message includes the user matching result.

With reference to the nineteenth aspect, in some implementations of the nineteenth aspect, the transceiver is further configured to broadcast a sixth message before the transceiver obtains the information related to the second device. The sixth message includes the device information of the first device or the user information of the first device, and the sixth message is used to indicate that the first device prepares to occupy the first to-be-occupied device. The transceiver is specifically configured to receive an eighth message that is sent by the first to-be-occupied device in response to the sixth message, where when the sixth message includes the device information of the first device, the eighth message includes the device matching result; or when the sixth message includes the user information of the first device, the eighth message includes the user matching result.

With reference to the nineteenth aspect, in some implementations of the nineteenth aspect, the transceiver is further configured to send a ninth message to a server before the transceiver obtains the information related to the second device. The ninth message includes the device information of the first device or the user information of the first device, and the ninth message is used to indicate that the first device prepares to occupy the first to-be-occupied device. The transceiver is specifically configured to receive a tenth message that is sent by the server in response to the ninth message, where when the ninth message includes the device information of the first device, the tenth message includes the device matching result; or when the ninth message includes the user information of the first device, the tenth message includes the user matching result.

With reference to the nineteenth aspect, in some implementations of the nineteenth aspect, the processor is specifically configured to occupy, by the first device, the first to-be-occupied device when the second device is the trusted device and a priority of a first service is higher than a priority of a second service, where a service that occupies the first to-be-occupied device changes from the second service to the first service. The first service is a service of the first device, and the second service is a service of the second device.

With reference to the nineteenth aspect, in some implementations of the nineteenth aspect, the priority of the first service is determined based on at least one of an importance index of the first service, an applicability index of the first device, and a user preference index of the first service.

With reference to the nineteenth aspect, in some implementations of the nineteenth aspect, services in descending order of priorities are as follows: a call service, a video call service, an audio playing service, a video playing service, a recording service, and a photographing service.

With reference to the nineteenth aspect, in some implementations of the nineteenth aspect, the processor is specifically configured to occupy, by the first device, the first to-be-occupied device based on a detected second operation when the second device is the trusted device and a priority of a first service is lower than a priority of a second service, where a service that occupies the first to-be-occupied device changes from the second service to the first service. The first service is a service of the first device, and the second service is a service of the second device.

With reference to the nineteenth aspect, in some implementations of the nineteenth aspect, the processor is further configured to display, by the first device, first prompt information, where the first prompt information indicates that the first to-be-occupied device is occupied by the first device.

With reference to the nineteenth aspect, in some implementations of the nineteenth aspect, the processor is specifically configured to occupy, by the first device, the first to-be-occupied device based on a detected first operation.

With reference to the nineteenth aspect, in some implementations of the nineteenth aspect, the first operation is an operation performed by a user on the first device, the second device, or the first to-be-occupied device.

With reference to the nineteenth aspect, in some implementations of the nineteenth aspect, the user information of the second device includes at least one of the following: user information collected by the second device, and user information collected by the first to-be-occupied device in a process in which the second device occupies the first to-be-occupied device.

With reference to the nineteenth aspect, in some implementations of the nineteenth aspect, the user information of the second device includes at least one of the following: auricle information, brainwave information, face information, voiceprint information, and electronic account information.

With reference to the nineteenth aspect, in some implementations of the nineteenth aspect, the first to-be-occupied device is any one of the following: a headset, a sound box, and a camera.

With reference to the nineteenth aspect, in some implementations of the nineteenth aspect, the processor is specifically configured to occupy a media channel of the first to-be-occupied device.

According to a twentieth aspect, an electronic device is provided, including a processor, a memory, and a transceiver. The memory is configured to store a computer program, and the processor is configured to execute the computer program stored in the memory.

The processor is configured to determine that a first to-be-occupied device is currently occupied by a second device, and that the first device prepares to occupy the first to-be-occupied device.

The transceiver is configured to send a target message to obtain information related to the second device. The information related to the second device includes any one of the following: device information of the second device, a device matching result between device information of the first device and the device information of the second device, user information of the second device, and a user matching result between user information of the first device and the user information of the second device.

The processor is further configured to display third prompt information when the first device fails to obtain the information related to the second device, or when the first device determines, based on the information related to the second device, that the second device is not a trusted device. The third prompt information is used to indicate that the second device is not the trusted device.

With reference to the twentieth aspect, in some implementations of the twentieth aspect, the processor is further configured to give up occupying the first to-be-occupied device.

With reference to the twentieth aspect, in some implementations of the twentieth aspect, the processor is further configured to occupy the first to-be-occupied device based on a detected second operation.

According to a twenty-first aspect, an electronic device is provided, including: an obtaining module, configured to obtain information related to a first to-be-occupied device, where the first to-be-occupied device is currently occupied by a second device, user information of the first to-be-occupied device includes at least one of the following: first user information collected by the first to-be-occupied device, second user information obtained by the second device, a first user matching result between the first user information and user information of the first device, and a second user matching result between the second user information and the user information of the first device, the first user information indicates a user who currently uses the first to-be-occupied device, and the second user information indicates the user who currently uses the first to-be-occupied device; and a processing module, configured to determine, based on the information related to the first to-be-occupied device, whether the first device occupies the first to-be-occupied device.

With reference to the twenty-first aspect, in some implementations of the twenty-first aspect, the processing module is specifically configured to occupy, by the first device, the first to-be-occupied device when a first condition is met. The first condition includes at least one of the following: The first user information successfully matches the user information of the first device; and the second user information successfully matches the user information of the first device.

With reference to the twenty-first aspect, in some implementations of the twenty-first aspect, the electronic device further includes a sending module, configured to broadcast a first message before the obtaining module obtains the information related to the first to-be-occupied device, where the first message is used to indicate that the first device prepares to occupy the first to-be-occupied device. The obtaining module is specifically configured to receive a second message that is sent by the second device in response to the first message, where the second message includes the first user information and/or the second user information.

With reference to the twenty-first aspect, in some implementations of the twenty-first aspect, the electronic device further includes a sending module, configured to broadcast a first message before the transceiver obtains the information related to the first to-be-occupied device, where the first message is used to indicate that the first device prepares to occupy the first to-be-occupied device. The obtaining module is specifically configured to receive a third message that is sent by the first to-be-occupied device in response to the first message, where the third message includes the first user information and/or the second user information.

With reference to the twenty-first aspect, in some implementations of the twenty-first aspect, the electronic device further includes a sending module, configured to send a fourth message to a server before the transceiver obtains the information related to the first to-be-occupied device, where the fourth message is used to indicate that the first device prepares to occupy the first to-be-occupied device. The obtaining module is specifically configured to receive a fifth message that is sent by the server in response to the fourth message, where the fifth message includes the first user information and/or the second user information.

With reference to the twenty-first aspect, in some implementations of the twenty-first aspect, the electronic device further includes a sending module, configured to broadcast a sixth message before the transceiver obtains the information related to the first to-be-occupied device, where the sixth message includes the user information of the first device, and the sixth message is used to indicate that the first device prepares to occupy the first to-be-occupied device. The obtaining module is specifically configured to receive a seventh message that is sent by the second device in response to the sixth message, where the seventh message includes the second user matching result.

With reference to the twenty-first aspect, in some implementations of the twenty-first aspect, the electronic device further includes a sending module, configured to broadcast a sixth message before the transceiver obtains the information related to the first to-be-occupied device, where the sixth message includes the user information of the first device, and the sixth message is used to indicate that the first device prepares to occupy the first to-be-occupied device. The obtaining module is specifically configured to receive an eighth message that is sent by the first to-be-occupied device in response to the sixth message, where the eighth message includes the first user matching result.

With reference to the twenty-first aspect, in some implementations of the twenty-first aspect, the electronic device further includes a sending module, configured to send a ninth message to a server before the transceiver obtains the information related to the first to-be-occupied device, where the ninth message includes the user information of the first device, and the ninth message is used to indicate that the first device prepares to occupy the first to-be-occupied device. The obtaining module is specifically configured to receive a tenth message that is sent by the server in response to the ninth message, where the tenth message includes the first user matching result and/or the second user matching result.

With reference to the twenty-first aspect, in some implementations of the twenty-first aspect, a first service of the first device prepares to occupy the first to-be-occupied device. The obtaining module is further configured to obtain a priority of a second service before the processing module determines, based on the information related to the first to-be-occupied device, whether to occupy the first to-be-occupied device, where the second service is a service that is of the second device and that currently occupies the first to-be-occupied device. The processing module is specifically configured to determine, based on the information related to the first to-be-occupied device, a priority of the first service, and the priority of the second service, whether to occupy the first to-be-occupied device.

With reference to the twenty-first aspect, in some implementations of the twenty-first aspect, the priority of the first service is determined based on at least one of an importance index of the first service, an applicability index of the first device, and a user preference index of the first service.

With reference to the twenty-first aspect, in some implementations of the twenty-first aspect, service priorities include at least one of the following: A priority of a call service is higher than a priority of an audio playing service; the priority of the call service is higher than a priority of a video call service; the priority of the call service is higher than the priority of the audio playing service; the priority of the call service is higher than a priority of a video playing service; the priority of the call service is higher than a priority of a recording service; the priority of the call service is higher than a priority of a photographing service; the priority of the video call service is higher than the priority of the audio playing service; the priority of the video call service is higher than the priority of the video playing service; the priority of the video call service is higher than the priority of the recording service; and the priority of the video call service is higher than the priority of the photographing service.

With reference to the twenty-first aspect, in some implementations of the twenty-first aspect, the processing module is specifically configured to occupy, by the first device, the first to-be-occupied device when a second condition is met. The second condition includes any one of the following: The priority of the first service is higher than the priority of the second service; or the priority of the first service is lower than the priority of the second service, and the first device detects a second operation, where the first operation is used to indicate the first device to preempt the first to-be-occupied device.

With reference to the twenty-first aspect, in some implementations of the twenty-first aspect, the processing module is further configured to display first prompt information when the first device determines to occupy the first to-be-occupied device, where the first prompt information indicates that the first to-be-occupied device is occupied by the first device.

With reference to the twenty-first aspect, in some implementations of the twenty-first aspect, the processing module is specifically configured to: display first prompt information based on the information related to the first to-be-occupied device, where the first prompt information indicates a relationship between a user currently using the first to-be-occupied device and a user currently using the first device, and the first prompt information provides an option for the user currently using the first device to choose whether to occupy the first to-be-occupied device; and in response to receiving a first operation performed, based on the first prompt information, by the user currently using the first device, determine whether to occupy the first to-be-occupied device.

With reference to the twenty-first aspect, in some implementations of the twenty-first aspect, the first operation is an operation performed by the user currently using the first device on the first device, the second device, or the first to-be-occupied device.

With reference to the twenty-first aspect, in some implementations of the twenty-first aspect, the user information includes at least one of the following: auricle information, brainwave information, face information, voiceprint information, and electronic account information.

With reference to the twenty-first aspect, in some implementations of the twenty-first aspect, the first to-be-occupied device is any one of the following: a headset, a sound box, and a camera; or the first to-be-occupied device is a device including any one of the following elements: a headset, a sound box, and a camera.

With reference to the twenty-first aspect, in some implementations of the twenty-first aspect, the processing module is specifically configured to determine whether to occupy a media channel of the first to-be-occupied device.

According to a twenty-second aspect, an electronic device is provided, including: a processing module, configured to determine that a first to-be-occupied device is currently occupied by a second device, and the first device prepares to occupy the first to-be-occupied device; and a sending module, configured to send a message to obtain information related to the first to-be-occupied device, where the information related to the first to-be-occupied device includes at least one of the following: first user information collected by the first to-be-occupied device, second user information obtained by the second device, a first user matching result between the first user information and user information of the first device, and a second user matching result between the second user information and the user information of the first device. The processing module is further configured to display third prompt information when a receiving module fails to obtain the information related to the first to-be-occupied device, where the third prompt information is used to indicate that the first device cannot identify a user using the first to-be-occupied device.

With reference to the twenty-second aspect, in some implementations of the twenty-second aspect, the processing module is further configured to give up occupying the first to-be-occupied device when the first device fails to obtain the information related to the first to-be-occupied device.

With reference to the twenty-second aspect, in some implementations of the twenty-second aspect, the processing module is further configured to occupy the first to-be-occupied device based on a detected second operation after displaying the third prompt information, where the second operation is used to indicate the first device to occupy the first to-be-occupied device.

According to a twenty-third aspect, a computer-readable program storage medium is provided, where the computer-readable medium stores program code, and when the computer program code is run on a computer, the computer is enabled to execute the instruction according to any possible implementation of the first aspect to the ninth aspect.

According to a twenty-fourth aspect, a computer program product including instructions is provided. When the computer program product runs on a computer, the computer is enabled to perform the method in any implementation of the first aspect to the ninth aspect.

According to a twenty-fifth aspect, a chip is provided, where the chip includes a processor and a data interface. The processor reads, through the data interface, instructions stored in a memory, to perform the method in any implementation of the first aspect to the ninth aspect.

Optionally, in an implementation, the chip may further include a memory, and the memory stores instructions. The processor is configured to execute the instructions stored in the memory, and when the instructions are executed, the processor is configured to perform the method in any implementation of the first aspect to the ninth aspect.

According to a twenty-sixth aspect, a terminal device is provided, including modules configured to perform any possible implementation of the first aspect to the ninth aspect.

According to a twenty-seventh aspect, a communications apparatus is provided, and is configured to perform the method according to any possible implementation of the first aspect to the ninth aspect.

According to a twenty-eighth aspect, a communications apparatus is provided, where the apparatus includes a processor and a memory. The processor is coupled to the memory, the memory is configured to store a computer program, and the processor is configured to execute the computer program stored in the memory, so that the communications apparatus performs the method according to any possible implementation of the first aspect to the ninth aspect.

According to a twenty-ninth aspect, a communications apparatus is provided, where the apparatus includes a processor, a memory, and a transceiver. The memory is configured to store a computer program, and the processor is configured to execute the computer program stored in the memory, so that the apparatus performs the method according to any possible implementation of the first aspect to the ninth aspect.

According to a thirtieth aspect, a communications apparatus is provided, where the communications apparatus includes at least one processor and a communications interface. The communications interface is used by the communications apparatus to exchange information with another communications apparatus, and when a program instruction is executed in the at least one processor, the communications apparatus is enabled to implement the method according to any possible implementation of the first aspect to the ninth aspect.

According to a thirty-first aspect, a processor is provided, where the processor includes at least one circuit, configured to perform the method according to any possible implementation of the first aspect to the ninth aspect.

According to a thirty-second aspect, a chip system is provided, where the chip system includes at least one processor, and when a program instruction is executed in the at least one processor, the chip system is enabled to implement the method according to any possible implementation of the first aspect to the ninth aspect.

BRIEF DESCRIPTION OF DRAWINGS

FIG. 4 is a schematic flowchart of a device occupation method according to an embodiment of this application;

FIG. 5 is a schematic flowchart of a device occupation method according to an embodiment of this application;

FIG. 6 is a schematic flowchart of a device occupation method according to an embodiment of this application;

FIG. 22 is a schematic flowchart of a device occupation method according to an embodiment of this application;

FIG. 24 is a schematic flowchart of a device occupation method according to an embodiment of this application;

DESCRIPTION OF EMBODIMENTS

The following describes technical solutions in this application with reference to the accompanying drawings.

Terms used in the following embodiments are merely intended to describe specific embodiments, but are not intended to limit this application. Terms "one", "a", "the", "the foregoing", "this", and "the one" of singular forms used in this specification and the appended claims of this application are also intended to include plural forms like "one or more", unless otherwise specified in the context clearly. It should be further understood that, in the following embodiments of this application, "at least one" or "one or more" means one, two, or more. The term "and/or" is used to describe an association relationship between associated objects and indicates that three relationships may exist. For example, A and/or B may indicate the following three cases: Only A exists, both A and B exist, and only B exists, where A and B may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment. Instead, the statements mean referring to "one or more but not all of the embodiments", unless otherwise specifically emphasized in other ways. The terms "include", "include", "have", and variants of the terms all mean "include but are not limited to", unless otherwise specifically emphasized in other ways.

The following describes an electronic device provided in the embodiments of this application, user interfaces for such an electronic device, and embodiments for using such an electronic device. In some embodiments, the electronic device may be a portable electronic device that further includes other functions such as a personal digital assistant function and/or a music player function, for example, a mobile phone, a tablet computer, a wearable electronic device having a wireless communication function (for example, a smartwatch), a video player, a headset, a sound box, or a camera. An example embodiment of the portable electronic device includes but is not limited to a portable electronic device using iOS®, Android®, Microsoft®, or another operating system. The portable electronic device may alternatively be another portable electronic device, for example, a laptop computer (Laptop). It should be further understood that, in some other embodiments, the foregoing electronic device may not be a portable electronic device but a desktop computer, a television, a sound box, a camera, or the like.

Figure 1:
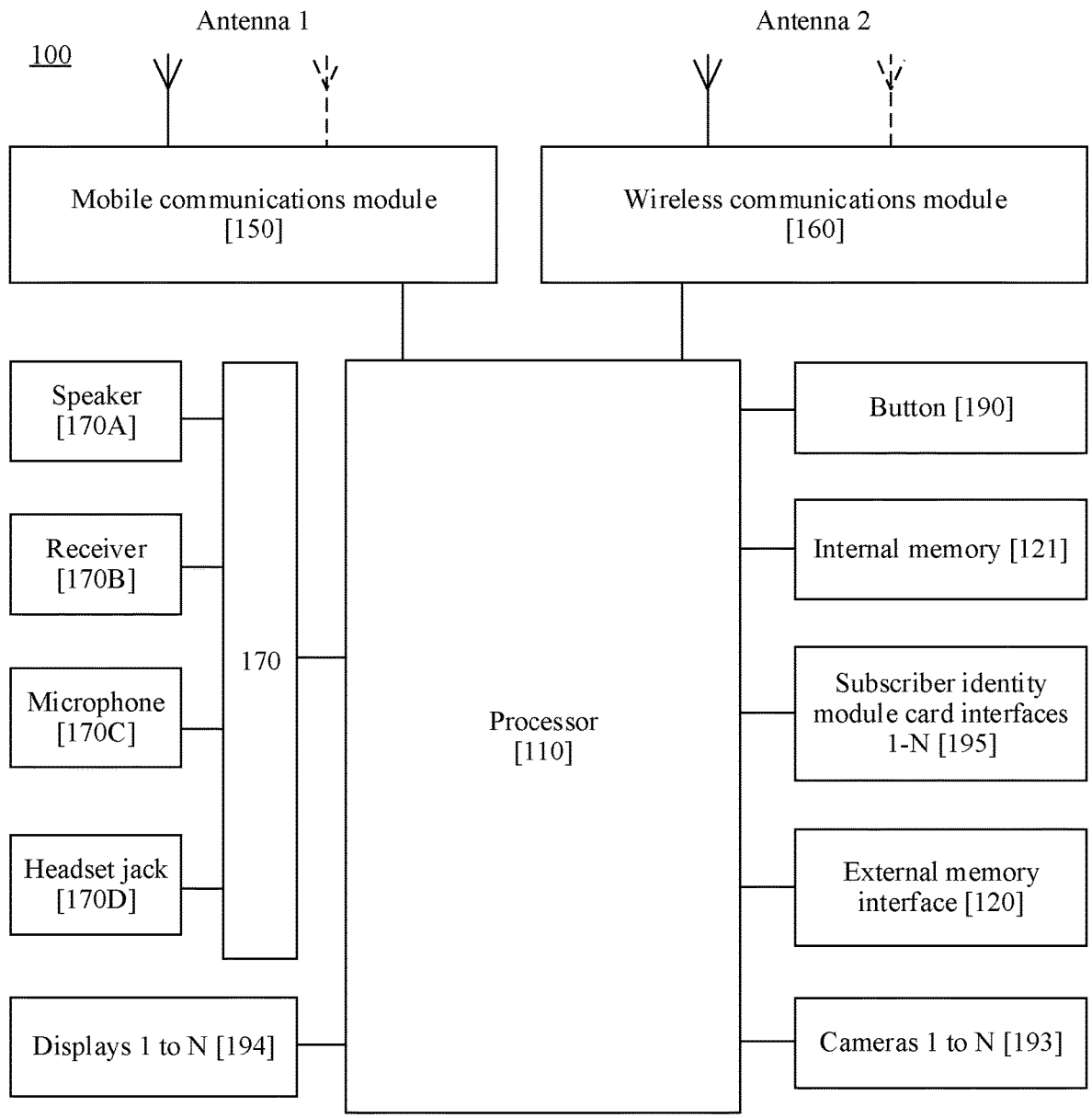
FIG. 1 is a schematic diagram of a hardware structure of an electronic device according to an embodiment of this application.

For example, FIG. 1 is a schematic structural diagram of an electronic device 100. The electronic device 100 may include a processor 110, an external memory interface 120, an internal memory 121, an antenna 1, an antenna 2, a mobile communications module 150, a wireless communications module 160, an audio module 170, a speaker 170A, a receiver 170B, a microphone 170C, a headset interface 170D, a button 190, a camera 193, a display 194, a subscriber identity module (subscriber identification module, SIM) card interface 195, and the like.

It may be understood that the structure shown in the embodiments of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may alternatively include one or more processors 110. The controller may generate an operation control signal based on instruction operation code and a time sequence signal, to complete control of instruction reading and instruction execution. In some other embodiments, a memory may be further disposed in the processor 110, to store instructions and data. For example, the memory in the processor 110 may be a cache memory. The memory may store instructions or data just used or cyclically used by the processor 110. If the processor 110 needs to use the instructions or the data again, the processor 110 may directly invoke the instructions or the data from the memory. In this way, repeated access is avoided, a waiting time of the processor 110 is reduced, and efficiency of processing data or executing instructions by the electronic device 100 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, a USB interface, and/or the like. The USB interface is an interface that conforms to a USB standard specification, and may be specifically a mini USB interface, a micro USB interface, a USB Type C interface, or the like. The USB interface may be configured to connect to a charger to charge the electronic device 100, or may be configured to perform data transmission between the electronic device 100 and a peripheral device. The USB interface may alternatively be configured to connect to a headset, and play audio by using the headset.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may further be multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more devices that integrate at least one communication processing module. The wireless communications module 160 receives an electromagnetic wave through the antenna 2, performs frequency modulation and filtering on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The electronic device 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light-emitting diode (quantum dot light emitting diodes, QLED), or the like. In some embodiments, the electronic device 100 may include one or more displays 194.

The display 194 of the electronic device 100 may be a flexible screen. Currently, the flexible screen attracts much attention due to unique features and huge potential of the flexible screen. Compared with a conventional screen, the flexible screen has features of strong flexibility and bendability, and can provide a user with a new interaction mode based on the feature of bendability, to meet more requirements of the user for an electronic device. For an electronic device configured with a foldable display, the foldable display on the electronic device may be switched between a small screen in a folded form and a large screen in an expanded form at any time. Therefore, the user uses a split-screen function more frequently on the electronic device configured with the foldable display.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. In this way, the electronic device 100 can play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store one or more computer programs, where the one or more computer programs include instructions. The processor 110 may run the instructions stored in the internal memory 121, so that the electronic device 100 performs the screen-off display method provided in some embodiments of this application, various applications, data processing, and the like. The internal memory 121 may include a program storage area and a data storage area. The program storage area may store an operating system. The program storage area may further store one or more applications (for example, Gallery and Contacts), and the like. The data storage area may store data (for example, a photo and a contact) created during use of the electronic device 100, and the like. In addition, the internal memory 121 may include a high-speed random access memory, or may include a nonvolatile memory, for example, one or more magnetic disk storage devices, flash memory devices, or universal flash storages (universal flash storage, UFS). In some embodiments, the processor 110 may run the instructions stored in the internal memory 121 and/or the instructions stored in the memory that is disposed in the processor 110, to enable the electronic device 100 to perform the screen-off display method provided in the embodiments of this application, other applications, and data processing. The electronic device 100 may implement audio functions, for example, music playing and recording, by using the audio module 170, the speaker 170A, the receiver 170B, the microphone 170C, the headset jack 170D, the application processor, and the like.

Figure 2:
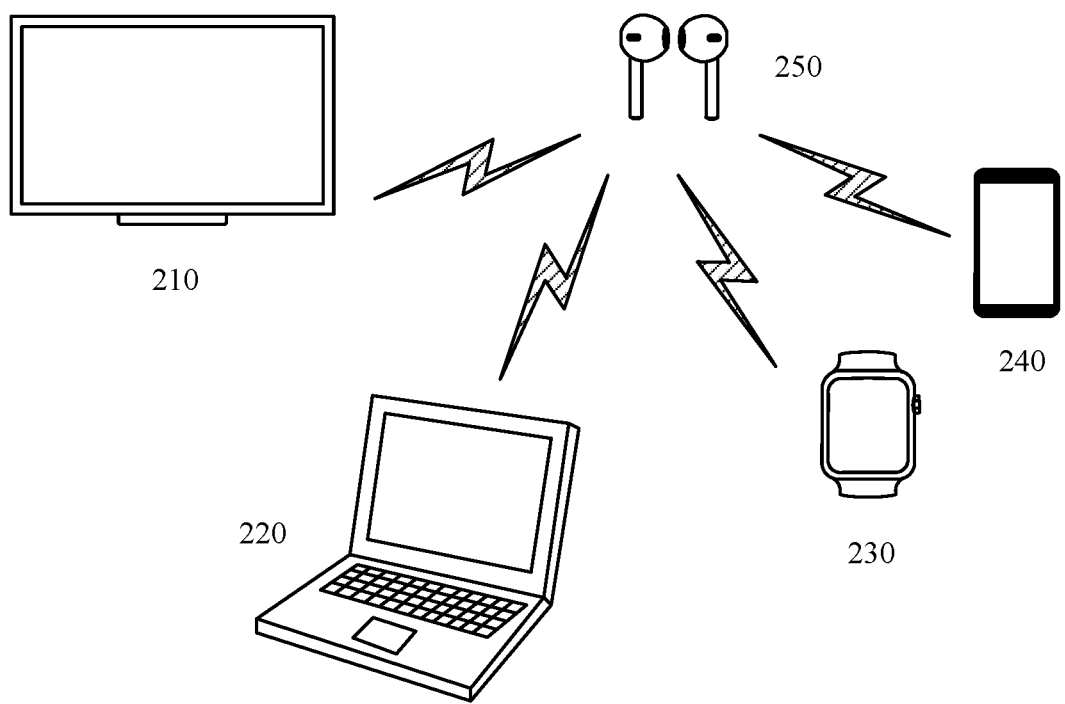
FIG. 2 is a schematic diagram of an application scenario according to an embodiment of this application.

FIG. 2 shows an application scenario according to an embodiment of this application. The application scenario in FIG. 2 may include at least one electronic device (for example, an electronic device 210, an electronic device 220, an electronic device 230, an electronic device 240, and an electronic device 250). The electronic device 210 in FIG. 2 may be a television. The electronic device 220 may be a notebook computer. The electronic device 230 may be a watch. The electronic device 240 may be a mobile phone. The electronic device 250 may be a headset, a sound box, a camera, or the like. The electronic device 210, the electronic device 220, the electronic device 230, and the electronic device 240 in FIG. 2 may establish a wireless connection to the electronic device 250 by using a wireless communication protocol. The wireless communication protocol may be, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) protocol, an infrared (infrared, IR) technology, and the like. For example, the electronic device 250 may receive information sent by the electronic device 210, the electronic device 220, the electronic device 230, and the electronic device 240. The electronic device 250 may further send information to the electronic device 210, the electronic device 220, the electronic device 230, and the electronic device 240.

It should be noted that the embodiments of this application may be applied to an application scenario including one or more wireless communications devices and a plurality of electronic devices, where each of the plurality of electronic devices may interact with the one or more wireless communications devices by using a wireless communication protocol. This is not limited in this application.

In an example, the electronic device 250 may be a headset. An electronic device around the headset may be wirelessly connected to the headset.

For example, the electronic device 210 may be a television. The television may be wirelessly connected to the headset, so that a user can listen to, by using the headset, a program played by the television.

For another example, the electronic device 220 may be a notebook computer, and the electronic device 250 may be a headset. The notebook computer may be wirelessly connected to the headset, so that the user can listen to, by using the headset, audio or a video played by the notebook computer, and can further implement voice communication or video communication with another user by using the notebook computer and the headset.

For another example, the electronic device 230 may be a watch, and the electronic device 250 may be a headset. The watch may be wirelessly connected to the headset, so that the user can listen to, by using the headset, audio played by the watch, and can further perform voice communication with another user by using the watch.

For another example, the electronic device 230 may be a mobile phone, and the electronic device 250 may be a headset. The mobile phone may be wirelessly connected to the headset, so that the user can listen to, by using the headset, audio or a video played by the mobile phone, and can further implement communication or video communication with another user by using the mobile phone and the headset.

It is assumed that the electronic device 210, the electronic device 220, the electronic device 230, and the electronic device 240 all intend to occupy the electronic device 250, to implement corresponding operations. For example, the headset receives audio sent by the watch, and plays the audio. At the same time, the mobile phone prepares to occupy the headset, so as to answer a call by using the headset. If it can be determined, based on a specific scenario, whether to continue to use the headset to play audio sent by the watch or to implement a call function with the mobile phone, user experience of using the headset can be improved.

In an example, the electronic device 250 may be a sound box. An electronic device around the sound box may be wirelessly connected to the sound box.

For example, the electronic device 210 may be a television. The television may be wirelessly connected to the sound box, so that a user can listen to, by using the sound box, a program played by the television.

For another example, the electronic device 220 may be a notebook computer, and the electronic device 250 may be a sound box. The notebook computer may be wirelessly connected to the sound box. The user can listen to, by using the sound box, audio or a video played by the notebook computer. The user can further use the notebook computer and the sound box to implement voice or video communication with another user. The user can further record sounds through the sound box to form a recording file, and store the recording file in the notebook computer.

For another example, the electronic device 230 may be a watch, and the electronic device 250 may be a sound box. The watch may be wirelessly connected to the sound box. The user can listen to, by using the sound box, audio played by the watch. The user can further perform voice communication with another user by using the watch. The user can further record sounds by using the sound box to form a recording file, and store the recording file in the watch.

For another example, the electronic device 230 may be a mobile phone, and the electronic device 250 may be a sound box. The mobile phone may be wirelessly connected to the sound box. The user can listen to, by using the sound box, audio or a video played by the mobile phone. The user can further use the mobile phone and the sound box to implement voice or video communication with another user. The user can further record sounds through the sound box to form a recording file, and store the recording file in the mobile phone.

It is assumed that the electronic device 210, the electronic device 220, the electronic device 230, and the electronic device 240 all intend to occupy the electronic device 250, to implement corresponding operations. For example, the sound box receives audio sent by the television, and plays the audio. At the same time, the notebook computer prepares to occupy the sound box, to perform video chatting through the sound box. If it can be determined, based on a specific scenario, whether to continue to use the sound box to play audio sent by the television or to implement a video call function with the notebook computer, user experience of using the sound box can be improved.

In an example, the electronic device 250 may be a camera. An electronic device around the camera may be wirelessly connected to the camera.

For example, the electronic device 210 may be a television. The television may be wirelessly connected to the camera, so that the user can view, by using the television, a video collected by the camera.

For another example, the electronic device 220 may be a notebook computer, and the electronic device 250 may be a camera. The notebook computer may be wirelessly connected to the camera. The user can view, by using the mobile phone, a video collected by the camera. The user can further use the notebook computer and the camera to implement video communication with another user. The user can further capture an image by using the camera to form a multimedia file, and store the multimedia file in the notebook computer. The multimedia file may be an image file or a video file.

For another example, the electronic device 230 may be a watch, and the electronic device 250 may be a camera. The watch may be wirelessly connected to the camera. The user can use the watch and the camera to implement video communication with another user. The user can further collect an image by using the camera to form a multimedia file, and store the multimedia file in the watch. The multimedia file may be an image file or a video file.

For another example, the electronic device 230 may be a mobile phone, and the electronic device 250 may be a camera. The mobile phone may be wirelessly connected to the camera. The user can view, by using the mobile phone, a video collected by the camera. The user can further use the mobile phone and the camera to implement video communication with another user. The user can further collect an image by using the camera to form a multimedia file, and store the multimedia file in the mobile phone. The multimedia file may be an image file or a video file.

It is assumed that the electronic device 210, the electronic device 220, the electronic device 230, and the electronic device 240 all intend to occupy the electronic device 250, to implement corresponding operations. For example, the user is viewing, by using the mobile phone, a video collected by the camera. At the same time, the notebook computer prepares to occupy the camera, to perform video chatting through the camera. If it can be determined, based on a specific scenario, whether to continue to use the mobile phone to play the video sent by the camera or to implement a video call function with the notebook computer, user experience of using the camera can be improved.

Figure 3:
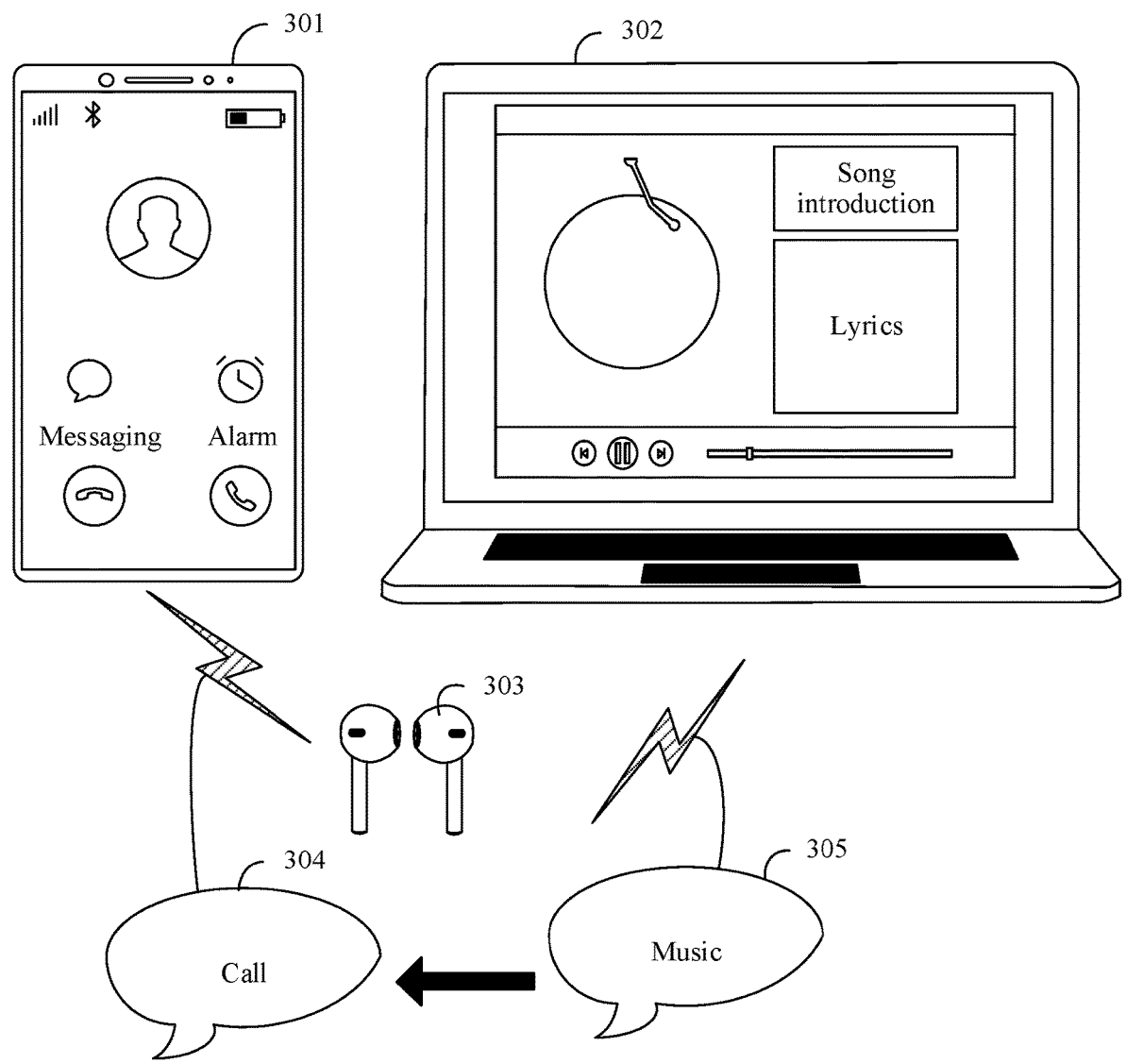
FIG. 3 is a schematic diagram of a scenario of a device occupation method according to an embodiment of this application.

With reference to FIG. 3, a specific implementation provided in this application is described. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

A computer 302 currently occupies a headset 303, and a user is using the computer 302 and the headset 303 to play music 305. Then, a mobile phone 301 receives a call 304. The mobile phone 301 may search for the headset 303, and prepare to occupy the headset 303. In addition, the mobile phone 301 may further broadcast a message, to determine whether the headset 303 is being occupied by another device. The computer 302 receives the message from the mobile phone 301, and may send feedback information to the mobile phone 301, so that the mobile phone 301 can determine that the headset 303 is being used by another device. Therefore, the mobile phone 301 needs to further determine whether the headset 303 can be occupied. The mobile phone 301 may determine, based on information related to the computer 302 that is sent by the computer 302, whether the computer 302 is a trusted device. If yes, it indicates that the mobile phone 301 matches the computer 302. Therefore, the mobile phone 301 may occupy the headset 303, and answer the call 304 by using the headset 303.

FIG. 4 is a schematic flowchart of a device occupation method according to this application.

401: A first device obtains information related to a second device, where the second device currently occupies a first to-be-occupied device, and the information related to the second device includes any one of the following: device information of the second device, a device matching result between device information of the first device and the device information of the second device, user information of the second device, and a user matching result between user information of the first device and the user information of the second device.

The first device may be, for example, a mobile phone, a tablet computer, a smartwatch, a video player, a desktop computer, or a television.

The first to-be-occupied device may be, for example, a headset, a sound box, or a camera.

The second device may be, for example, a mobile phone, a tablet computer, a smartwatch, a video player, a desktop computer, or a television.

Example 1

The information related to the second device may include the device information of the second device or the user information of the second device.

In other words, the first device may obtain the device information of the second device, and determine, based on the device information of the first device and the device information of the second device, whether the device information of the first device matches the device information of the second device. Alternatively, the first device may obtain the user information of the second device, and determine, based on the user information of the first device and the user information of the second device, whether the user information of the first device matches the user information of the second device.

Figure (a) in FIG. 5 is a schematic flowchart of a method for obtaining the information (including the device information of the second device or the user information of the second device) related to the second device according to an embodiment of this application.

501a: The first device broadcasts a first message, where the first message is used to indicate that the first device prepares to occupy the first to-be-occupied device.

Correspondingly, the second device may receive the first message broadcast by the first device.

502a: The second device sends a second message to the first device in response to the first message, where the second message includes the device information of the second device or the user information of the second device, and the second message indicates that the first to-be-occupied device is currently occupied by the second device.

Correspondingly, the first device receives the second message sent by the second device.

In other words, the first device may obtain the device information of the second device or the user information of the second device from the second device.

For example, the first device is a computer, the second device is a mobile phone, and the first to-be-occupied device is a headset. The computer may broadcast the first message to announce that the computer prepares to occupy the headset. After receiving the first message, the mobile phone that currently occupies the headset may send the second message to the computer. The computer may receive the second message sent by the mobile phone, where the second message includes device information of the mobile phone. The computer may determine, based on the device information of the mobile phone, that the headset is currently occupied by another device. Further, the computer may perform matching between device information of the computer and the device information of the mobile phone. If the matching succeeds, the mobile phone may be a trusted device of the computer. Similarly, the second message includes user information of the mobile phone. The computer may determine, based on the user information of the mobile phone, that the headset is currently occupied by another device. Further, the computer may perform matching between user information of the computer and the user information of the mobile phone. If the matching succeeds, the mobile phone may be a trusted device of the computer.

Figure (b) in FIG. 5 is a schematic flowchart of a method for obtaining the information (including the device information of the second device or the user information of the second device) related to the second device according to an embodiment of this application.

501b: The first device broadcasts a first message, where the first message is used to indicate that the first device prepares to occupy the first to-be-occupied device.

Correspondingly, the first to-be-occupied device may receive the first message broadcast by the first device.

502b: The first to-be-occupied device sends a third message to the first device in response to the first message, where the third message includes the device information of the second device or the user information of the second device, and the third message indicates that the first to-be-occupied device is currently occupied by the second device.

Correspondingly, the first device receives the third message sent by the first to-be-occupied device.

In other words, the first device may obtain the device information of the second device or the user information of the second device from the first to-be-occupied device.

For example, the first device is a computer, the second device is a mobile phone, and the first to-be-occupied device is a sound box. The computer may broadcast the first message to announce that the computer prepares to occupy the sound box. The sound box is currently occupied by the mobile phone. The sound box may send the third message to the computer, to indicate that the sound box is occupied by another device. The computer may receive the third message sent by the sound box, where the third message includes device information of the mobile phone. The computer may determine, based on the device information of the mobile phone, that the sound box is currently occupied by another device. Further, the computer may perform matching between device information of the computer and the device information of the mobile phone. If the matching succeeds, the mobile phone may be a trusted device of the computer. Similarly, the third message includes user information of the mobile phone. The computer may determine, based on the user information of the mobile phone, that the headset is currently occupied by another device. Further, the computer may perform matching between user information of the computer and the user information of the mobile phone. If the matching succeeds, the mobile phone may be a trusted device of the computer.

Optionally, the first message includes identification information of the first to-be-occupied device.

That is, after receiving the first message, the second device may determine, based on the identification information of the first to-be-occupied device, that the first to-be-occupied device that the first device prepares to occupy is the device currently occupied by the second device. Further, the second device may feed back the device information of the second device or the user information of the second device to the first device.

That is, after receiving the first message, the first to-be-occupied device may determine that the first device prepares to occupy the first to-be-occupied device, and further feed back the device information or user information of the second device that currently occupies the first to-be-occupied device to the first device.

Figure (c) in FIG. 5 is a schematic flowchart of a method for obtaining the information (including the device information of the second device or the user information of the second device) related to the second device according to an embodiment of this application.

503: The first device sends a fourth message to a server, where the fourth message is used to indicate that the first device prepares to occupy the first to-be-occupied device.

Correspondingly, the server may receive the fourth message sent by the first device.

504: The server sends a fifth message to the first device in response to the fourth message, where the fifth message includes the device information of the second device or the user information of the second device, and the fifth message indicates that the first to-be-occupied device is currently occupied by the second device.

Correspondingly, the first device receives the fifth message sent by the server.

In other words, the first device may obtain the device information of the second device or the user information of the second device from the server.

The server may also be referred to as a cloud server. In other words, the first device may exchange data with the cloud server by using a wireless communication protocol.

For example, the first device is a computer, the second device is a mobile phone, and the first to-be-occupied device is a camera. The computer may send the fourth message to the server, to notify the server that the computer prepares to occupy the camera. The server may send the fifth message to the computer in response to the fourth message, to notify the computer that the camera is currently occupied by another device. The computer may receive the fifth message sent by the server, where the fifth message includes device information of the mobile phone. The computer may determine, based on the device information of the mobile phone, that the camera is currently occupied by another device. Further, the computer may perform matching between device information of the computer and the device information of the mobile phone. If the matching succeeds, the mobile phone may be a trusted device of the computer. Similarly, the fifth message includes user information of the mobile phone. The computer may determine, based on the user information of the mobile phone, that the headset is currently occupied by another device. Further, the computer may perform matching between user information of the computer and the user information of the mobile phone. If the matching succeeds, the mobile phone may be a trusted device of the computer.

Optionally, the fourth message includes identification information of the first to-be-occupied device.

That is, after receiving the fourth message, the server may feed back, to the first device based on the identification information of the first to-be-occupied device, the device information or user information of the second device that currently occupies the first to-be-occupied device.

The first to-be-occupied device, the second device, and the server may all store the device information of the second device. Similarly, the first to-be-occupied device, the second device, and the server may all store the user information of the second device.

For example, the second device may send the device information of the second device to the first to-be-occupied device and the server, so that the first to-be-occupied device and the server may store the device information of the second device (for example, a unique identity of the second device).

For another example, the user information of the second device that is obtained by the second device may be sent to the first to-be-occupied device and the server, so that the first to-be-occupied device and the server may store the user information of the second device (for example, information about an electronic account logged in to the second device) that is obtained by the second device.

In addition, because of particularity of the user information, the user information may alternatively be obtained by the first to-be-occupied device. The user information of the second device that is obtained by the first to-be-occupied device may be sent to the second device and the server, so that the second device, the first to-be-occupied device, and the server may all store the user information (for example, brainwave information, voiceprint information, and face information of the user that uses the first to-be-occupied device) of the second device that is obtained by the first to-be-occupied device.

The device information of the second device may be, for example, a unique identity (identity, ID) of the second device, a device name of the second device (an identifier that may be changed by a user and is used to identify the device), or the like.

In an example, the user information of the second device may be information about a user that uses the second device. For example, the user information of the second device may be user information collected or stored by the second device.

For example, the user information of the second device may be information about an electronic account logged in to the second device (for example, an email account and real-name identity information).

In an example, because the second device currently occupies the first to-be-occupied device, the user may use the second device and the first to-be-occupied device. That is, the user that is using the second device and the user that is using the first to-be-occupied device should be a same user. Therefore, the user information of the second device may further be information about the user that is using the first to-be-occupied device. That is, the user information of the second device may be user information collected by the first to-be-occupied device in a process in which the second device occupies the first to-be-occupied device.

For example, the first to-be-occupied device may be a headset having a brainwave detection function, and the information about the user who uses the first to-be-occupied device may be brainwave information of the user who uses the headset.

For another example, the first to-be-occupied device may be a headset having an auricle detection function, and the information about the user who uses the first to-be-occupied device may be auricle information of the user who uses the headset.

For another example, the first to-be-occupied device may be a sound box having a voiceprint collection function, and the information about the user who uses the first to-be-occupied device may be voiceprint information of the user who uses the sound box.

For another example, the first to-be-occupied device may be a camera having a face collection function, and the information about the user who uses the first to-be-occupied device may be face information of the user who uses the camera.

As described above, in the method 500, the first device may obtain the information related to the second device by using steps 501a and 502a, or steps 501b and 502b, or steps 503 and 504.

Example 2

The information related to the second device may include the device matching result between the device information of the first device and the device information of the second device (referred to as a device matching result below), or the user matching result between the user information of the second device and the user information of the first device (referred to as a user matching result below).

That is, the first device may directly obtain the device matching result or the user matching result, and does not need to obtain the device information of the second device or the user information of the second device.

Figure (a) in FIG. 6 is a schematic flowchart of a method for obtaining the information (including the device matching result or the user matching result) related to the second device according to an embodiment of this application.

601a: The first device broadcasts a sixth message, where the sixth message includes the device information of the first device or the user information of the first device, and the sixth message is used to indicate that the first device prepares to occupy the first to-be-occupied device.

Correspondingly, the second device may receive the sixth message broadcast by the first device.

602a: The second device sends a seventh message to the first device in response to the sixth message, where if the sixth message includes the device information of the first device, the seventh message includes the device matching result; or if the sixth message includes the user information of the first device, the seventh message includes the user matching result.

Correspondingly, the first device receives the seventh message sent by the second device.

In other words, the second device may obtain the device information of the first device, and determine whether the device information of the first device matches the device information of the second device. Alternatively, the second device may obtain the user information of the first device, and determine whether the user information of the first device matches the user information of the second device.

For example, the first device is a computer, the second device is a mobile phone, and the first to-be-occupied device is a headset. The computer may broadcast the sixth message to announce that the computer prepares to occupy the headset, where the sixth message includes device information of the computer. The mobile phone may determine, based on the sixth message, that another device prepares to occupy the headset. The mobile phone may determine a device matching result between device information of the mobile phone and the device information of the computer, and feed back the device matching result to the computer. The computer may receive a seventh message sent by the mobile phone, where the seventh message includes the device matching result. The computer may determine, based on the device matching result, that the headset is currently occupied by another device. Further, if the device matching result indicates that the matching succeeds, the mobile phone may be a trusted device of the computer. Similarly, the sixth message includes user information of the computer. The mobile phone may determine a user matching result between user information of the mobile phone and the user information of the computer, and feed back the user matching result to the computer. The computer may receive a seventh message sent by the mobile phone, where the seventh message includes the user matching result. The computer may determine, based on the user matching result, that the headset is currently occupied by another device. Further, if the user matching result indicates that the matching succeeds, the mobile phone may be a trusted device of the computer.

Figure (b) in FIG. 6 is a schematic flowchart of a method for obtaining the information (including the device matching result or the user matching result) related to the second device according to an embodiment of this application.

601b: The first device broadcasts a sixth message, where the sixth message includes the device information of the first device or the user information of the first device, and the sixth message is used to indicate that the first device prepares to occupy the first to-be-occupied device.

Correspondingly, the first to-be-occupied device may receive the sixth message broadcast by the first device.

602b: The first to-be-occupied device sends an eighth message to the first device in response to the sixth message, where if the sixth message includes the device information of the first device, the eighth message includes the device matching result, or if the sixth message includes the user information of the first device, the eighth message includes the user matching result.

Correspondingly, the first device receives the eighth message sent by the first to-be-occupied device.

In other words, the first to-be-occupied device may obtain the device information of the first device, and determine whether the device information of the first device matches the device information of the second device. Alternatively, the first to-be-occupied device may obtain the user information of the first device and the user information of the second device, and determine whether the user information of the first device matches the user information of the second device.

For example, the first device is a computer, the second device is a mobile phone, and the first to-be-occupied device is a sound box. The mobile phone currently occupies the sound box, and the mobile phone sends device information of the mobile phone to the sound box. The computer may broadcast the sixth message to announce that the computer prepares to occupy the sound box, where the sixth message includes device information of the computer. The sound box may determine, based on the sixth message, that another device prepares to occupy the sound box. The sound box may determine a device matching result between the device information of the mobile phone and the device information of the computer, and feed back the device matching result to the computer. The computer may receive the eighth message sent by the sound box, where the eighth message includes the device matching result. The computer may determine, based on the device matching result, that the sound box is currently occupied by another device. Further, if the device matching result indicates that the matching succeeds, the mobile phone may be a trusted device of the computer. Similarly, when the mobile phone occupies the sound box, the mobile phone may send user information of the mobile phone to the sound box. The sixth message includes user information of the computer. The sound box may determine a user matching result between the user information of the mobile phone and the user information of the computer, and feed back the user matching result to the computer, that is, the eighth message includes the user matching result. The computer may determine, based on the user matching result, that the sound box is currently occupied by another device. Further, if the user matching result indicates that the matching succeeds, the mobile phone may be a trusted device of the computer.

Optionally, the sixth message includes identification information of the first to-be-occupied device.

That is, after receiving the sixth message, the second device may determine, based on the identification information of the first to-be-occupied device, that the first to-be-occupied device that the first device prepares to occupy is the device currently occupied by the second device. Further, the second device may feed back the device matching result or the user matching result to the first device.

That is, after receiving the sixth message, the first to-be-occupied device may determine that the first device prepares to occupy the first to-be-occupied device, and further feed back the device matching result or the user matching result to the first device.

Figure (c) in FIG. 6 is a schematic flowchart of a method for obtaining the information (including the device matching result or the user matching result) related to the second device according to an embodiment of this application.

603: The first device sends a ninth message to a server, where the ninth message includes the device information of the first device or the user information of the first device, and the ninth message is used to indicate that the first device prepares to occupy the first to-be-occupied device.

Correspondingly, the server may receive the ninth message sent by the first device.

604: The server sends a tenth message to the first device in response to the ninth message, where if the ninth message includes the device information of the first device, the tenth message includes the device matching result, or if the ninth message includes the user information of the first device, the tenth message includes the user matching result.

Correspondingly, the first device receives the tenth message sent by the server.

In other words, the server may obtain the device information of the first device and the device information of the second device, and determine whether the user information of the first device matches the user information of the second device. Alternatively, the server may obtain the user information of the first device and the user information of the second device, and determine whether the user information of the first device matches the user information of the second device.

For example, the first device is a computer, the second device is a mobile phone, and the first to-be-occupied device is a sound box. The mobile phone currently occupies the sound box, and the mobile phone sends device information of the mobile phone and identification information of the sound box to the server. The computer may send the ninth message to the server, to notify the server that the computer prepares to occupy the sound box, where the ninth message includes device information of the computer. The server may determine, based on the ninth message, that another device prepares to occupy the sound box. The server may determine a device matching result between the device information of the mobile phone and the device information of the computer, and feed back the device matching result to the computer. The computer may receive the tenth message sent by the server, where the tenth message includes the device matching result. The computer may determine, based on the device matching result, that the sound box is currently occupied by another device. Further, if the device matching result indicates that the matching succeeds, the mobile phone may be a trusted device of the computer. Similarly, when the mobile phone occupies the sound box, the mobile phone may send user information of the mobile phone to the server. The ninth message includes user information of the computer. The server may determine a user matching result between the user information of the mobile phone and the user information of the computer, and feed back the user matching result to the computer, that is, the tenth message includes the user matching result. The computer may determine, based on the user matching result, that the sound box is currently occupied by another device. Further, if the user matching result indicates that the matching succeeds, the mobile phone may be a trusted device of the computer.

Optionally, the ninth message includes identification information of the first to-be-occupied device.

That is, after receiving the ninth message, the server may feed back, based on the identification information of the first to-be-occupied device, the device matching result or the user matching result corresponding to the first to-be-occupied device to the first device.

As described above, in the method 600, the first device may obtain the information related to the second device by using steps 601*a* and 602*a*, or steps 601*b* and 602*b*, or steps 603 and 604.

The following describes occupation of the first to-be-occupied device.

Optionally, when the first to-be-occupied device can establish a wireless connection to only one device, that the first to-be-occupied device is not occupied may mean that the first to-be-occupied device does not establish a wireless connection to any device. That the first to-be-occupied device is occupied by a target device may mean that the first to-be-occupied device has currently established a wireless connection to the target device.

The first to-be-occupied device may include one wireless communication channel. That the first to-be-occupied device establishes a wireless connection to the target device may mean that the target device occupies the wireless communication channel of the first to-be-occupied device. The wireless communication channel may be, for example, a Bluetooth channel or a Wi-Fi channel.

When the first to-be-occupied device establishes the wireless connection to the target device, the first to-be-occupied device may receive data sent by the target device, or the first to-be-occupied device may send data to the target device. For example, the mobile phone may establish a wireless connection to the headset, so that the headset can play a voice of a caller that is sent by the mobile phone, and send, to the mobile phone, a voice of a callee that is recorded by the headset. For another example, the mobile phone may establish a wireless connection to the sound box, so that the sound box can play audio sent by the mobile phone, and/or send audio collected by the sound box to the mobile phone. For another example, the mobile phone may establish a wireless connection to the camera, so that the camera can send, to the mobile phone, a video or an image that is shot by the camera.

It should be noted that the first to-be-occupied device includes one or more media channels. That the first to-be-occupied device establishes a wireless connection to the target device indicates the following two cases: The target device establishes a wireless connection to the first to-be-occupied device, but does not occupy the one or more media channels of the first to-be-occupied device; or the target device establishes a wireless connection to the first to-be-occupied device, and occupies at least one media channel of the first to-be-occupied device. For the headset, the one or more media channels may include an audio channel. For the sound box, the one or more media channels may include an audio channel. For the camera, the one or more media channels may include an audio channel and a video channel.

For example, the target device is a mobile phone, and the first to-be-occupied device is a headset. A wireless connection is established between the mobile phone and the headset, and the mobile phone exchanges data through a Bluetooth channel of the headset. An audio playing service of the mobile phone occupies an audio channel of the headset. Therefore, the user can play, by using the headset, an audio file stored in the mobile phone.

For another example, the target device is a computer, and the first to-be-occupied device is a camera. A wireless connection is established between the computer and the camera, and the computer exchanges data through a Wi-Fi channel of the camera. The user is using the computer for office work. No service of the computer occupies a video channel or an audio channel of the camera. The camera is in standby mode, and no video or image is shot.

For another example, the target device is a television, and the first to-be-occupied device is a sound box. A wireless connection is established between the television and the sound box, and the computer exchanges data through a Wi-Fi channel of the sound box. However, no service of the television occupies an audio channel of the sound box. The computer does not play programs, videos, audio, or pictures, and the sound box does not receive audio data from the television.

Optionally, before the first device obtains the information related to the second device, the method further includes: The first device stores the identification information of the first to-be-occupied device.

In other words, the first device may scan, by using a broadcast message, a device around the first device. The device around the first device may include a device that previously established a wireless connection to the first device, and a device that has never established a wireless connection to the first device. In a possible case, the device that has never established a wireless connection to the first device needs to be manually connected by a user. The first device may store information about a device that previously established a wireless connection to the first device, so that the device that previously established a wireless connection to the first device may automatically establish a wireless connection to the first device.

Optionally, when the first to-be-occupied device may establish wireless connections to a plurality of devices, that the first to-be-occupied device is not occupied may mean that the first to-be-occupied device does not establish a wireless connection to any device, or any device that establishes a wireless connection to the first to-be-occupied device does not occupy the media channel of the first to-be-occupied device. That the first to-be-occupied device is occupied by the target device may mean that the target device that establishes a wireless connection to the first to-be-occupied device is occupying the media channel of the first to-be-occupied device.

In other words, the first to-be-occupied device includes a plurality of wireless communication channels. The first device and the second device may simultaneously establish wireless connections to the first to-be-occupied device. The first device and the second device each may occupy one wireless communication channel of the first to-be-occupied device. That the second device occupies the first to-be-occupied device may mean that the second device occupies the wireless communication channel and the media channel of the first to-be-occupied device.

For example, a plurality of devices that establish wireless connections to the headset include a mobile phone. Any device in the plurality of devices occupies the Bluetooth channel of the headset. The mobile phone does not occupy the audio channel of the headset, and the mobile phone does not use the headset to play or record audio. Therefore, the mobile phone does not occupy the headset.

For another example, devices that establish wireless connections to the camera are a mobile phone and a tablet computer. Both the mobile phone and the tablet computer occupy the Wi-Fi channel of the camera. The mobile phone occupies the video channel and the audio channel of the camera, and uses the camera to shoot a video and a picture. Therefore, the mobile phone is occupying the camera. However, the tablet computer does not occupy the video channel or the audio channel of the camera. Therefore, the tablet computer does not occupy the camera.

402: The first device determines, based on the information related to the second device, whether the second device is a trusted device.

To be a trusted device, the second device needs to meet at least one of the following conditions: The device information of the second device successfully matches the device information of the first device; and the user information of the second device successfully matches the user information of the first device.

The device information of the second device may be, for example, a unique identity (identity, ID) of the second device, a device name of the second device (an identifier that may be changed by a user and is used to identify the device), or the like.

If the user information of the second device successfully matches the user information of the first device, it may be considered that the first device is a trusted device specified by the user in advance. Therefore, it may be considered that occupation of the first to-be-occupied device by the first device is allowed by a same user, and meets an expectation of the user. This helps reduce a quantity of operations of manually occupying the first to-be-occupied device by the user.

For example, the first device may store a trusted device information list, and the trusted device information list may include a unique identity of a trusted device or a device name of a trusted device. If the unique identity of the second device appears in the trusted device information list, it means that the device information of the second device successfully matches the device information of the first device.

If the user information of the second device successfully matches the user information of the first device, it may be considered that the user who uses the second device and the user who uses the first device are a same user. Therefore, that the first device occupies the first to-be-occupied device may be considered as being allowed by the same user, and basically does not cause leakage of user privacy. In addition, the user may still interact with the first to-be-occupied device. Therefore, a quantity of operations of manually occupying the first to-be-occupied device by the user can be reduced.

For example, that the user information of the second device matches the user information of the first device may be that the information about the electronic account logged in to the second device is the same as information about an electronic account logged in to the first device.

For another example, that the user information of the second device matches the user information of the first device may be that an auricle shape of the user who uses the second device is the same as an auricle shape stored in the first device.

For another example, that the user information of the second device matches the user information of the first device may be that a brainwave type or a brainwave intensity of the user that uses the second device or the first to-be-occupied device is the same as a brainwave type or a brainwave intensity that is stored in the first device. The brainwave type may include, for example, a γ wave: more than 38 times/second, which is an extremely excited brainwave, a β wave: 14 to 38 times/second, which is a relatively excited brainwave, an α wave: 8 to 14 times/second, which is a brainwave during relaxation and meditation, a θ wave: 4 to 7 times/second, which is a brainwave during half-sleep, and a δ wave: 0.5 to 3.5 times/second, which is a brainwave during deep sleep. The brainwave type or the brainwave intensity of the user who uses the second device may be a brainwave type or a brainwave intensity that is stored in the second device, or a brainwave type or a brainwave intensity that is collected by the first to-be-occupied device.

For another example, that the user information of the second device matches the user information of the first device may be that voiceprint information of the user who uses the second device matches voiceprint information stored in the first device. The voiceprint information of the user who uses the second device may be voiceprint information stored in the second device or voiceprint information collected by the first to-be-occupied device.

For another example, that the user information of the second device matches the user information of the first device may be that face information of the user who uses the second device matches face information stored in the first device. The face information of the user who uses the second device may be face information of the user that is stored in the second device, or face information collected by the first to-be-occupied device.

403: The first device occupies the first to-be-occupied device when the second device is the trusted device.

When the first to-be-occupied device can establish a wireless connection to only one device, that the first device occupies the first to-be-occupied device may mean that the first device establishes a wireless connection to the first to-be-occupied device. When the first to-be-occupied device may establish wireless connections to a plurality of devices, that the first device occupies the first to-be-occupied device may mean that the first device establishes a wireless connection to the first to-be-occupied device, and the first device occupies the media channel of the first to-be-occupied device.

In an example, when the first to-be-occupied device can establish a wireless connection to only one device, a process in which the first device occupies the first to-be-occupied device may include: The first to-be-occupied device releases the wireless connection to the second device, the first device and the first to-be-occupied device establish a wireless connection, and the first device occupies the media channel of the first to-be-occupied device.

In an example, when the first to-be-occupied device may establish wireless connections to a plurality of devices, a process in which the first device occupies the first to-be-occupied device may include: The second device stops occupying the media channel of the first to-be-occupied device, the first device and the first to-be-occupied device establish a wireless connection, and the first device occupies the media channel of the first to-be-occupied device.

Optionally, the method further includes: The first device displays first prompt information, where the first prompt information indicates that the first to-be-occupied device is occupied by the first device.

In other words, the first device may remind the user that an occupation status of the first to-be-occupied device is switched (from being occupied by the second device to being occupied by the first device). Therefore, misoperations performed by the user on the first to-be-occupied device can be reduced, so that the user can clearly learn of the occupation status of the first to-be-occupied device.

Optionally, the second device displays second prompt information, and the second prompt information indicates that the first to-be-occupied device is occupied by the first device.

In other words, the second device may remind the user that the first to-be-occupied device is occupied by another device (for example, the first to-be-occupied device is switched from being occupied by the second device to being occupied by the first device). The user may learn, based on the second prompt information, a reason why the second device cannot continue to occupy the first to-be-occupied device. Therefore, misoperations performed by the user on the first to-be-occupied device can be reduced.

An example in which the user information of the second device matches the user information of the first device is used below for description by using FIG. 7 to FIG. 21. A plurality of specific implementations of the device occupation method 400 are described. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

Figure 7:
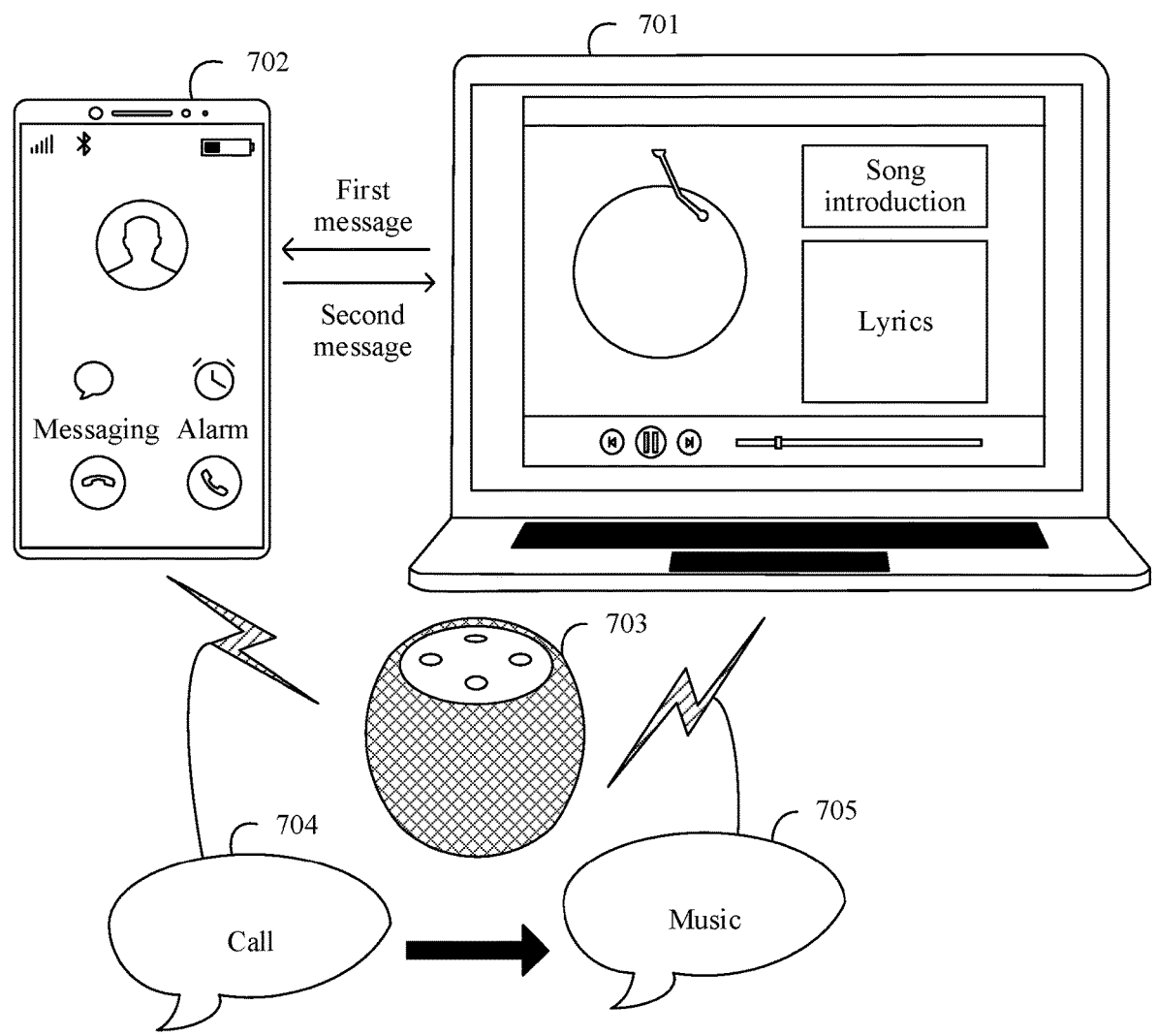
FIG. 7 is a schematic diagram of a scenario of a device occupation method according to an embodiment of this application.

First, an example in which the first device broadcasts the first message and receives the second message sent by the second device (that is, steps 501*a* and 502*a* in the foregoing description) is used to describe a specific implementation of the device occupation method 500 with reference to FIG. 7. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

A first device 701 is a computer, a second device 702 is a mobile phone, and a first to-be-occupied device 703 is a sound box. The mobile phone 702 establishes a wireless connection to the sound box 703, and the computer 701 establishes a wireless connection to the sound box 703. The user is using the mobile phone 702 and the sound box 703 to answer a call 704. Then, a user operates the computer 701 to play music. The computer 701 may broadcast a first message, where the first message includes identification information of the sound box 703, so as to determine whether the sound box 703 is being used by another device other than the computer 701. The mobile phone 702 receives the first message, and may send a second message to the computer 701, where the second message includes information about an electronic account logged in to the mobile phone 702. The computer 701 may receive the second message sent by the mobile phone 702, and determine that another device is using the sound box 703. Therefore, the computer 701 needs to further determine whether the sound box 703 can be occupied. The computer 701 may perform matching between the electronic account information in the second message and information about an electronic account logged in to the computer 701. If the matching succeeds, it indicates that the user using the computer 701 and the user using the mobile phone 702 are a same user. Therefore, the computer 701 may occupy the sound box 703, and play music 705 by using the sound box 703.

Figure 8:
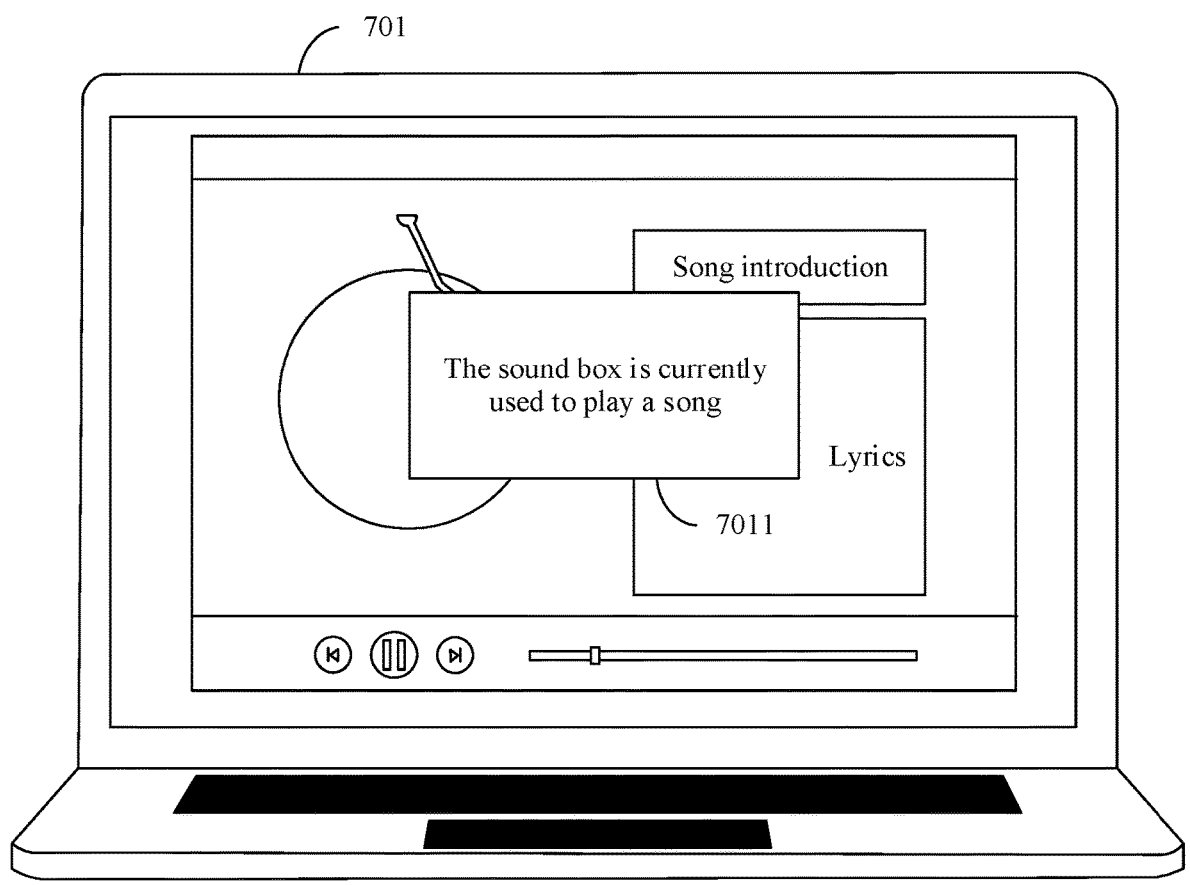
FIG. 8 is a schematic diagram of a user interface of a device occupation method according to an embodiment of this application.

In addition, as shown in FIG. 8, the computer 701 may display first prompt information 7011: The sound box is currently used to play a song. The user may learn, based on the first prompt information 7011, that the device occupying the sound box 703 is the computer 701, that is, learn that the computer 701 is using the sound box 703 to play music.

Figure 9:
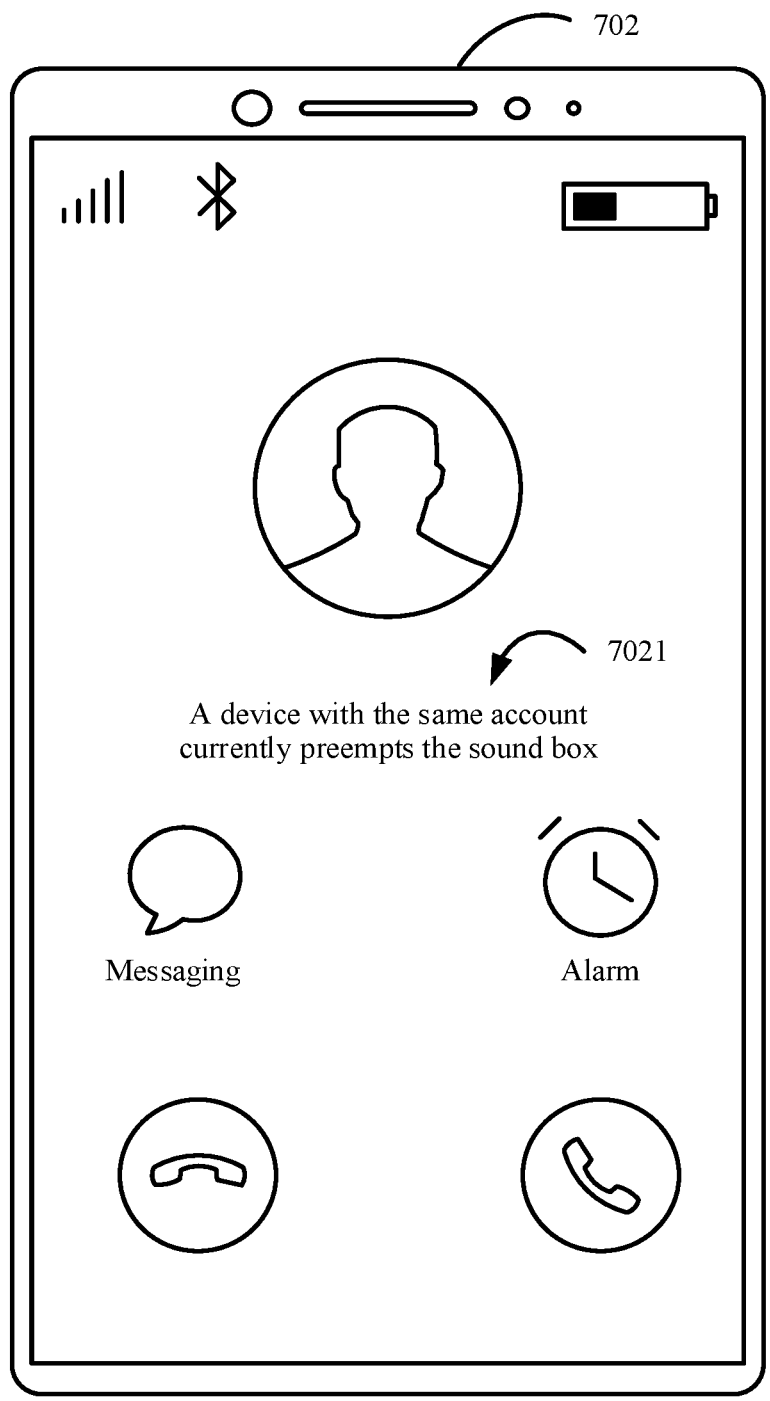
FIG. 9 is a schematic diagram of a user interface of a device occupation method according to an embodiment of this application.

In addition, as shown in FIG. 9, the mobile phone 702 may display second prompt information 7021: A device with the same account currently preempts the sound box. After the sound box 703 stops the call, the user may learn, based on the second prompt information 7011 displayed on the mobile phone, a reason why the sound box 703 stops the call.

Optionally, that the first device occupies the first to-be-occupied device includes: The first device occupies the first to-be-occupied device based on a detected first operation.

In other words, the first device may occupy the first to-be-occupied device in response to the first operation. In other words, an occasion on which the first device occupies the first to-be-occupied device may be determined by the first operation.

The first operation may be an operation performed by the user on the first device, the second device, or the first to-be-occupied device.

Figure 10:
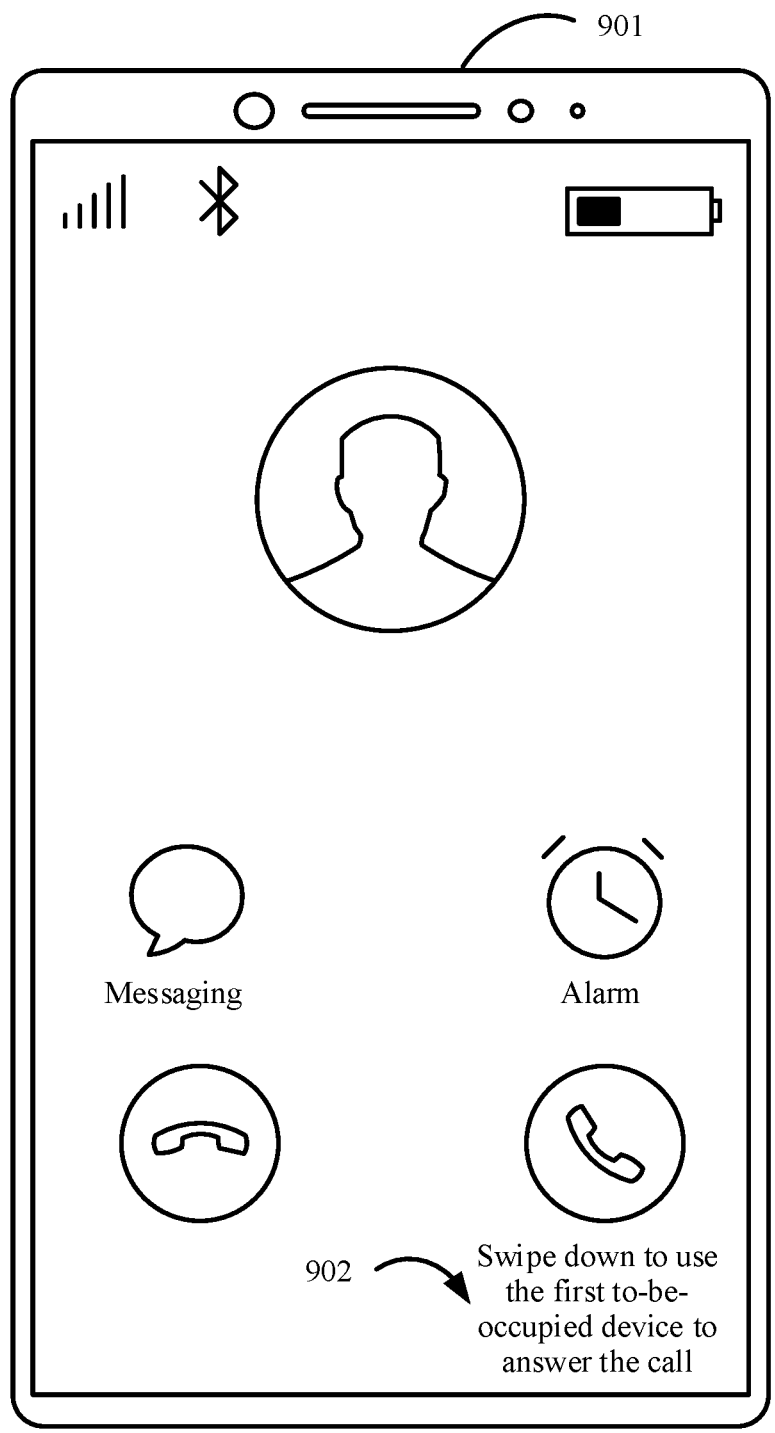
FIG. 10 is a schematic diagram of a user interface of a device occupation method according to an embodiment of this application.

For example, a first device 901 has an incoming call and the call has not been answered, and a second device currently occupies a first to-be-occupied device and plays audio. As shown in FIG. 10, because a user who uses the first device 901 and a user who uses the second device are a same user, the second device may display a prompt message 902: Swipe down to use the first to-be-occupied device to answer the call. The first operation may be a gesture made by the user on the first device 901, and the gesture may be a gesture of answering the call by using the first to-be-occupied device. The first device 901 may occupy the first to-be-occupied device according to the first operation, that is, after the first device 901 answers the call, the user may use the first to-be-occupied device to answer the call.

Figure 11:
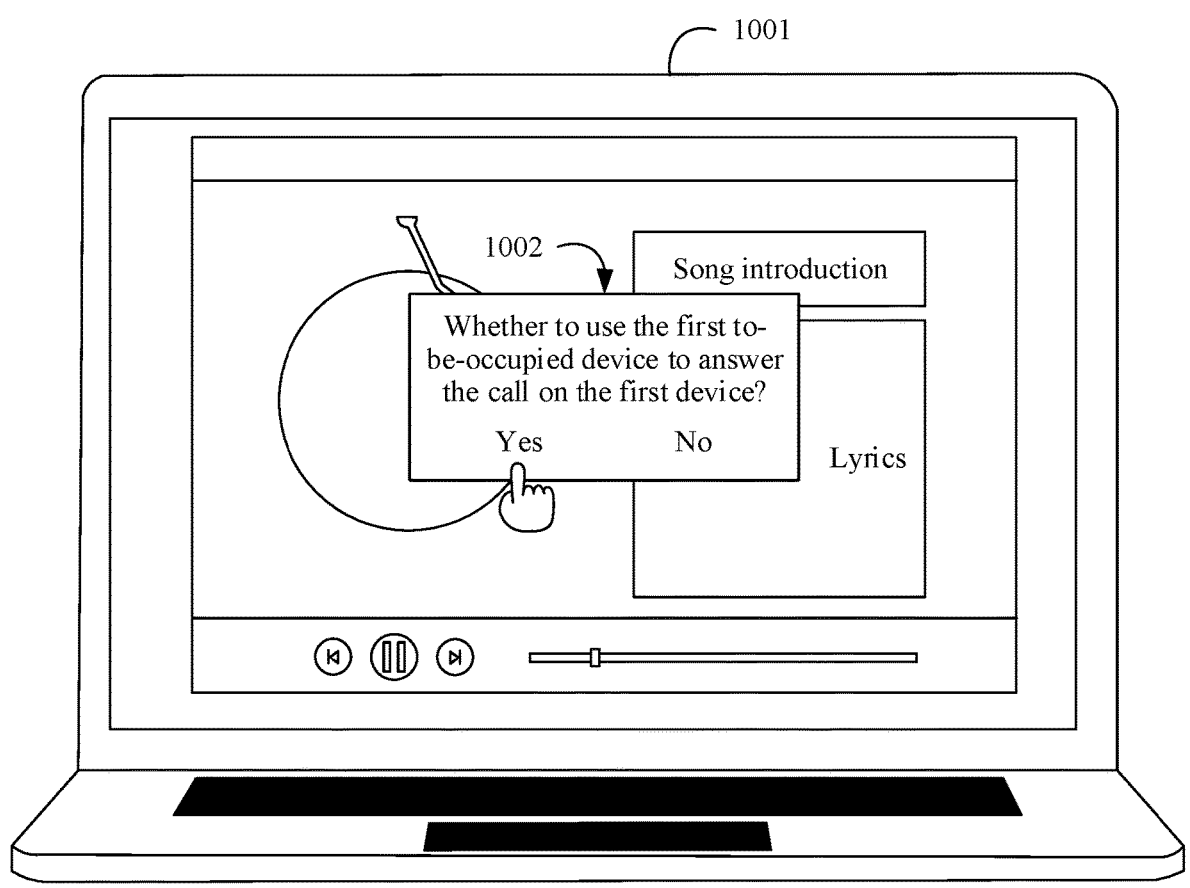
FIG. 11 is a schematic diagram of a user interface of a device occupation method according to an embodiment of this application.

For another example, a first device has an incoming call and the call has not been answered, and a second device 1001 currently occupies a first to-be-occupied device and plays audio. As shown in FIG. 11, because a user who uses the first device and a user who uses the second device 1001 are a same user, the second device 1001 may display a prompt message 1002: whether to use the first to-be-occupied device to answer the call on the first device. The first operation may be a gesture made by the user on the second device 1001, and the gesture may be a gesture of agreeing to answer the call by the first to-be-occupied device. The first device may obtain, from the second device 1001, an indication that the first to-be-occupied device is agreed to answer the call, so that the first to-be-occupied device can be occupied according to the first operation, that is, after the first device answers the call, the user may use the first to-be-occupied device to answer the call.

Figure 12:
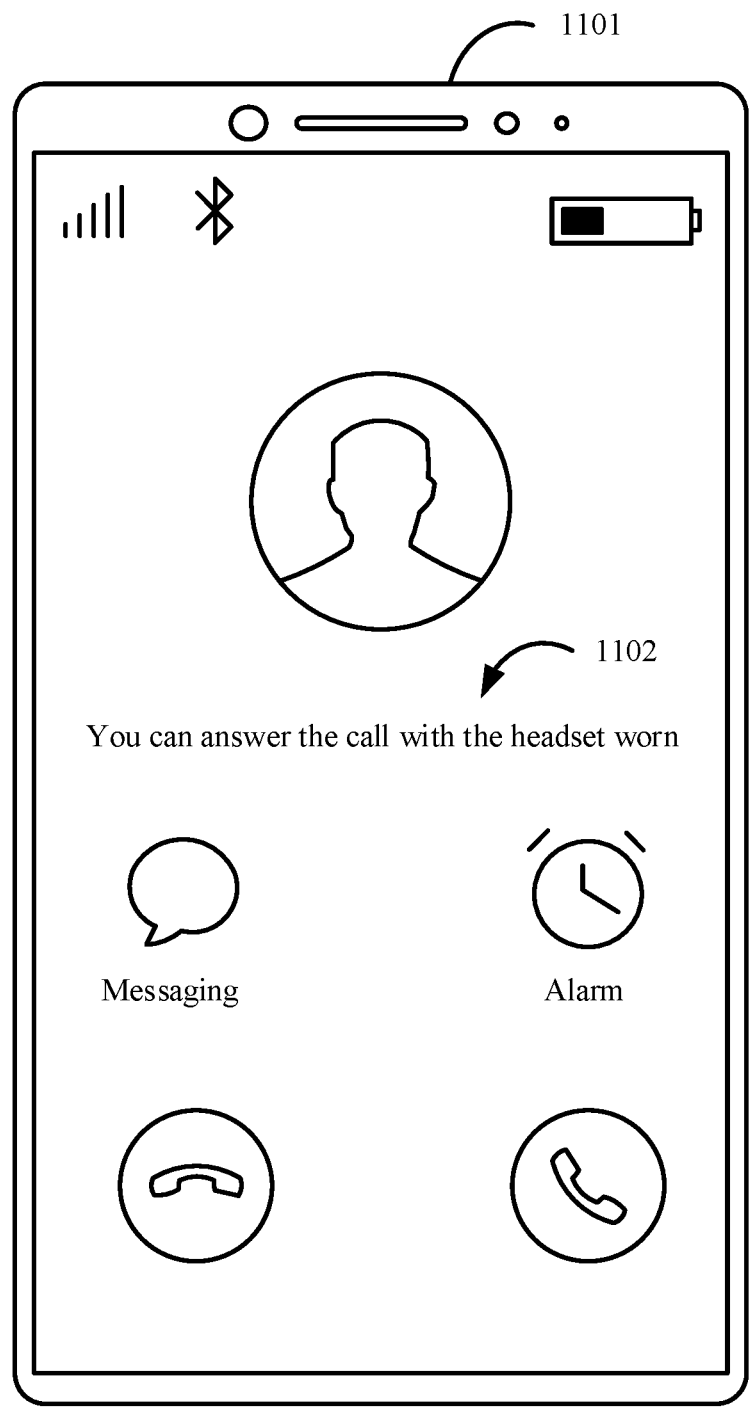
FIG. 12 is a schematic diagram of a user interface of a device occupation method according to an embodiment of this application.

For another example, the first to-be-occupied device is a headset, and the headset does not detect that a user is wearing the headset. A first device 1101 has an incoming call and the call has not been answered, and a second device currently occupies the headset and plays audio. That is, although the headset may be playing audio, because the user does not wear the headset, the user cannot listen to, by using the headset, the audio played by the second device. As shown in FIG. 12, the first device 1101 may display a prompt message 1102: You can answer the call with the headset worn. The first operation may be a detection result detected by the headset, and the detection result may be completion of a wearing action by the user. The first device 1101 may obtain, from the headset, the detection result indicating that the wearing action is completed, so as to occupy the first to-be-occupied device according to the first operation. That is, after the user wears the headset, the user may use the headset to answer the incoming call of the first device 1101.

It should be understood that the first operation is closely related to a specific device type, a service type, an application scenario, and the like, and a specific implementation method of the first operation is not limited in this application. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

Optionally, that the first device occupies the first to-be-occupied device when the second device is the trusted device includes: The first device occupies the first to-be-occupied device when the second device is the trusted device and a priority of a first service is higher than a priority of a second service, where a service that occupies the first to-be-occupied device changes from the second service to the first service, the first service is a service of the first device, and the second service is a service of the second device.

In other words, if the user that uses the first device trusts the second device, and the first service of the first device is more important or more suitable, the first device may occupy the first to-be-occupied device. Therefore, in addition to reducing a risk of privacy leakage and reducing operations of switching an occupation status, a more important service can preferably occupy the first to-be-occupied device. Therefore, a scenario requirement can be better met, and user experience can be improved.

Based on a specific scenario, that the priority of the second service is higher than the priority of the first service may include that the priority of the second service is equal to the priority of the first service.

The first service may be, for example, a call service, a video call service, an audio playing service, a video playing service, a recording service, or a photographing service.

The second service may be, for example, a call service, a video call service, an audio playing service, a video playing service, a recording service, or a photographing service.

Optionally, the services in descending order of priorities are as follows: a call service, a video call service, an audio playing service, a video playing service, a recording service, and a photographing service.

A priority of a service may be, for example, determined based on service importance, device applicability, and user preference.

Optionally, before the first device occupies the first to-be-occupied device, the method further includes: The first device determines the priority of the first service based on at least one of an importance index of the first service, an applicability index of the first device, and a user preference index of the first service.

In other words, the priority of the first service is determined based on at least one of the importance index of the first service, the applicability index of the first device, and the user preference index of the first service.

The importance index of the first service corresponds to importance of the service. The applicability index of the first device corresponds to applicability of the device. The user preference index of the first service corresponds to a preference of the user.

In an example, the first device determines the priority of the first service based on the importance index of the first service.

For example, service importance indexes in descending order are: a call service, a video call service, a recording service, a photographing service, an audio playing service, and a video playing service. Therefore, when the first service is a call service and the second service is a recording service, the first device may occupy the first to-be-occupied device, so that the service of higher importance occupies the first to-be-occupied device.

For another example, an importance index of a call service=an importance index of a video call service>an importance index of a recording service=an importance index of a photographing service>an importance index of an audio playing service=an importance index of a video playing service. Therefore, when the first service is a recording service and the second service is a call service, the first device may occupy the first to-be-occupied device, so that the service of higher importance occupies the first to-be-occupied device.

It should be understood that a specific value of the service importance index is not limited in this embodiment of this application.

In an example, the first device determines the priority of the first service based on the applicability index of the first device.

For example, the first device is a mobile phone, the second device is a computer, and the first to-be-occupied device is a headset. Compared with the computer, the mobile phone is more portable, and the headset is also more portable. Therefore, compared with cooperation between the computer and the headset, cooperation between the mobile phone and the headset can implement higher portability.

For another example, the first device is a television, the second device is a mobile phone, and the first to-be-occupied device is a sound box. Compared with the mobile phone, a program played by the television can be watched by many people. However, the mobile phone has higher privacy. Therefore, for the sound box, applicability of the television may be higher than applicability of the mobile phone.

For another example, the first device is a computer, the second device is a mobile phone, and the first to-be-occupied device is a camera. The mobile phone is equipped with a camera, but the computer does not. The computer has a higher demand for the camera. Therefore, for the camera, applicability of the computer may be higher than applicability of the mobile phone.

It should be understood that a specific value of the device applicability index is not limited in this embodiment of this application.

In an example, the first device determines the priority of the first service based on the user preference index of the first service.

Because the user of the first device and the user of the second device are a same user, the user preference index of the first service and a user preference index of the second service are comparable. When the user preference index of the first service is higher than the user preference index of the second service, the first service occupies the first to-be-occupied device occupied by the second service, and this can better meet a preference of the user.

For example, the first device is a mobile phone, the second device is a computer, and the first to-be-occupied device is a headset. The first service is an audio playing service, and the second service is a video playing service. Compared with using the headset to play a video, the user prefers to use the headset to play audio. Therefore, occupying the headset by the mobile phone better meets a preference of the user.

For another example, the first device is a mobile phone, the second device is a computer, and the first to-be-occupied device is a sound box. The first service is a recording service, and the second service is an audio playing service. Playing audio by using the computer and the sound box affects a recording effect of the mobile phone. In addition, a recording effect of the sound box is better than that of the mobile phone. Therefore, occupying the sound box by the mobile phone better meets a preference of the user.

For another example, the first device is a computer, the second device is a television, and the first to-be-occupied device is a camera. The first service is a video shooting service, and the second service is a picture photographing service. Because the video shooting service can obtain more picture information, the user prefers to use the camera to shoot a video. Therefore, occupying the camera by the computer better meets a preference of the user.

It should be understood that a specific value of the user preference index is not limited in this embodiment of this application.

A priority of a service may be, for example, a sum of an importance index of the service, a device applicability index, and a user preference index of the service.

It should be understood that the first device may obtain priority information of the second service, and determine whether the priority of the first service is higher than the priority of the second service. Alternatively, the first device may obtain a priority comparison result, where the priority comparison result is a result of comparison between the priority of the first service and the priority of the second service.

For example, the first device may obtain the priority information of the second device from one or more of the second device, the first to-be-occupied device, or the server.

For another example, the first device may send priority information of the first service to the second device (or the first to-be-occupied device or the server), and obtain the priority comparison result from the second device (or the first to-be-occupied device or the server).

Figure 13:
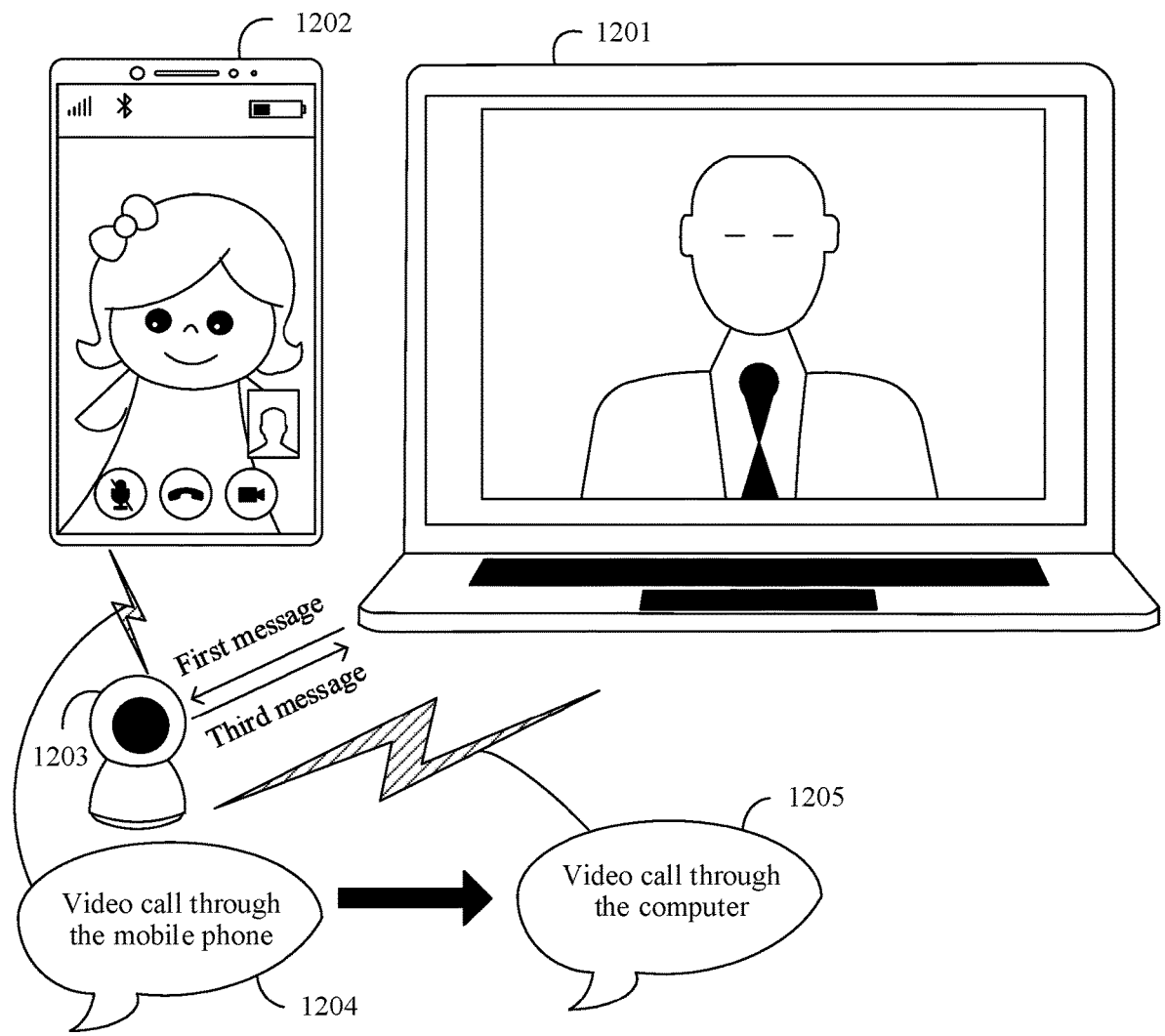
FIG. 13 is a schematic diagram of a scenario of a device occupation method according to an embodiment of this application.

As shown in FIG. 13, a first device 1201 is a computer, a second device 1202 is a mobile phone, and a first to-be-occupied device 1203 is a camera. The mobile phone 1202 is on a video call 1204 by using the camera 1203. The computer 1201 receives a video call request. Because a small camera is installed on the mobile phone, and no camera is installed on the computer, a priority of a video call service of the mobile phone may be lower than a priority of a video call service of the computer. The computer 1201 may broadcast a first message, where the first message includes identification information of the camera 1203, to determine whether the camera 1203 is being used by another device other than the computer 1201. The camera 1203 receives the first message, and may send a third message to the computer 1201, where the third message includes collected face information and information about the video call service of the mobile phone that occupies the camera 1203. The computer 1201 may receive the third message sent by the camera 1203, and determine that another device is using the camera 1203. Therefore, the computer 1201 needs to further determine whether the camera 1203 can be occupied. The computer 1201 may perform matching between the face information in the third message and face information stored in the computer 1201. If the matching succeeds, and the priority of the video call service of the mobile phone is lower than the priority of the video call service of the computer, the computer 1201 may occupy the camera 1203, and perform a video call 1205 by using the camera 1203. Optionally, the mobile phone may enable the small camera, so as to avoid cutting off the video call of the mobile phone.

Figure 14:
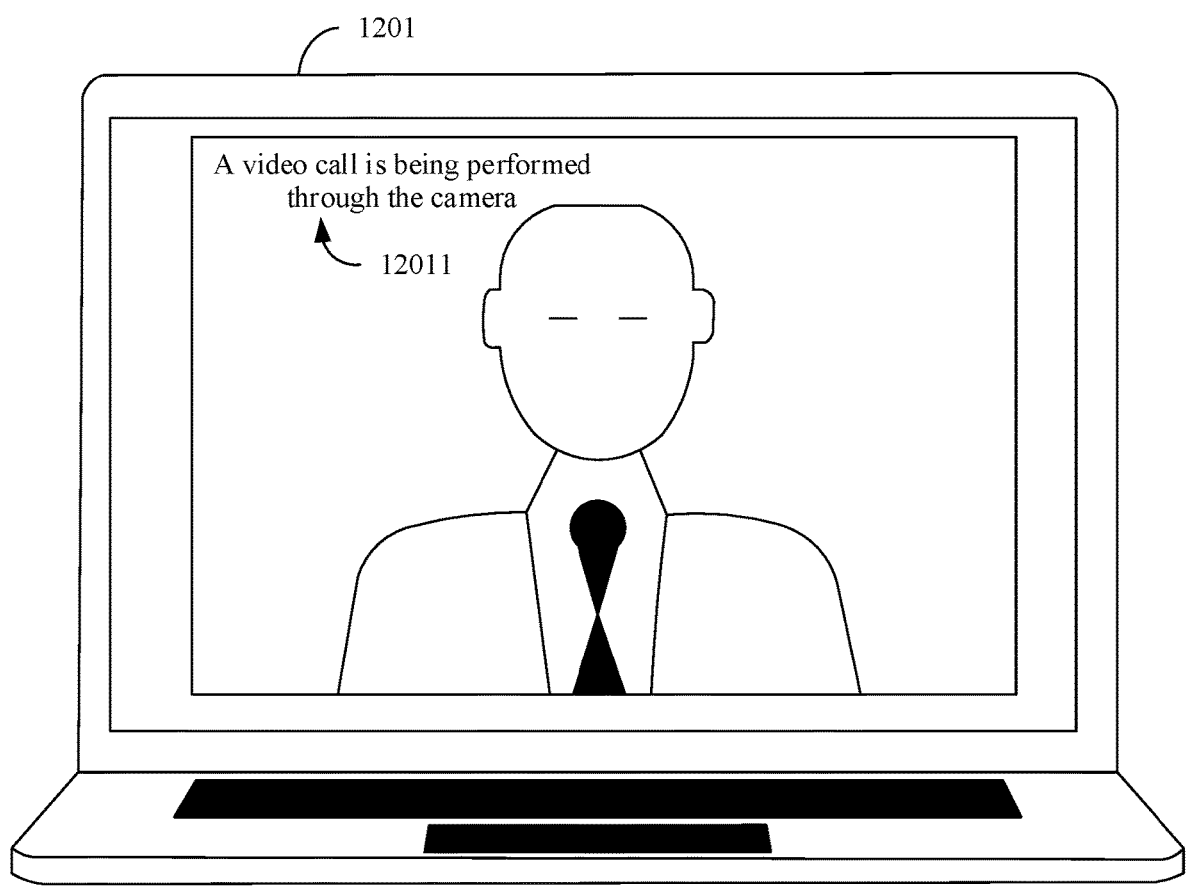
FIG. 14 is a schematic diagram of a user interface of a device occupation method according to an embodiment of this application.

In addition, as shown in FIG. 14, the computer 1201 may display first prompt information 12011: A video call is being performed through the camera. The user may learn, based on the first prompt information 12011, that the device occupying the camera 1203 is the computer 1201, that is, learn that the computer 1201 is using the camera 1203 to play music.

Figure 15:
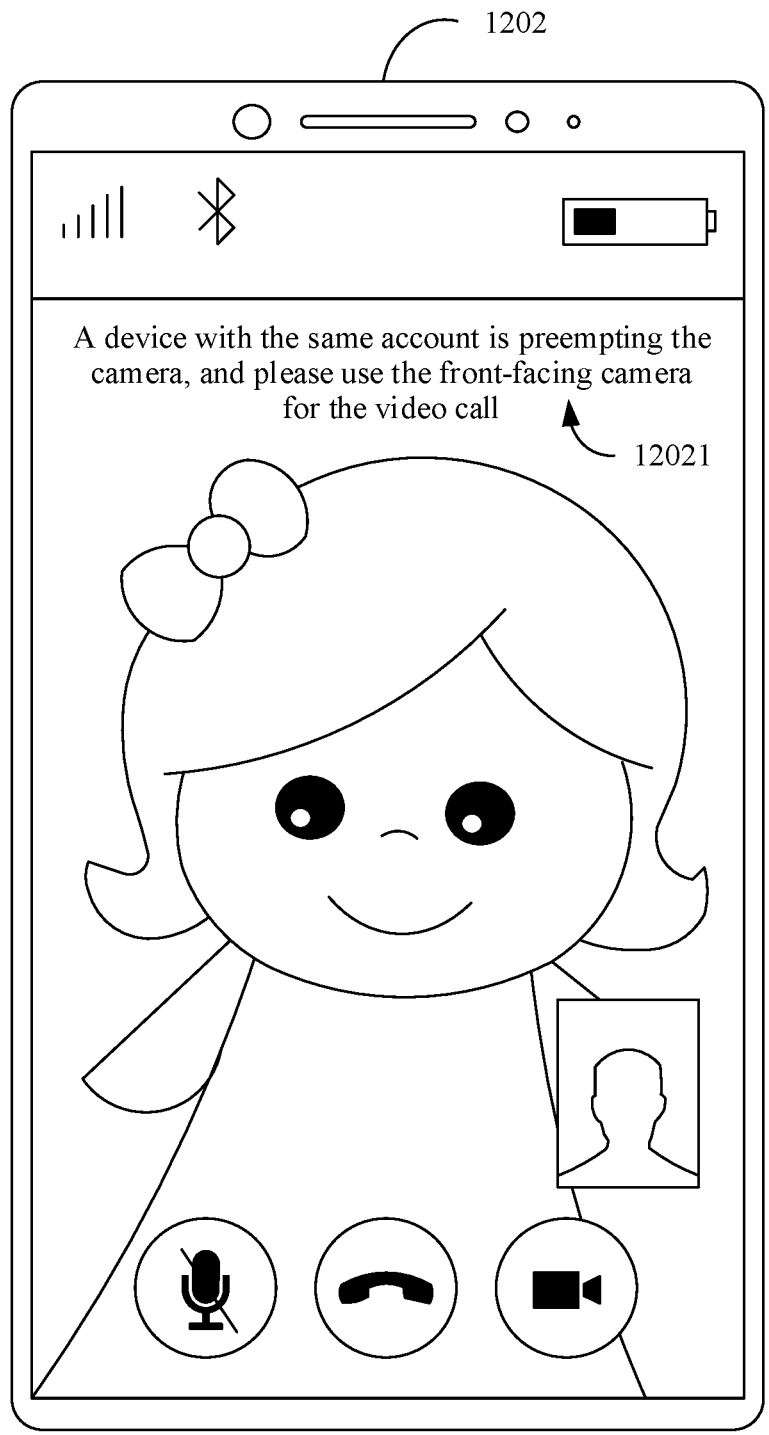
FIG. 15 is a schematic diagram of a user interface of a device occupation method according to an embodiment of this application.

In addition, as shown in FIG. 15, the mobile phone 1202 may display second prompt information 12021: A device with the same account is preempting the camera, and please use the front-facing camera for the video call. The user may continue the video call by using the front-facing camera based on the second prompt information 12011 displayed on the mobile phone.

Optionally, when the second device is the trusted device, and the priority of the first service is lower than the priority of the second service, the first device occupies the first to-be-occupied device based on a detected second operation, and a service that occupies the first to-be-occupied device changes from the second service to the first service. The first service is a service of the first device, and the second service is a service of the second device.

Optionally, if the first device does not obtain the information related to the second device, or if the first device determines, based on the information related to the second device, that the second device is not a trusted device, the first device occupies the first to-be-occupied device based on a detected second operation.

That is, when it cannot be determined whether the second device is a trusted device, the first to-be-occupied device may be occupied based on an operation of the user. When it cannot be determined whether the second device is a trusted device, the first device responds to the operation and occupies the first to-be-occupied device, so that flexibility of switching the occupation status of the first to-be-occupied device can be improved.

Figure 16:
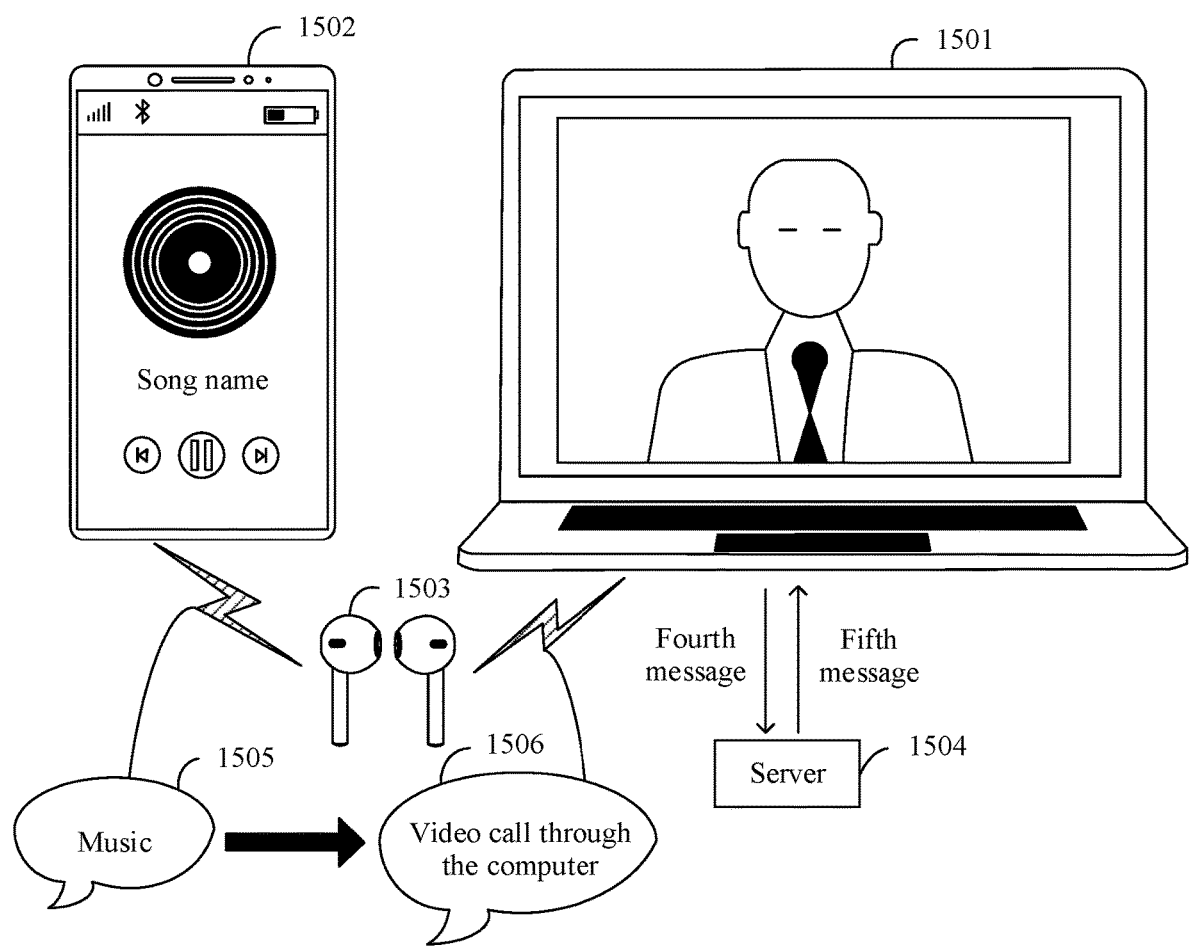
FIG. 16 is a schematic diagram of a scenario of a device occupation method according to an embodiment of this application.

As shown in FIG. 16, a first device 1501 is a computer, a second device 1502 is a mobile phone, and a first to-be-occupied device 1503 is a headset. The mobile phone 1502 establishes a wireless connection to the headset 1503, and the computer 1501 establishes a wireless connection to the headset 1503. The mobile phone 1502 is using the headset 1503 to play music 1505. The mobile phone 1502 may send a message to a server 1504, where the message may include user information of the mobile phone 1502 and identification information of the headset 1503. Then, the computer 1501 receives a video call request. The computer 1501 may send a ninth message to the server 1504, where the ninth message includes the identification information of the headset 1503 and user information of the computer 1501, to determine whether the headset 1503 is being used by another device other than the computer 1501. The server 1504 receives the ninth message.

Figure 17:
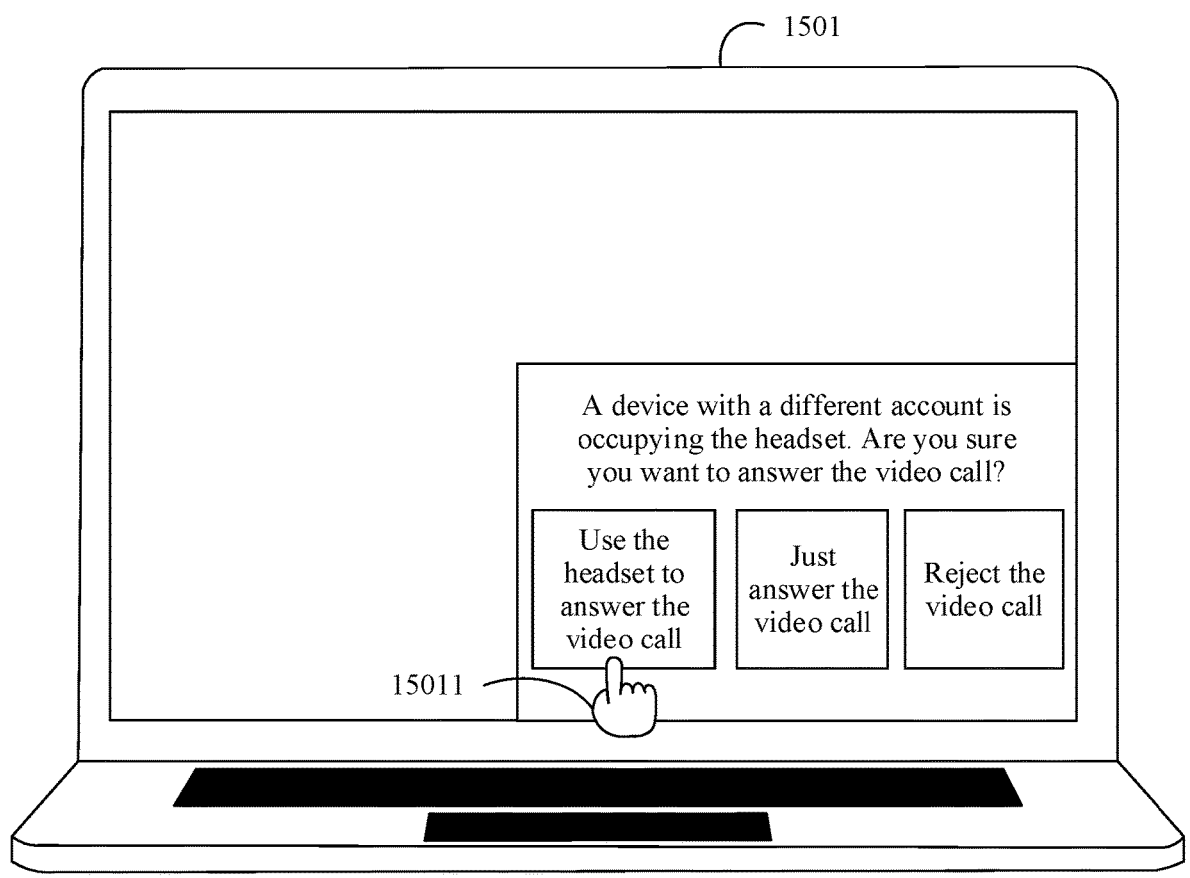
FIG. 17 is a schematic diagram of a user interface of a device occupation method according to an embodiment of this application.

In a possible case, as shown in FIG. 17, the server 1504 may send a tenth message to the computer 1501, and the tenth message includes a matching result of the user information of the mobile phone 1502 and the user information of the computer 1501. The computer 1501 may receive the tenth message sent by the server 1504, and determine that another device is using the headset 1503. In this case, the computer 1501 needs to further determine whether the headset 1503 can be occupied. When the matching result indicates that the user information of the mobile phone 1502 fails to match the user information of the computer 1501, it indicates that a user of the headset 1503 is different from a user of the computer 1501. The computer 1501 may display prompt information: A device with a different account is occupying the headset. Are you sure you want to answer the video call? The user may indicate, through an operation, the computer 1501 to occupy or not occupy the headset 1503. Therefore, the computer 1501 may occupy the headset 1503 based on a second operation 15011 of indicating the computer 1501 to occupy the headset 1503. FIG. 17 shows a diagram of a user interface displayed before the computer 1501 answers the video call. FIG. 16 shows a diagram of a user interface displayed after the computer 1501 answers the video call.

Figure 18:
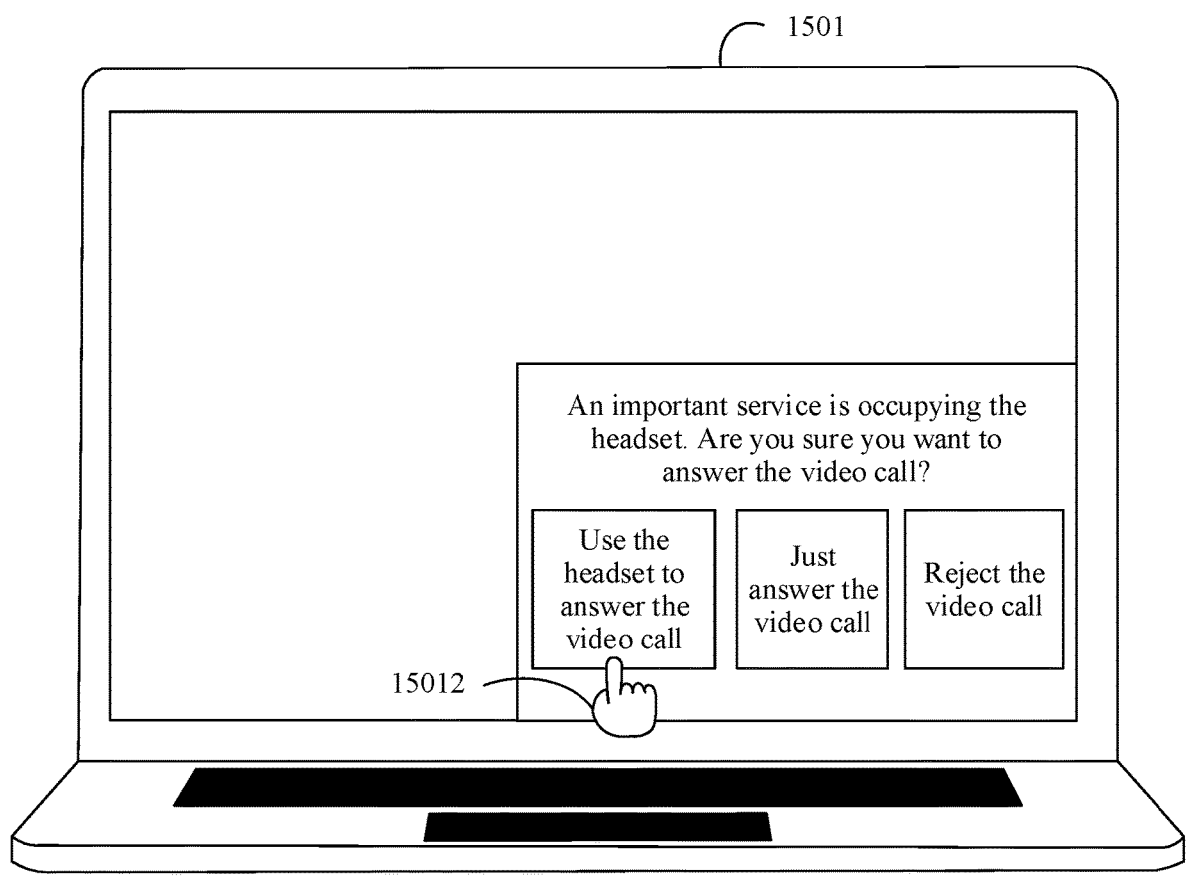
FIG. 18 is a schematic diagram of a user interface of a device occupation method according to an embodiment of this application.

In a possible case, as shown in FIG. 18, in addition to sending the user information of the mobile phone 1502 to the server 1504, the mobile phone 1502 may further send service information of the mobile phone 1502 to the server 1504. The ninth message further includes service information of the computer 1501. The server 1504 may send a tenth message to the computer 1501. The tenth message includes a user matching result and a priority comparison result, the user matching result indicates that the user information of the mobile phone 1502 successfully matches the user information of the computer 1501, and the priority comparison result indicates that a priority of a mobile phone service (an audio playing service) is higher than a priority of a computer service (a video call service). The computer 1501 may receive the tenth message sent by the server 1504. The computer 1501 may display, based on the tenth message, prompt information: An important service is occupying the headset. Are you sure you want to answer the video call? The user may indicate, through an operation, the computer 1501 to occupy or not occupy the headset 1503. Therefore, the computer 1501 may occupy the headset 1503 based on a second operation 15012 of indicating the computer 1501 to occupy the headset 1503. FIG. 18 shows a diagram of a user interface displayed before the computer 1501 answers the video call. FIG. 16 shows a diagram of a user interface displayed after the computer 1501 answers the video call.

404: If the first device determines, based on the information related to the second device, that the second device is not a trusted device, the first device gives up occupying the first to-be-occupied device.

In other words, if the second device is not a trusted device, it may be considered that it is not a behavior trusted by the user that the first device preempts the first to-be-occupied device currently occupied by the second device. Therefore, the first device gives up occupying the first to-be-occupied device, which meets an expectation of the user.

In an example, that the second device is not a trusted device may mean that device information of trusted devices of the first device does not include the device information of the second device.

In an example, that the second device is not a trusted device may mean that a user indicated by the user information of the second device is different from a user indicated by the user information of the first device.

For example, the user information of the second device is electronic account information 1, and the user information of the first device is electronic account information 2. The electronic account information 1 corresponds to a user 1, and the electronic account information 2 corresponds to a user 2. The user 1 and the user 2 are different.

For another example, the user information of the second device is face information 1, and the user information of the first device is face information 2. The face information 1 corresponds to a user 1, and the face information 2 corresponds to a user 2. The user 1 and the user 2 are different.

In an example, that the second device is not a trusted device may mean that the first device cannot identify the information related to the second device.

For example, the first device broadcasts the first message, and receives the second message sent by the second device. The second message includes the user information of the second device, and the user information is brainwave information. However, the first device does not store user information related to brainwaves. Therefore, the first device cannot perform matching between the user information of the second device and the user information of the first device.

405: The first device gives up occupying the first to-be-occupied device when the second device is the trusted device and the priority of the first service is lower than the priority of the second service. The first service is a service that is of the first device and that prepares to occupy the first to-be-occupied device, and the second service is a service that is of the second device and that currently occupies the first to-be-occupied device.

In other words, when it is satisfied that the second device is the trusted device and that the priority of the first service is lower than the priority of the second service, the first device may give up occupying the first to-be-occupied device. In this way, a risk of leaking user privacy can be reduced, and switching of the occupation status can better meet a scenario requirement, thereby improving user experience.

Based on a specific scenario, that the priority of the first service is lower than the priority of the second service may include that the priority of the second service is equal to the priority of the first service.

It should be noted that, that the priority of the first service is lower than the priority of the second service may include that the first device does not obtain a priority comparison result. The priority comparison result is a result of comparison between the priority of the second service and the priority of the first service. Because the first device cannot obtain the priority comparison result, the first device cannot determine that the priority of the first service is definitely higher than the priority of the second service, and it may be considered that the priority of the first service is lower than the priority of the second service.

For example, the first device sends a fourth message to the server, where the fourth message includes information about the first service, and receives a twelfth message sent by the server, where the twelfth message indicates that the occupancy status of the first to-be-occupied device is a non-idle state. In addition, the first device cannot obtain the priority comparison result or information about the second service from the first to-be-occupied device, the second device, or the server. Therefore, the first device cannot determine that the priority of the first service is definitely higher than the priority of the second service. In this case, it may be considered that the priority of the first service is lower than the priority of the second service.

Optionally, the method further includes: The first device displays third prompt information, where the third prompt information indicates a reason why the first device gives up occupying the first to-be-occupied device.

In other words, the first device may remind the user of a reason why the first device cannot automatically occupy the first to-be-occupied device, so that the user can adapt, based on the third prompt information, to a plurality of scenarios in which the first device automatically occupies the first to-be-occupied device and a plurality of scenarios in which the first device cannot automatically occupy the first to-be-occupied device.

In an example, the reason why the first device gives up occupying the first to-be-occupied device includes that the user information of the second device fails to match the user information of the first device.

In an example, the reason why the first device gives up occupying the first to-be-occupied device includes that the priority of the first service is lower than the priority of the second service.

Figure 19:
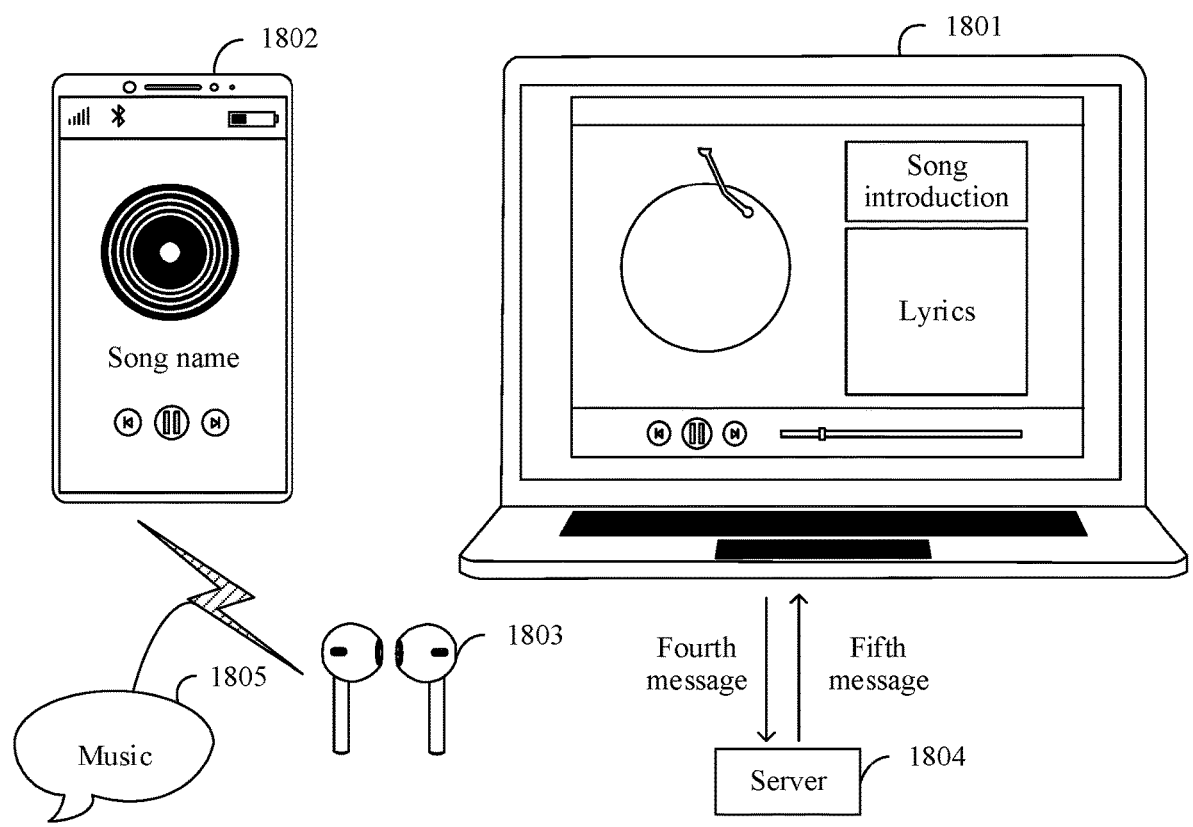
FIG. 19 is a schematic diagram of a scenario of a device occupation method according to an embodiment of this application.

As shown in FIG. 19, a first device 1801 is a computer, a second device 1802 is a mobile phone, and a first to-be-occupied device 1803 is a headset. The mobile phone 1802 establishes a wireless connection to the headset 1803, and the computer 1801 establishes a wireless connection to the headset 1803. The mobile phone 1802 is using the headset 1803 to play music 1805. The mobile phone 1802 may send a message to a server 1804, where the message may include user information of the mobile phone 1802 and identification information of the headset 1803. Then, a user operates the computer 1801 to play music. The computer 1801 may send a fourth message to the server 1804, where the fourth message includes identification information of the headset 1803, to determine whether the headset 1803 is being used by another device other than the computer 1801. The server 1804 receives the fourth message.

In a possible case, the server 1804 may send a fifth message to the computer 1801. The fifth message includes the user information of the mobile phone 1802. The computer 1801 may receive the fifth message sent by the server 1804, and determine that another device is using the headset 1803. In this case, the computer 1801 needs to further determine whether the headset 1803 can be occupied. The computer 1801 may perform matching between the user information of the mobile phone 1802 and user information of the computer 1801. If the matching fails, it indicates that a user of the headset 1803 is different from the user of the computer 1801. The computer 1801 may give up occupying the headset 1803.

Figure 20:
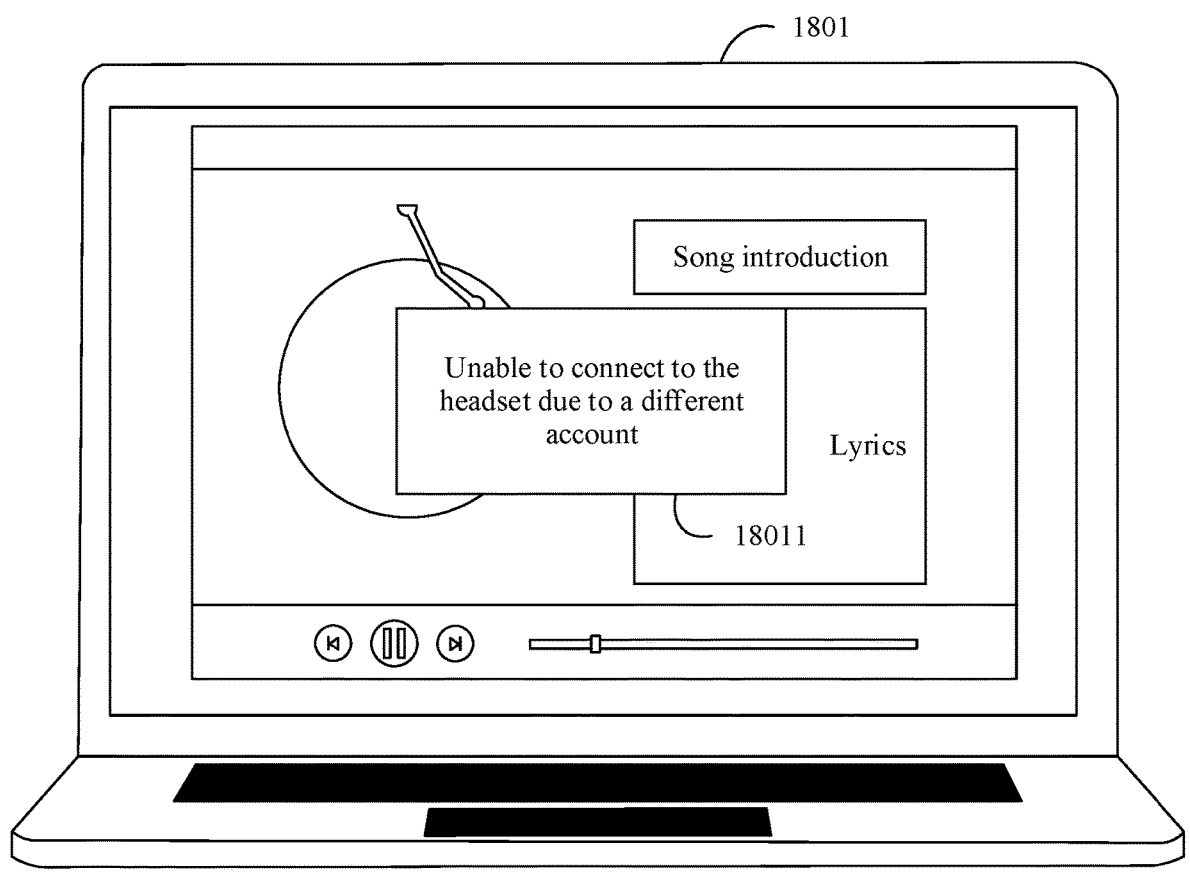
FIG. 20 is a schematic diagram of a user interface of a device occupation method according to an embodiment of this application.

In addition, as shown in FIG. 20, the computer 1801 may display third prompt information 18011: Unable to connect to the headset due to a different account. The user may learn, based on the third prompt information 18011, a reason why the computer 1801 cannot play music by using the headset.

In a possible case, the server 1804 may send a fifth message to the computer 1801. The fifth message includes the user information of the mobile phone 1802 and service information of the mobile phone 1802 (the mobile phone service is a music playing service). The computer 1801 may receive the fifth message sent by the server 1804, and determine that the user information of the mobile phone 1802 successfully matches user information of the computer 1801, and a priority of a computer service (a music playing service) is the same as a priority of the mobile phone service. If the computer 1801 occupies the headset, a problem of frequent switching may be introduced. Therefore, the computer 1801 may give up occupying the headset 1803.

Figure 21:
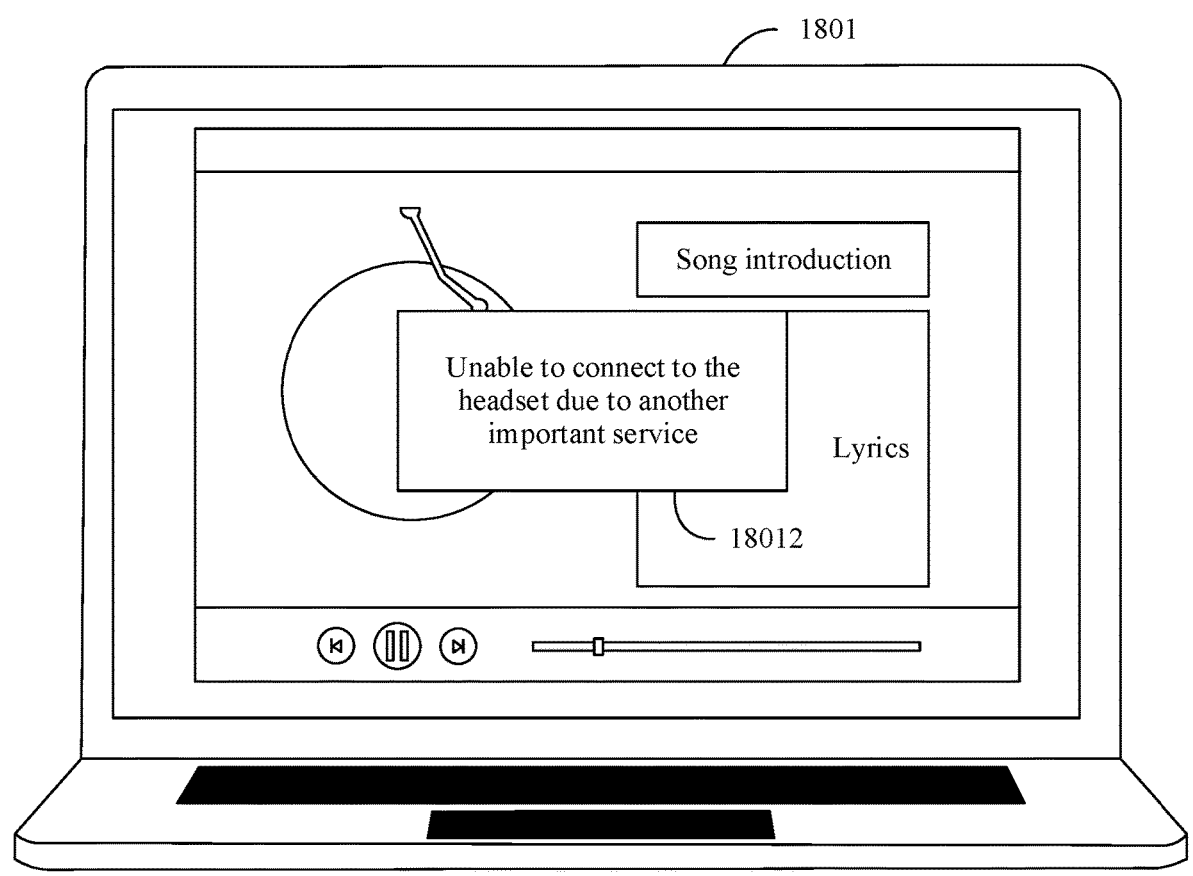
FIG. 21 is a schematic diagram of a user interface of a device occupation method according to an embodiment of this application.

In addition, as shown in FIG. 21, the computer 1801 may display third prompt information 18012: Unable to connect to the headset because of another important service. The user may learn, based on the third prompt information 18012, a reason why the computer 1801 cannot play music by using the headset.

It should be understood that, in the method 400, the first device may perform, by using steps 401 and 402, steps 401 and 403, or steps 401 and 404, the device occupation method provided in the embodiments of this application, to reduce user operations and improve user experience.

FIG. 22 is a schematic flowchart of a device occupation method according to this application.

2101: A first device determines that a first to-be-occupied device is currently occupied by a second device, and the first device prepares to occupy the first to-be-occupied device.

The first device may broadcast a message through a wireless network protocol, to search for a device, around the first device, that can be occupied. When detecting the first to-be-occupied device, the first device may receive a message that reflects an occupation status of the first to-be-occupied device. For example, the second device that currently occupies the first to-be-occupied device may send a message to the first device, to notify the first device that the first to-be-occupied device is occupied. For another example, the first to-be-occupied device may send a message to the first device, to notify the first device that the first to-be-occupied device is occupied.

2102: The first device sends a target message to obtain information related to the second device, where the information related to the second device includes any one of the following: device information of the second device, a device matching result between device information of the first device and the device information of the second device, user information of the second device, and a user matching result between user information of the first device and the user information of the second device.

Because the first device prepares to occupy the first to-be-occupied device, the first device may query the device information of the second device, to determine whether a condition for preempting the first to-be-occupied device is met.

2103: If the first device fails to obtain the information related to the second device, the first device displays third prompt information, where the third prompt information is used to indicate that the second device is not a trusted device.

Because the information related to the second device cannot be obtained, whether the second device is a trusted device cannot be determined, and the first device may determine that the second device is not a trusted device, that is, the condition for preempting the first to-be-occupied device is not met.

For example, the first device broadcasts the target message, and receives a message sent by the first to-be-occupied device. The message indicates that the first to-be-occupied device is currently occupied by the second device. Then, the first device cannot obtain the information related to the second device from the first to-be-occupied device, the second device, or a server. In this case, the first device may determine that the second device is not a trusted device.

Figure 23:
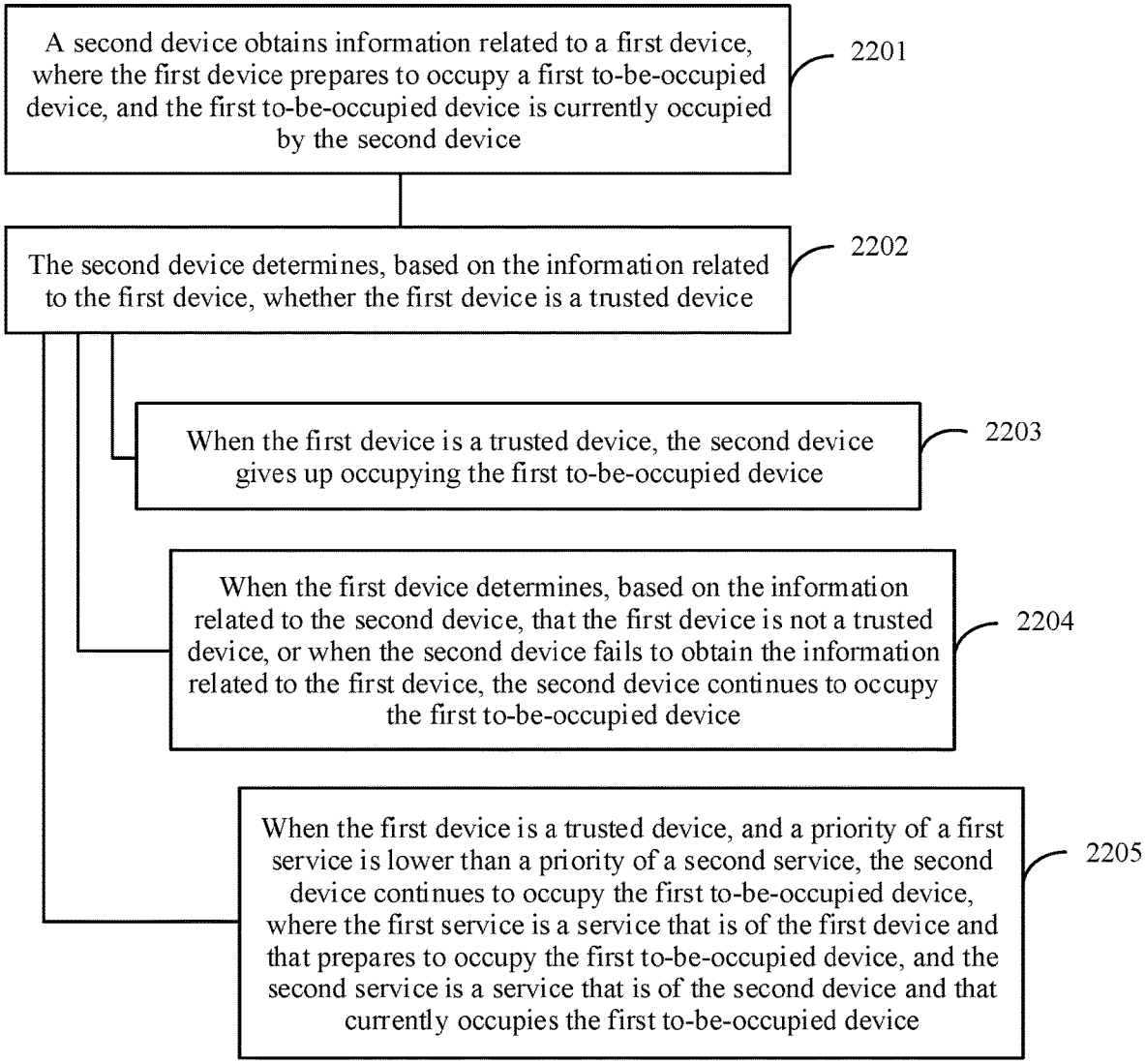
FIG. 23 is a schematic flowchart of a device occupation method according to an embodiment of this application.

FIG. 23 is a schematic flowchart of a device occupation method according to this application.

2201: A second device obtains information related to a first device, where the first device prepares to occupy a first to-be-occupied device, the first to-be-occupied device is currently occupied by the second device, and the information related to the first device includes any one of the following: device information of the first device, a device matching result between the device information of the first device and device information of the second device, user information of the first device, and a user matching result between the user information of the first device and user information of the second device.

The first device may be, for example, a mobile phone, a tablet computer, a smartwatch, a video player, a desktop computer, or a television.

The first to-be-occupied device may be, for example, a headset, a sound box, or a camera.

The second device may be, for example, a mobile phone, a tablet computer, a smartwatch, a video player, a desktop computer, or a television.

Example 1

The information related to the first device may include the device information of the first device or the user information of the first device.

In other words, the second device may obtain the device information of the first device, and determine, based on the device information of the first device and the device information of the second device, whether the device information of the first device matches the device information of the second device. The second device may obtain the user information of the first device, and determine, based on the user information of the first device and the user information of the second device, whether the user information of the first device matches the user information of the second device.

In an example, that a second device obtains information related to a first device includes: The second device receives an eleventh message sent by the first device, where the eleventh message includes the device information of the first device and identification information of the first to-be-occupied device; or the eleventh message includes the user information of the first device and identification information of the first to-be-occupied device.

Correspondingly, the first device sends the eleventh message to the second device.

In other words, the second device may obtain the device information of the first device or the user information of the first device from the first device. When the first device prepares to occupy the first to-be-occupied device, the first device may broadcast the identification information of the first to-be-occupied device and the device information of the first device, and the second device occupying the first to-be-occupied device may determine, based on the identification information of the first to-be-occupied device and the device information of the first device, that the first device prepares to occupy the first to-be-occupied device, and further determine whether the device information of the first device matches the device information of the second device. Alternatively, the first device may broadcast the identification information of the first to-be-occupied device and the user information of the first device, and the second device that occupies the first to-be-occupied device may determine, based on the identification information of the first to-be-occupied device and the user information of the first device, that the first device prepares to occupy the first to-be-occupied device, and further determine whether the user information of the first device matches the user information of the second device.

In an example, that a second device obtains information related to a first device includes: The second device receives an eleventh message sent by a server, where the eleventh message includes the device information of the first device and identification information of the first to-be-occupied device; or the eleventh message includes the user information of the first device and identification information of the first to-be-occupied device.

Correspondingly, the server sends the eleventh message to the second device.

In other words, the second device may obtain the device information of the first device or the user information of the first device from the server. For example, in a process in which the second device occupies the first to-be-occupied device, the second device may send the identification information of the first to-be-occupied device to the server. When the first device prepares to occupy the first to-be-occupied device, the first device may send the device information of the first device and the identification information of the first to-be-occupied device to the server. In this case, the server may forward the device information of the first device to the second device, so that the second device can determine that the first device prepares to occupy the first to-be-occupied device, and further determine whether the device information of the first device matches the device information of the second device. For another example, in a process in which the second device occupies the first to-be-occupied device, the second device may send the identification information of the first to-be-occupied device to the server. When the first device prepares to occupy the first to-be-occupied device, the first device may send the user information of the first device and the identification information of the first to-be-occupied device to the server. In this case, the server may forward the user information of the first device to the second device, so that the second device can determine that the first device prepares to occupy the first to-be-occupied device, and further determine whether the user information of the first device matches the user information of the second device.

The server may also be referred to as a cloud server. In other words, the second device may exchange data with the cloud server by using a wireless communication protocol.

In an example, that a second device obtains information related to a first device includes: The second device receives a twelfth message sent by the first to-be-occupied device, where the twelfth message includes the device information of the first device, or the twelfth message includes the user information of the first device.

Correspondingly, the first to-be-occupied device sends the twelfth message to the second device.

In other words, the second device may obtain the device information of the first device or the user information of the first device from the first to-be-occupied device. For example, when the first device prepares to occupy the first to-be-occupied device, the first device may send the device information of the first device to the first to-be-occupied device. Therefore, the first to-be-occupied device may forward the device information of the first device to the second device, so that the second device can determine that the first device prepares to occupy the first to-be-occupied device, and further determine whether the device information of the first device matches the device information of the second device. When the first device prepares to occupy the first to-be-occupied device, the first device may send the user information of the first device to the first to-be-occupied device. Therefore, the first to-be-occupied device may forward the user information of the first device to the second device, so that the second device can determine that the first device prepares to occupy the first to-be-occupied device, and further determine whether the user information of the first device matches the user information of the second device.

The device information of the second device may be, for example, a unique identity (identity, ID) of the second device, a device name of the second device (an identifier that may be changed by a user and is used to identify the device), or the like.

In an example, the user information of the first device may be information about a user that uses the first device.

For example, the user information of the first device may be information about an electronic account logged in to the first device (for example, an email account and real-name identity information).

In an example, because the first device probably occupied the first to-be-occupied device previously, the user may use the first device and the first to-be-occupied device. That is, the user who uses the first device and a user who uses the first to-be-occupied device should be a same user. Therefore, the user information of the first device may alternatively be information about the user who uses the first to-be-occupied device.

For example, the first to-be-occupied device may be a headset having a brainwave detection function, and the information about the user who uses the first to-be-occupied device may be brainwave information of the user who uses the headset.

For another example, the first to-be-occupied device may be a sound box having a voiceprint collection function, and the information about the user who uses the first to-be-occupied device may be voiceprint information of the user who uses the sound box.

For another example, the first to-be-occupied device may be a camera having a face collection function, and the information about the user who uses the first to-be-occupied device may be face information of the user who uses the camera.

Example 2

The information related to the first device may include the device matching result between the device information of the first device and the device information of the second device (referred to as a device matching result below), or the user matching result between the user information of the second device and the user information of the first device (referred to as a user matching result below).

That is, the second device may directly obtain the device matching result or the user matching result, and does not need to obtain the device information of the first device or the user information of the first device.

In an example, before the second device obtains the information related to the first device, the method further includes: The second device sends the device information of the second device to the first device. That a second device obtains information related to a first device includes: The second device receives the device matching result sent by the first device.

Correspondingly, the first device receives the device information of the second device sent by the second device, and sends the device matching result to the second device.

Similarly, before the second device obtains the information related to the first device, the method further includes: The second device sends the user information of the second device to the first device. That the second device obtains the information related to the first device includes: The second device receives the user matching result sent by the first device.

Correspondingly, the first device receives the user information of the second device sent by the second device, and sends the user matching result to the second device.

In other words, when the first device prepares to occupy the first to-be-occupied device, the first device may broadcast a message including identification information of the first to-be-occupied device. When receiving the message, the second device may determine that the first device prepares to occupy the first to-be-occupied device. The second device may send the device information of the second device to the first device, so that the first device can determine the device matching result, and can feed back the device matching result to the second device. In this case, the second device may receive the device matching result sent by the first device. Similarly, the second device may send the user information of the second device to the first device, so that the first device can determine the user matching result, and can feed back the user matching result to the second device. In this case, the second device may receive the user matching result sent by the first device.

In an example, that a second device obtains information related to a first device includes: The second device receives the user matching result or the device matching result sent by the first to-be-occupied device.

Correspondingly, the first to-be-occupied device sends the user matching result or the device matching result to the second device.

The following uses user information as an example. In a process in which the second device occupies the first to-be-occupied device, the first to-be-occupied device may collect user information to obtain the user information of the second device, or the second device may send the user information of the second device to the first to-be-occupied device. When the first device prepares to occupy the first to-be-occupied device, the first device may broadcast a message including the identification information of the first to-be-occupied device. When receiving the message, the first to-be-occupied device may determine that the first device prepares to occupy the first to-be-occupied device. In a possible case, the first to-be-occupied device may send a message including the user information of the second device to the first device, so that the first device can determine the user matching result, and can feed back the user matching result to the second device. In another possible case, the first to-be-occupied device may perform matching between the user information of the first device and the user information of the second device, and feed back the user matching result to the second device. In this case, the second device may receive the user matching result sent by the first device.

In an example, before the second device obtains the information related to the first device, the method further includes: The second device sends the device information of the second device to a server. That a second device obtains information related to a first device includes: The second device receives the device matching result sent by the server.

In an example, before the second device obtains the information related to the first device, the method further includes: The second device sends the user information of the second device to a server. That a second device obtains information related to a first device includes: The second device receives the user matching result sent by the server.

The following uses user information as an example. In a process in which the second device occupies the first to-be-occupied device, the second device may send the user information of the second device to the server. When receiving a message that is sent by the first device and that includes the identification information of the first to-be-occupied device and the user information of the first device, the server may determine that the first device prepares to occupy the first to-be-occupied device. The server may perform matching between the user information of the first device and the user information of the second device, and feed back the user matching result to the second device. In this case, the second device may receive the user matching result sent by the server.

For a specific implementation of step 2201, refer to step 401 in the embodiment shown in FIG. 4. Details are not described herein again.

2202: The second device determines, based on the information related to the first device, whether the first device is a trusted device.

To be a trusted device, the first device needs to meet at least one of the following conditions: The device information of the second device successfully matches the device information of the first device; and the user information of the second device successfully matches the user information of the first device.

For a specific implementation of step 2202, refer to step 402 in the embodiment shown in FIG. 4. Details are not described herein again.

2203: The second device gives up occupying the first to-be-occupied device when the first device is the trusted device.

The second device gives up occupying the first to-be-occupied device, so that the first to-be-occupied device can be temporarily in a state in which the first to-be-occupied device is not occupied by any device, and the first device may occupy the first to-be-occupied device. If the first device is the trusted device, it may be considered that occupying the first to-be-occupied device by the first device is based on a trusted device specified by the user in advance. Therefore, it may be considered that occupation of the first to-be-occupied device by the first device is allowed by a same user, and meets an expectation of the user. This helps reduce a quantity of operations of manually occupying the first to-be-occupied device by the user.

If the first to-be-occupied device can establish a wireless connection to only one device, that the second device gives up occupying the first to-be-occupied device may mean that the second device releases the wireless connection to the first to-be-occupied device. If the first to-be-occupied device can establish wireless connections to a plurality of devices, that the second device gives up occupying the first to-be-occupied device may mean that the second device stops occupying a media channel of the first to-be-occupied device, or releases the wireless connection to the first to-be-occupied device.

Optionally, that the second device gives up occupying the first to-be-occupied device includes: The second device gives up occupying the first to-be-occupied device based on a detected first operation.

In other words, the second device may give up occupying the first to-be-occupied device in response to the first operation. In other words, an occasion on which the second device gives up the occupation may be determined by the first operation.

The first operation may be an operation performed by the user on the first device, the second device, or the first to-be-occupied device.

Optionally, that the second device gives up occupying the first to-be-occupied device when the first device is the trusted device includes: The second device gives up occupying the first to-be-occupied device when the first device is the trusted device and a priority of a first service is higher than a priority of a second service, where a service that occupies the first to-be-occupied device changes from the second service to the first service, the first service is a service of the first device, and the second service is a service of the second device.

In other words, if the user who uses the second device trusts the first device, and the service of the first device is more important or more suitable, the second device may give up occupying the first to-be-occupied device, so that the first device can occupy the first to-be-occupied device. Therefore, in addition to reducing a risk of privacy leakage and reducing operations of switching an occupation status, a more important service can preferably occupy the first to-be-occupied device. Therefore, a scenario requirement can be better met, and user experience can be improved. The service priority has been described in detail above, and no further description is required herein.

Optionally, when the first device is a trusted device, and the priority of the first service is lower than the priority of the second service, or when the second device determines, based on the information related to the first device, that the first device is not a trusted device, the second device gives up occupying the first to-be-occupied device based on a detected second operation.

Optionally, when the first device is a trusted device, and the priority of the first service is lower than the priority of the second service, the second device gives up occupying the first to-be-occupied device based on a detected second operation, and a service that occupies the first to-be-occupied device changes from the second service to the first service. The first service is a service of the first device, and the second service is a service of the second device.

In other words, when it cannot be determined whether the first device is a trusted device, occupation of the first to-be-occupied device may be given up based on an operation of the user, so that the first device can occupy the first to-be-occupied device. When it cannot be determined whether the first device is a trusted device, the second device responds to the operation and gives up occupying the first to-be-occupied device, so that flexibility of occupying the first to-be-occupied device can be improved.

For a specific implementation of step 2203, refer to step 403 in the embodiment shown in FIG. 4. Details are not described herein again.

2204: When the first device determines, based on the information related to the second device, that the first device is not a trusted device, or when the second device fails to obtain the information related to the first device, the second device continues to occupy the first to-be-occupied device.

In other words, if the first device is not a trusted device, it may be considered that it is not a behavior trusted by the user that the first device preempts the first to-be-occupied device currently occupied by the second device. Therefore, the second device continues to occupy the first to-be-occupied device, which meets an expectation of the user.

For a specific implementation of step 2204, refer to step 404 in the embodiment shown in FIG. 4. Details are not described herein again.

2205: The second device continues to occupy the first to-be-occupied device when the first device is the trusted device and the priority of the first service is lower than the priority of the second service. The first service is a service that is of the first device and that prepares to occupy the first to-be-occupied device, and the second service is a service that is of the second device and that currently occupies the first to-be-occupied device.

In other words, when it is satisfied that the first device is the trusted device and that the priority of the first service is lower than the priority of the second service, the second device may continue to occupy the first to-be-occupied device. In this way, a risk of leaking user privacy can be reduced, and switching of the occupation status can better meet a scenario requirement, thereby improving user experience.

Optionally, the method further includes: The second device displays fourth prompt information, where the fourth prompt information indicates a reason why the second device continues to occupy the first to-be-occupied device.

In other words, the second device may remind the user of a reason why the second device continues to occupy the first to-be-occupied device, so that the user can adapt, based on the fourth prompt information, to a plurality of scenarios in which the second device occupies the first to-be-occupied device and a plurality of scenarios in which the second device cannot continue to occupy the first to-be-occupied device.

In an example, the reason why the second device continues to occupy the first to-be-occupied device includes that the user information of the second device fails to match the user information of the first device.

In an example, the reason why the second device continues to occupy the first to-be-occupied device includes that the priority of the first service is lower than the priority of the second service.

For a specific implementation of step 2205, refer to step 405 in the embodiment shown in FIG. 4. Details are not described herein again.

FIG. 24 is a schematic flowchart of a device occupation method according to this application.

2401: A first to-be-occupied device obtains information related to a first device and a second device, where the first to-be-occupied device is currently occupied by the second device, the first device prepares to occupy the first to-be-occupied device, and the information related to the first device and the second device includes any one of the following: device information of the first device and device information of the second device; a device matching result between the device information of the first device and the device information of the second device; user information of the first device and user information of the second device; and a user matching result between the user information of the first device and the user information of the second device.

The first device may be, for example, a mobile phone, a tablet computer, a smartwatch, a video player, a desktop computer, or a television.

The first to-be-occupied device may be, for example, a headset, a sound box, or a camera.

The second device may be, for example, a mobile phone, a tablet computer, a smartwatch, a video player, a desktop computer, or a television.

Example 1

The information related to the first device and the second device may include the device information of the first device and the device information of the second device, or the user information of the first device and the user information of the second device.

In other words, the first to-be-occupied device may obtain the device information of the first device and the device information of the second device, and determine, based on the device information of the first device and the device information of the second device, whether the device information of the first device matches the device information of the second device. The first to-be-occupied device may obtain the user information of the first device and the user information of the second device, and determine, based on the user information of the first device and the user information of the second device, whether the user information of the first device matches the user information of the second device.

In an example, that a first to-be-occupied device obtains information related to a first device and a second device includes: The first to-be-occupied device receives the device information of the first device that is sent by the first device, and receives the device information of the second device that is sent by the second device; or the first to-be-occupied device receives the user information of the first device that is sent by the first device, and receives the user information of the second device that is sent by the second device.

Correspondingly, the first device sends the device information or the user information of the first device to the first to-be-occupied device.

Correspondingly, the second device sends the device information or the user information of the second device to the first to-be-occupied device.

In other words, in a process in which the second device occupies the first to-be-occupied device, the second device may send the device information of the second device to the first to-be-occupied device. When the first device prepares to occupy the first to-be-occupied device, the first device may broadcast identification information of the first to-be-occupied device and the device information of the first device. Further, the first to-be-occupied device may determine whether the device information of the first device matches the device information of the second device. Alternatively, in a process in which the second device occupies the first to-be-occupied device, the second device may send the user information of the second device to the first to-be-occupied device. When the first device prepares to occupy the first to-be-occupied device, the first device may broadcast identification information of the first to-be-occupied device and the user information of the first device. Further, the first to-be-occupied device may determine whether the user information of the first device matches the user information of the second device.

In an example, that a first to-be-occupied device obtains information related to a first device and a second device includes: The first to-be-occupied device receives the device information of the first device and the device information of the second device that are sent by a server; or receives the user information of the first device and the user information of the second device that are sent by the server.

Correspondingly, the server sends the device information of the first device and the device information of the second device to the first to-be-occupied device; or the server sends the user information of the first device and the user information of the second device to the first to-be-occupied device.

In other words, in a process in which the second device occupies the first to-be-occupied device, the second device may send the device information of the second device and the identification information of the first to-be-occupied device to the server. When the first device prepares to occupy the first to-be-occupied device, the first device may send the device information of the first device and the identification information of the first to-be-occupied device to the server. In this case, the server may send the device information of the first device and the device information of the second device to the first to-be-occupied device, so that the first to-be-occupied device can determine whether the device information of the first device matches the device information of the second device. In a process in which the second device occupies the first to-be-occupied device, the second device may send the user information of the second device and the identification information of the first to-be-occupied device to the server. When the first device prepares to occupy the first to-be-occupied device, the first device may send the user information of the first device and the identification information of the first to-be-occupied device to the server. In this case, the server may send the user information of the first device and the user information of the second device to the first to-be-occupied device, so that the first to-be-occupied device can determine whether the user information of the first device matches the user information of the second device.

The server may also be referred to as a cloud server. In other words, the first to-be-occupied device may exchange data with the cloud server by using a wireless communication protocol.

Example 2

The information related to the first device and the second device may include the device matching result between the device information of the first device and the device information of the second device (referred to as a device matching result below), or the matching result between the user information of the second device and the user information of the first device (referred to as a user matching result below).

In other words, the first to-be-occupied device may directly obtain the device matching result or the user matching result, and does not need to obtain the device information of the first device, the device information of the second device, the user information of the first device, or the user information of the second device.

The foregoing describes an example in which the first device, the second device, or the server performs matching on the device information of the first device with the device information of the second device to obtain the matching result, and an example in which the first device, the second device, or the server performs matching on the user information of the first device with the user information of the second device to obtain the matching result. Therefore, the first to-be-occupied device may receive the matching result sent by the first device, the second device, or the server. Details are not repeated here.

For a specific implementation of step 2401, refer to step 401 in the embodiment shown in FIG. 4 or step 2201 in the embodiment shown in FIG. 23. Details are not described herein.

2402: When the first to-be-occupied device determines, based on the information related to the first device and the second device, that the second device matches the first device, the first to-be-occupied device changes from an occupation state of being occupied by the second device to an occupation state of being occupied by the first device.

In other words, if the second device successfully matches the first device, it may be considered that the change from the state in which the second device occupies the first to-be-occupied device to the state in which the first device occupies the first to-be-occupied device is allowed by the user in advance. Therefore, it may be considered that preempting the first to-be-occupied device by the first device meets an expectation of the user, and this helps reduce a quantity of operations in which the user manually occupies the first to-be-occupied device.

When the first to-be-occupied device can establish a wireless connection to only one device, the change from the occupation state of being occupied by the second device to the occupation state of being occupied by the first device may mean that the first to-be-occupied device releases the wireless connection to the second device, and establishes a wireless connection to the first device. When the first to-be-occupied device can establish wireless connections to a plurality of devices, the change from the occupation state of being occupied by the second device to the occupation state of being occupied by the first device may mean that the second device stops occupying a media channel of the first to-be-occupied device, and the media channel of the first to-be-occupied device is occupied by the first device.

Optionally, that the first to-be-occupied device changes from an occupation state of being occupied by the second device to an occupation state of being occupied by the first device includes: The first to-be-occupied device changes, based on a detected first operation, from the occupation state of being occupied by the second device to the occupation state of being occupied by the first device.

In other words, the first to-be-occupied device may change an occupation status of the first to-be-occupied device in response to the first operation. In other words, an occasion for switching the occupation status of the first to-be-occupied device may be determined by the first operation.

The first operation may be an operation performed by the user on the first device, the second device, or the first to-be-occupied device.

Optionally, that when the second device matches the first device, the first to-be-occupied device changes from an occupation state of being occupied by the second device to an occupation state of being occupied by the first device includes: When the second device matches the first device, and a priority of a first service is higher than a priority of a second service, the first to-be-occupied device changes from the occupation state of being occupied by the second device to the occupation state of being occupied by the first device. A service occupying the first to-be-occupied device changes from the second service to the first service. The first service is a service of the first device, and the second service is a service of the second device.

In other words, if the second device successfully matches the first device, and the service of the first device is more important or more suitable, the first to-be-occupied device changes the occupation status of the first to-be-occupied device, so that the first device can occupy the first to-be-occupied device. Therefore, in addition to reducing a risk of privacy leakage and reducing operations of switching an occupation status, a more important service can preferably occupy the first to-be-occupied device. Therefore, a scenario requirement can be better met, and user experience can be improved. The service priority has been described in detail above, and no further description is required herein.

Optionally, when the second device matches the first device, and the priority of the first service is lower than the priority of the second service, or when the first to-be-occupied device determines, based on the information related to the first device and the second device, that the second device fails to match the first device, the first to-be-occupied device changes the occupation status of the first to-be-occupied device based on a detected second operation. A service occupying the first to-be-occupied device changes from the second service to the first service. The first service is a service of the first device, and the second service is a service of the second device.

In other words, if the second device does not match the first device, the occupation status of the first to-be-occupied device may be changed based on an operation of the user, so that the first device can occupy the first to-be-occupied device. When the second device does not match the first device, the first to-be-occupied device changes the occupation status in response to the second operation, so that flexibility of switching the occupation status of the first to-be-occupied device can be improved.

For a specific implementation of step 2402, refer to steps 402 and 403 in the embodiment shown in FIG. 4 or steps 2202 and 2203 in the embodiment shown in FIG. 23. Details are not described herein.

2403: When the second device fails to match the first device, or when the first to-be-occupied device does not obtain the information related to the first device and the second device, the first to-be-occupied device continues to be occupied by the second device.

In other words, if the second device fails to match the first device, it may be considered that preempting, by the first device, the first to-be-occupied device currently occupied by the second device is not a behavior trusted by the user. Therefore, the first to-be-occupied device continues to be occupied by the second device, which meets an expectation of the user.

For a specific implementation of step 2403, refer to step 404 in the embodiment shown in FIG. 4 or step 2204 in the embodiment shown in FIG. 23. Details are not described herein.

2404: When the second device matches the first device, and the priority of the first service is lower than the priority of the second service, the first to-be-occupied device continues to be occupied by the second device, where the first service is a service that is of the first device and that prepares to occupy the first to-be-occupied device, and the second service is a service that is of the second device and that currently occupies the first to-be-occupied device.

In other words, when the second device successfully matches the first device and the priority of the first service is lower than the priority of the second service, the first to-be-occupied device may give up changing the occupation status of the first to-be-occupied device, so that the second device can continue to occupy the first to-be-occupied device. In this way, a risk of leaking user privacy can be reduced, and switching of the occupation status can better meet a scenario requirement, thereby improving user experience.

In an example, a reason why the first to-be-occupied device gives up changing the occupation status of the first to-be-occupied device includes: The user information of the second device fails to match the user information of the first device.

In an example, a reason why the first to-be-occupied device gives up changing the occupation status of the first to-be-occupied device includes: The priority of the first service is lower than the priority of the second service.

For a specific implementation of step 2404, refer to step 405 in the embodiment shown in FIG. 4 or step 2205 in the embodiment shown in FIG. 23. Details are not described herein.

Figures 25, 26:
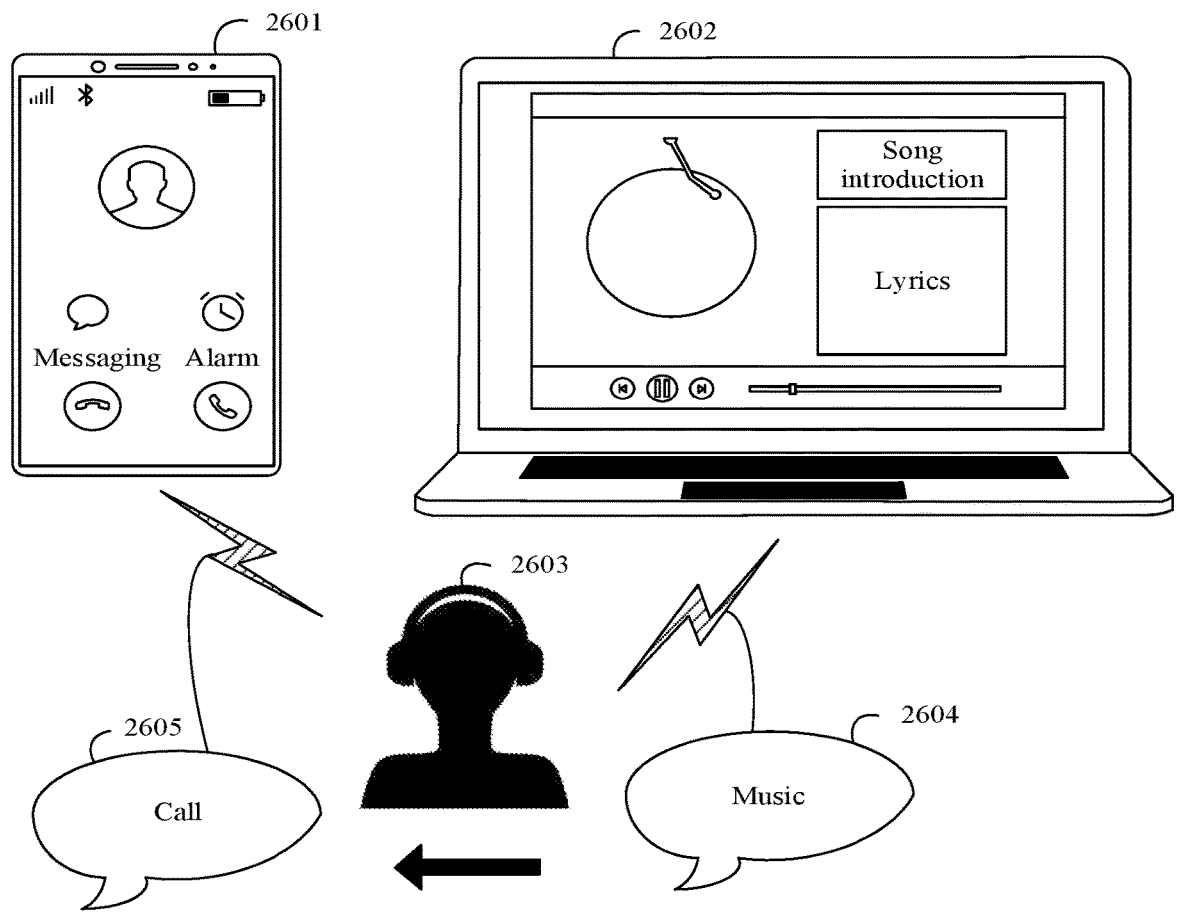
FIG. 25 is a schematic flowchart of a device occupation method according to an embodiment of this application.
FIG. 26 is a schematic diagram of a scenario of a device occupation method according to an embodiment of this application.

FIG. 25 is a schematic flowchart of a device occupation method according to this application.

2501: A first device obtains information related to a first to-be-occupied device, where the first to-be-occupied device is currently occupied by a second device, and user information of the first to-be-occupied device includes at least one of the following: first user information collected by the first to-be-occupied device, second user information obtained by the second device, a first user matching result between the first user information and the user information of the first device, and a second user matching result between the second user information and user information of the first device.

The first user information collected by the first to-be-occupied device may include many types of biometric feature information, for example, face information, voiceprint information, auricle information, and brainwave information.

For example, the first to-be-occupied device may be a headset having a brainwave detection function, and the first user information may be brainwave information of a user who uses the headset.

For another example, the first to-be-occupied device may be a headset having an auricle detection function, and the first user information may be auricle information of the user who uses the headset.

For another example, the first to-be-occupied device may be a sound box having a voiceprint collection function, and the first user information may be voiceprint information of the user who uses the sound box.

For another example, the first to-be-occupied device may be a camera having a face collection function, and the first user information may be face information of the user who uses the camera.

The second user information obtained by the second device may be user information collected by the second device, or user information obtained by another device (such as a cloud server), or user information stored by the second device.

For example, the second user information may be information about an electronic account logged in to the second device (for example, an email account and real-name identity information).

For another example, the second user information may be biometric feature information stored on the second device, for example, face information, voiceprint information, auricle information, and brainwave information.

Optionally, before the first device obtains the information related to the first to-be-occupied device, the method further includes: The first device broadcasts a first message, where the first message is used to indicate that the first device prepares to occupy the first to-be-occupied device. That a first device obtains information related to a first to-be-occupied device includes: The first device receives a second message that is sent by the second device in response to the first message, where the second message includes the first user information and/or the second user information; or the first device receives a third message that is sent by the first to-be-occupied device in response to the first message, where the third message includes the first user information and/or the second user information.

Optionally, before the first device obtains the information related to the first to-be-occupied device, the method further includes: The first device sends a fourth message to a server, where the fourth message is used to indicate that the first device prepares to occupy the first to-be-occupied device. That a first device obtains information related to a first to-be-occupied device includes: The first device receives a fifth message that is sent by the server in response to the fourth message, where the fifth message includes the first user information and/or the second user information.

Optionally, before the first device obtains the information related to the first to-be-occupied device, the method further includes: The first device broadcasts a sixth message, where the sixth message includes the user information of the first device, and the sixth message is used to indicate that the first device prepares to occupy the first to-be-occupied device. That a first device obtains information related to a first to-be-occupied device includes: The first device receives a seventh message that is sent by the second device in response to the sixth message, where the seventh message includes the second user matching result; or the first device receives an eighth message that is sent by the second device in response to the sixth message, where the eighth message includes the first user matching result.

Optionally, before the first device obtains the information related to the first to-be-occupied device, the method further includes: The first device sends a ninth message to a server, where the ninth message includes the user information of the first device, and the ninth message is used to indicate that the first device prepares to occupy the first to-be-occupied device. That a first device obtains information related to a first to-be-occupied device includes: The first device receives a tenth message that is sent by the server in response to the ninth message, where the eighth message includes the first user matching result and/or the second user matching result.

For a specific implementation of step 2501, refer to step 401 in the embodiment shown in FIG. 4. Details are not described herein again.

2502: The first device determines, based on the information related to the first to-be-occupied device, whether to occupy the first to-be-occupied device.

Optionally, occupying, by the first device, the first to-be-occupied device meets at least one of the following conditions: The first user information successfully matches the user information of the first device; and the second user information successfully matches the user information of the first device.

If the first user information successfully matches the user information of the first device, it may be considered that a user who uses the first to-be-occupied device and a user who uses the first device are a same user. Therefore, that the first device occupies the first to-be-occupied device may be considered as being allowed by the same user, and basically does not cause leakage of user privacy. In addition, the user may still interact with the first to-be-occupied device. Therefore, a quantity of operations of manually occupying the first to-be-occupied device by the user can be reduced.

If the second user information successfully matches the user information of the first device, it may be considered that a user who uses the second device and the user who uses the first device are a same user. Therefore, that the first device occupies the first to-be-occupied device may be considered as being allowed by the same user, and basically does not cause leakage of user privacy. In addition, the user may still interact with the first to-be-occupied device. Therefore, a quantity of operations of manually occupying the first to-be-occupied device by the user can be reduced.

Examples of matching of auricle information, matching of brainwave information, matching of electronic account information, matching of voiceprint information, and matching of face information are described above, and details are not described herein again.

Optionally, a first service of the first device prepares to occupy the first to-be-occupied device. Before the first device determines, based on the information related to the first to-be-occupied device, whether to occupy the first to-be-occupied device, the method further includes: The first device obtains a priority of a second service, where the second service is a service that is of the second device and that currently occupies the first to-be-occupied device. The determining, based on the information related to the first to-be-occupied device, whether to occupy the first to-be-occupied device includes: determining, based on the information related to the first to-be-occupied device, a priority of the first service, and the priority of the second service, whether to occupy the first to-be-occupied device.

Optionally, the priority of the first service is determined based on at least one of an importance index of the first service, an applicability index of the first device, and a user preference index of the first service.

Optionally, services in descending order of priorities are as follows: a call service, a video call service, an audio playing service, a video playing service, a recording service, and a photographing service.

Optionally, occupying, by the first device, the first to-be-occupied device further meets any one of the following conditions: The priority of the first service is higher than the priority of the second service; and the priority of the first service is lower than the priority of the second service, and the first device detects a second operation.

Optionally, the method further includes: The first device displays first prompt information, where the first prompt information indicates that the first to-be-occupied device is occupied by the first device.

Optionally, occupying, by the first device, the first to-be-occupied device meets the following condition: The first device detects a first operation.

Optionally, the first operation may be an operation performed by the user on the first device, the second device, or the first to-be-occupied device.

Optionally, the user information includes at least one of the following: auricle information, brainwave information, face information, voiceprint information, and electronic account information.

Optionally, the first to-be-occupied device is any one of the following: a headset, a sound box, and a camera.

Optionally, the determining whether to occupy the first to-be-occupied device includes: The first device determines whether to occupy a media channel of the first to-be-occupied device.

Optionally, the method further includes: The first device determines that the first to-be-occupied device is currently occupied by the second device, and the first device prepares to occupy the first to-be-occupied device; the first device sends a target message to obtain the information related to the first to-be-occupied device, where the first to-be-occupied device is currently occupied by the second device, and the user information of the first to-be-occupied device includes at least one of the following: the first user information collected by the first to-be-occupied device, the second user information obtained by the second device, the first user matching result between the first user information and the user information of the first device, and the second user matching result between the second user information and the user information of the first device; and when the first device fails to obtain the information related to the first to-be-occupied device, the first device displays third prompt information, where the third prompt information is used to indicate that the first device cannot identify a user using the first to-be-occupied device.

Optionally, the method further includes: The first device gives up occupying the first to-be-occupied device.

Optionally, the method further includes: The first device occupies the first to-be-occupied device based on a detected second operation.

For a specific implementation of step 2502, refer to step 403 in the embodiment shown in FIG. 4. Details are not described herein again.

Figure 27:
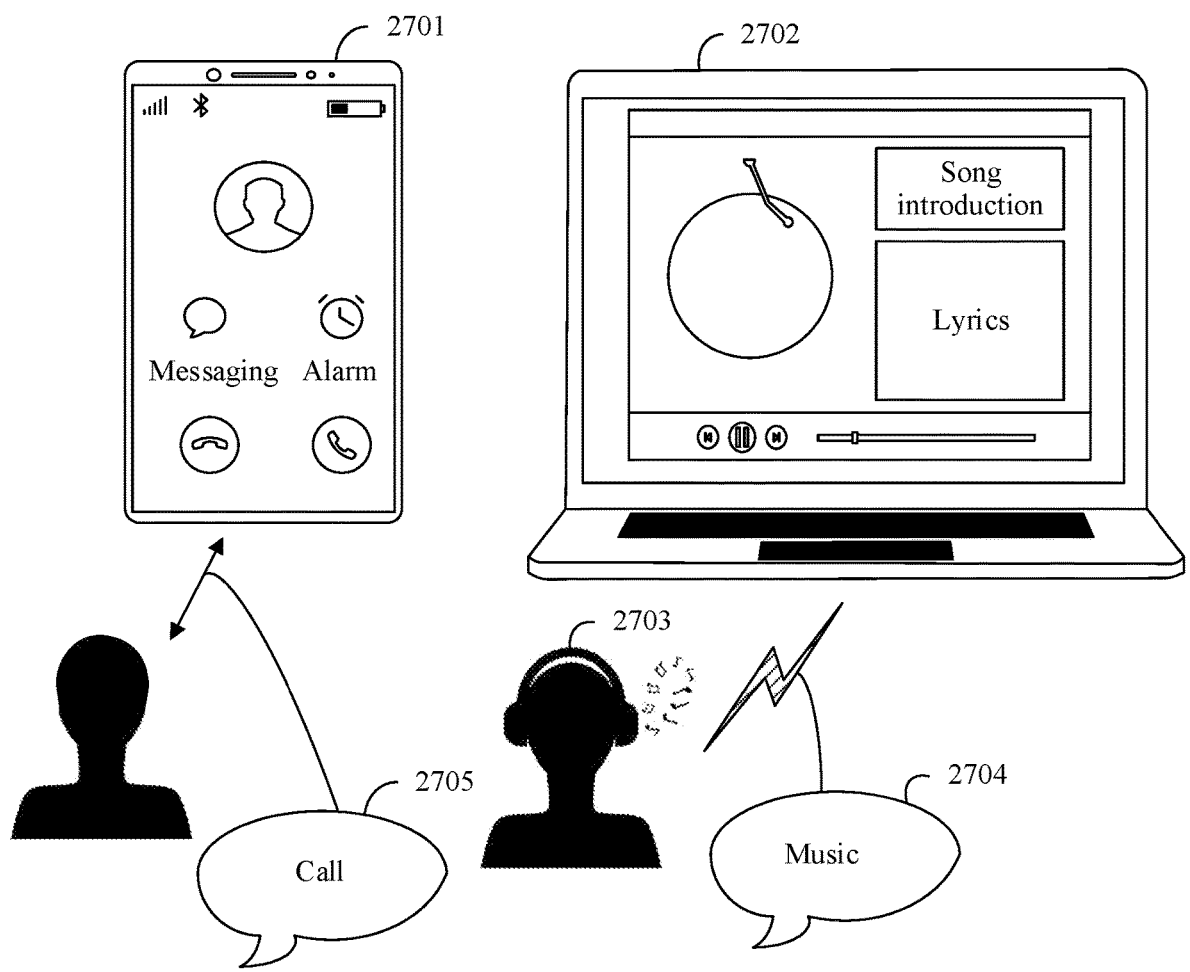
FIG. 27 is a schematic diagram of a scenario of a device occupation method according to an embodiment of this application.

The following describes a specific implementation provided in this application with reference to FIG. 26 and FIG. 27. Modifications and other embodiments of this application will come to mind to the person skilled in the art having a benefit of guidance presented in the foregoing descriptions and related accompanying drawings. Therefore, it should be understood that this application is not limited to the specific embodiments disclosed.

As shown in FIG. 26, a computer 2602 currently occupies a headset 2603, and a user is using the computer 2602 and the headset 2603 to play music 2605. Then, a mobile phone 2601 receives a call 2604. The mobile phone 2601 may search for the headset 2603, and prepare to occupy the headset 2603. In addition, the mobile phone 2601 may further broadcast a message, to determine whether the headset 2603 is being occupied by another device. The headset 2603 sends, to the mobile phone 2601, information about the user who uses the headset 2603, so that the mobile phone 2601 can determine that another device is using the headset 2603. In this case, the mobile phone 2601 needs to further determine whether the headset 2603 can be occupied. The mobile phone 2601 may determine, based on information that is related to the headset 2603 and that is sent by the headset 2603, whether the user information of the headset 2603 matches user information stored in the mobile phone 2601. If the matching succeeds, it indicates that the user using the headset 2603 and a user using the mobile phone 2601 are a same user. Therefore, the mobile phone 2601 may occupy the headset 2603, and answer the call 2604 by using the headset 2603.

As shown in FIG. 27, a computer 2702 currently occupies a headset 2703, and a user is using the computer 2702 and the headset 2703 to play music 2705. Then, a mobile phone 2701 receives a call 2704. The mobile phone 2701 may search for the headset 2703, and prepare to occupy the headset 2703. In addition, the mobile phone 2701 may further broadcast a message, to determine whether the headset 2703 is being occupied by another device. The headset 2703 sends, to the mobile phone 2701, information about the user who uses the headset 2703, so that the mobile phone 2701 can determine that another device is using the headset 2703. In this case, the mobile phone 2701 needs to further determine whether the headset 2703 can be occupied. The mobile phone 2701 may determine, based on information that is related to the headset 2703 and that is sent by the headset 2703, whether the user information of the headset 2703 matches user information stored in the mobile phone 2701. If the matching fails, it indicates that the user using the headset 2703 and a user using the mobile phone 2701 are different users. If the mobile phone 2701 rashly occupies the headset 2703, content of the call may be heard by a user other than the user of the mobile phone, which is detrimental to privacy of the user. Therefore, the mobile phone 2701 may not occupy the headset 2703, and the user may answer the call 2704 by using an earpiece of the mobile phone 2701.

Figure 28:
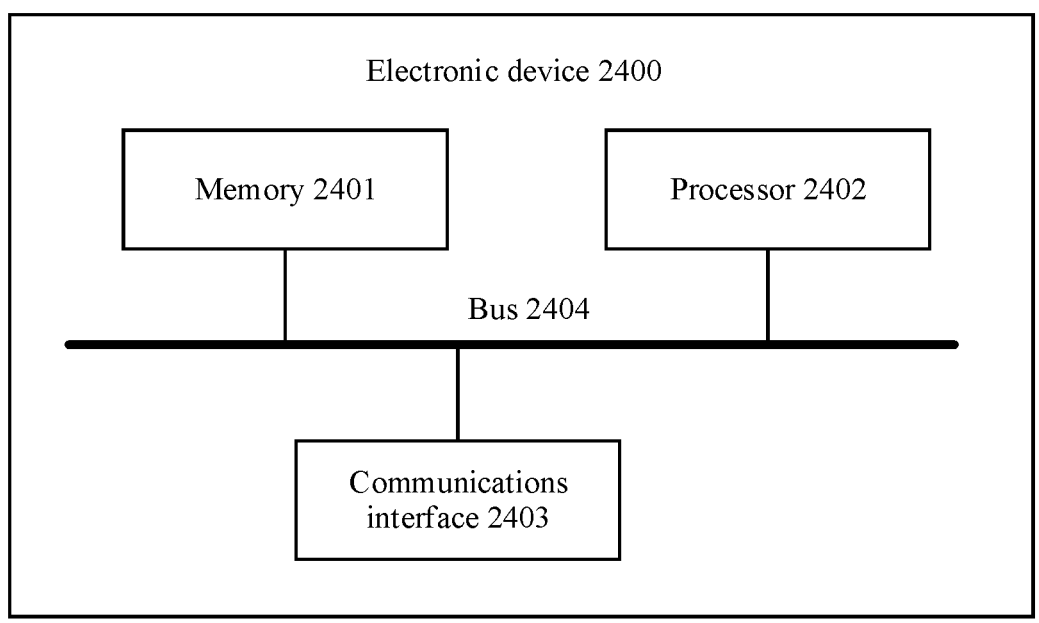
FIG. 28 is a schematic block diagram of an electronic device according to an embodiment of this application.

FIG. 28 is a schematic diagram of a hardware structure of an electronic device according to an embodiment of this application. An electronic device 2400 shown in FIG. 28 includes a memory 2401, a processor 2402, a communications interface 2403, and a bus 2404. The memory 2401, the processor 2402, and the communications interface 2403 are communicatively connected to each other through the bus 2404.

The memory 2401 may be a read-only memory (read only memory, ROM), a static storage device, a dynamic storage device, or a random access memory (random access memory, RAM). The memory 2401 may store a program. When the program stored in the memory 2401 is executed by the processor 2402, the processor 2402 is configured to perform steps of the device occupation methods shown in FIG. 4 and FIG. 22 to FIG. 24 in the embodiments of this application.

The processor 2402 may be a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, to implement the device occupation methods shown in FIG. 4 and FIG. 22 to FIG. 24 in the embodiments of this application.

The processor 2402 may alternatively be an integrated circuit chip and has a signal processing capability. In an implementation process, the steps of the device occupation method shown in FIG. 4 and FIG. 22 to FIG. 24 in the embodiments of this application may be completed by using an integrated logic circuit of hardware in the processor 2402 or by using instructions in a form of software.

Alternatively, the processor 2402 may be a general-purpose processor, a digital signal processor (digital signal processing, DSP), an application-specific integrated circuit (ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 2401. The processor 2402 reads information in the memory 2401, and completes, in combination with hardware of the processor 2402, a function that needs to be performed by a unit included in the electronic device in the embodiments of this application, or performs the device occupation methods shown in FIG. 4 and FIG. 22 to FIG. 24 in the embodiments of this application.

The communications interface 2403 uses, by way of example without limitation, a transceiver apparatus such as a transceiver to implement communication between the electronic device 2400 and another device or communications network.

The bus 2404 may include a path for transferring information between components (for example, the memory 2401, the processor 2402, and the communications interface 2403) of the electronic device 2400.

It should be understood that an obtaining module in the electronic device may be equivalent to the communications interface 2403 in the electronic device 2400. A processing module in the electronic device may be equivalent to the processor 2402.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The storage medium includes any medium that can store program code, such as a USB flash drive, a removable hard disk drive, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device occupation method comprising:
   starting occupying, by a second device, a headset;
   executing, by the second device, an audio playing service or a video playing service, wherein the second device occupies the headset;
   answering, by a first device, a call service, wherein first information of a first electronic account logged in to the second device is the same as second information of a second electronic account logged in to the first device;
   starting occupying, by the first device in response to answering the call service, the headset;
   stopping occupying, by the second device in response to the first device answering the call service, the headset;
   displaying, by the first device in response to starting occupying the headset, first prompt information indicating that the headset is occupied by the first device; and
   displaying, by the second device in response to stopping occupying the headset, second prompt information indicating that the headset is occupied by the first device.

2. The device occupation method of claim 1, wherein the first device comprises a first mobile phone, a first tablet computer, a first smartwatch, a first video player, a first desktop computer, or a first television, and wherein the second device comprises a second mobile phone, a second tablet computer, a second smartwatch, a second video player, a second desktop computer, or a second television.

3. The device occupation method of claim 1, wherein a first priority of the call service is higher than either a second priority of the audio playing service or a third priority of the video playing service.

4. The device occupation method of claim 1, wherein the call service is either a video call service or a voice call service.

5. The device occupation method of claim 1, wherein before occupying the headset by the first device and stopping occupying the headset by the second device, the device occupation method further comprises:
   displaying, by the first device, third prompt information instructing a user to choose whether to occupy the headset; and
   in response to an operation of the user according to the third prompt information:
      starting occupying, by the first device, the headset; and
      stopping occupying, by the second device, the headset.

6. The device occupation method of claim 5, wherein the operation is on the first device, the second device, or the headset.

7. The device occupation method of claim 1, wherein the headset is a BLUETOOTH headset.

8. The device occupation method of claim 1, further comprising:
   broadcasting, by the first device, a broadcast message in response to receiving the call service;
   receiving, by the second device, the broadcast message from the first device;
   sending, by the second device, feedback information to the first device so the first device can determine whether the headset is occupied by the second device, wherein the feedback information comprises second device information; and
   determining, by the first device, that the second device is a trusted device before occupying the headset.

9. A system comprising:
   a headset;
   a first device configured to answer a call service; and
   a second device configured to execute an audio playing service or a video playing service, wherein the headset is occupied by the second device, and wherein first information of a first electronic account logged in to the second device is the same as second information of a second electronic account logged in to the first device,
   wherein in response to answering the call service:
      the first device is further configured to start occupying the headset; and
      the second device is further configured to stop occupying the headset, wherein the first device is further configured to display, in response to starting occupying the headset, first prompt information indicating that the headset is occupied by the first device, and wherein the second device is further configured to display, in response to stopping occupying the headset, second prompt information indicating that the headset is occupied by the first device.

10. The system of claim 9, wherein the first device comprises a first mobile phone, a first tablet computer, a first smartwatch, a first video player, a first desktop computer, or a first television, and wherein the second device comprises a second mobile phone, a second tablet computer, a second smartwatch, a second video player, a second desktop computer, or a second television.

11. The system of claim 9, wherein a first priority of the call service is higher than either a second priority of the audio playing service or a third priority of the video playing service.

12. The system of claim 9, wherein the call service is either a video call service or a voice call service.

13. The system of claim 12, wherein before the first device occupies the headset and the second device stops occupying the headset, the first device is further configured to display third prompt information indicating a user to choose whether to occupy the headset, and wherein
in response to an operation of the user according to the third prompt information:
the first device is further configured to occupy the headset; and
the second device is configured to stop occupying the headset.

14. The system of claim 13, wherein the operation of the user is executed on the first device, the second device, or the headset.

15. The system of claim 9, wherein the headset is a BLUETOOTH headset.

16. The system of claim 9, wherein the second device is a trusted device when user information of the first device matches user information of the second device, or when first device information of the first device matches second device information of the second device.

17. A computer program product comprising computer-executable instructions stored on a non-transitory computer-readable storage medium that, when executed by a processor, cause a system to:

start occupying, using a second device of the system, a headset;

execute, using the second device, an audio playing service or a video playing service;

answer, using a first device of the system, a call service, wherein first information of a first electronic account logged in to the second device is the same as second information of a second electronic account logged in to the first device;

in response to the first device answering the call service:
start occupying, using the first device, the headset; and
stop occupying, using the second device, the headset;

display, using the first device in response to starting occupying the headset, first prompt information indicating that the headset is occupied by the first device; and display, using the second device in response to stopping occupying the headset, second prompt information indicating that the headset is occupied by the first device.

18. The computer program product of claim 17, wherein the first device comprises a first mobile phone, a first tablet computer, a first smartwatch, a first video player, a first desktop computer, or a first television, and wherein the second device comprises a second mobile phone, a second tablet computer, a second smartwatch, a second video player, a second desktop computer, or a second television.

19. The computer program product of claim 17, wherein a first priority of the call service is higher than either a second priority of the audio playing service or a third priority of the video playing service.

20. The computer program product of claim 17, wherein before the first device occupies the headset and the second device stops occupying the headset, the first device is further configured to display third prompt information indicating a user to choose whether to occupy the headset, and wherein in response to an operation of the user according to the third prompt information:
the first device is further configured to occupy the headset; and
the second device is configured to stop occupying the headset.

* * * * *